United States Patent
Rotilli Filho et al.

(10) Patent No.: US 11,165,375 B2
(45) Date of Patent: Nov. 2, 2021

(54) METHODS AND SYSTEMS FOR CONTROLLING ELECTRIC MOTORS

(71) Applicant: ACCELERATED SYSTEMS INC., Waterloo (CA)

(72) Inventors: Silvio Rotilli Filho, Hamilton (CA); Tim Lambert, Los Angeles, CA (US); Muhammad Ikhlas, Waterloo (CA)

(73) Assignee: ACCELERATED SYSTEMS INC., Waterloo (CA)

( * ) Notice: Subject to any disclaimer, the term of this patent is extended or adjusted under 35 U.S.C. 154(b) by 28 days.

(21) Appl. No.: 16/855,171

(22) Filed: Apr. 22, 2020

(65) Prior Publication Data

US 2020/0343841 A1 Oct. 29, 2020

Related U.S. Application Data

(60) Provisional application No. 62/837,476, filed on Apr. 23, 2019.

(51) Int. Cl.
*H02P 6/18* (2016.01)
*H02P 6/182* (2016.01)

(52) U.S. Cl.
CPC .................................. *H02P 6/182* (2013.01)

(58) Field of Classification Search
CPC ........................................................ H02P 6/182
USPC ..................................................... 318/400.34
See application file for complete search history.

(56) References Cited

U.S. PATENT DOCUMENTS

| | | | |
|---|---|---|---|
| 9,270,215 B2 | 2/2016 | Scheit et al. | |
| 9,748,882 B1 | 8/2017 | Breheny et al. | |
| 2011/0025241 A1 | 2/2011 | Kwon et al. | |
| 2012/0229119 A1* | 9/2012 | Leidhold .................. | H02P 6/18 324/71.1 |

(Continued)

FOREIGN PATENT DOCUMENTS

| | | |
|---|---|---|
| JP | 2015122857 A | 7/2015 |
| WO | 2018016448 A1 | 1/2018 |

OTHER PUBLICATIONS

Rotor Position and Velocity Estimation for a Salient-Pole Permanent Magnet Synchronous Machine at Standstill and High Speeds—Matthew J. Corley and Robert D. Lorenz—IEEE Transactions on Industry Applications, vol. 34, No. 4, Jul./Aug. 1998, pp. 784-789.

(Continued)

*Primary Examiner* — Erick D Glass
(74) *Attorney, Agent, or Firm* — Nyssa Inc.

(57) ABSTRACT

There is provided a method of controlling an electric motor having a rotor and a stator. The method includes controlling the motor in a low-speed mode by injecting a high frequency (HF) signal into the motor. The HF signal may have an initial voltage and an initial frequency. The method may also include obtaining a speed of the rotor relative to the stator, and obtaining a reference input being sent to the motor. Moreover, the method may include comparing the speed and the reference input with a speed threshold and a reference input threshold respectively. In addition, the method may include reducing at least one of the initial voltage and the initial frequency if the speed is below the speed threshold and the reference input is below the reference input threshold, to reduce an acoustic noise caused by injecting the HF signal into the electric motor.

20 Claims, 25 Drawing Sheets

(56) References Cited

U.S. PATENT DOCUMENTS

| | | | |
|---|---|---|---|
| 2015/0100264 A1* | 4/2015 | Qian | G01D 5/2046 702/94 |
| 2016/0254770 A1 | 9/2016 | Amemiya et al. | |
| 2017/0310256 A1 | 10/2017 | Zheng | |
| 2018/0054148 A1 | 2/2018 | Zhao | |
| 2018/0131305 A1 | 5/2018 | Wang | |
| 2018/0138841 A1* | 5/2018 | Campbell | H02P 21/13 |
| 2020/0287492 A1* | 9/2020 | Sega | H02P 23/14 |

OTHER PUBLICATIONS

Static and Dynamic Behavior of Saturation-Induced Saliencies and Their Effect on Carrier-Signal-Based Sensorless AC Drives—Fernando Briz, Michael W. Degner, Alberto Diez and Robert D. Lorenz—IEEE Transactions on Industry Applications, vol. 38, No. 3, May/Jun. 2002, pp. 670-678.

An Extended Electromotive Force Model for Sensorless Control of Interior Permanent-Magnet Synchronous Motors—Zhiqian Chen, Mutuwo Tomita, Shinji Doki and Shigeru Okuma—IEEE Transactions on Industrial Electronics, vol. 50, No. 2, Apr. 2003, pp. 288-295.

Sensorless Drive of Surface-Mounted Permanent-Magnet Motor by High-Frequency Signal Injection Based on Magnetic Saliency—Ji-Hoon Jang, Seung-Ki Sul, Jung-Ik Ha, Kozo Ide and Mitsujiro Sawamura—IEEE Transactions on Industry Applications, vol. 39, No. 4, Jul./Aug. 2003, pp. 1031-1039.

Analysis of Permanent Magnet Machine for Sensorless Control based on High Freuqency Signal Injection—Ji-Hoon Jang, Seung-Ki Sul, Jung-Ik Ha, Motomichi Ohto and Kozo Ide—2003 IEEE, pp. 592-598.

Analysis of Permanent-Magnet Machine for Sensorless Control Based on High-Frequency Signal Injection—Ji-Hoon Jang, Jung-Ik Ha, Motomichi Ohto, Kozo Ide and Seung-Ki Sul—IEEE Transactions on Industry Applications, vol. 40, No. 6, Nov./Dec. 2004, pp. 1595-1604.

Robust Magnet Polarity Estimation for Initialization of PM Synchronous Machines with Near Zero Saliency—Dejan Raca, Michael C. Harke and Robert D. Lorenz—2006 IEEE, pp. 481-488.

Saliency-Tracking-Based Sensorless Control of AC Machines Using Structured Neural Networks—Pablo García, Fernando Briz, Dejan Raca and Robert D. Lorenz—IEEE Transactions on Industry Applications, vol. 43, No. 1, Jan./Feb. 2007, pp. 77-86.

Compensation for Rotor Position Estimation Error due to Cross-Coupling Magnetic Saturation in Signal Injection Based Sensorless Control of PM Brushless AC Motors—Z.Q. Zhu, Y. Li, D. Howe and C.M. Bingham—2007, IEEE, pp. 208-213.

A Comparative Analysis of Pulsating vs. Rotating Vector Carrier Signal Injection-Based Sensorless Control—Dejan Raca, Pablo García, David Reigosa, Fernando Briz and Robert Lorenz—2008, IEEE, pp. 879-885.

Measurement and Adaptive Decoupling of Cross-Saturation Effects and Secondary Saliencies in Sensorless Controlled IPM Synchronous Machines—David Díaz Reigosa, Pablo García, Dejan Raca, Fernando Briz and Robert D. Lorenz—IEEE Transactions on Industry Applications, vol. 44, No. 6, Nov./Dec. 2008, pp. 1758-1767.

Universal PLL Strategy for Sensorless Speed and Position Estimation of PMSM—Georges el Murr, Damian Giaouris and J.W. Finch—2008 IEEE Region 10 Colloquium and the Third International Conference on Industrial and Information Systems, Kharagpur, India Dec. 8-10, 2008, pp. 1-6.

Back EMF Sensorless-Control Algorithm for High-Dynamic Performance PMSM—Fabio Genduso, Rosario Miceli, Cosimo Rando and Giuseppe Ricco Galluzzo—IEEE Transactions on Industrial Electronics, vol. 57, No. 6, Jun. 2010, pp. 2092-2100.

Investigation of Effectiveness of Sensorless Operation in Carrier-Signal-Injection-Based Sensorless-Control Methods—Z. Q. Zhu, and L. M. Gong—IEEE Transactions on Industrial Electronics, vol. 58, No. 8, Aug. 2011, pp. 3431-3439.

A High-Speed Sliding-Mode Observer for the Sensorless Speed Control of a PMSM—Hongryel Kim, Jubum Son and Jangmyung Lee—IEEE Transactions on Industrial Electronics, vol. 58, No. 9, Sep. 2011, pp. 4069-4077.

Saliency Investigation of PM Brushless AC Motors for High-Frequency Carrier Signal Injection-Based Sensorless Control—Liming Gong and Z. Q. Zhu—Proceedings of the 17th International Conference on Automation & Computing, University of Huddersfield, UK, Sep. 10, 2011, pp. 86-91.

DSP-Based Control of Sensorless IPMSM Drivesfor Wide-Speed-Range Operation—Gaolin Wang, Rongfeng Yang and Dianguo Xu—IEEE Transactions on Industrial Electronics, vol. 60, No. 2, Feb. 2013, pp. 720-727.

Sensorless Operation Capability of Surface-Mounted Permanent-Magnet Machine Based on High-Frequency Signal Injection Methods—T. C. Lin and Z. Q. Zhu—IEEE Transactions on Industry Applications, vol. 51, No. 3, May/Jun. 2015, pp. 2161-2171.

Square-Wave Voltage Injection Algorithm for PMSM Position Sensorless Control With High Robustness to Voltage Errors—Ronggang Ni, Dianguo Xu, Frede Blaabjerg, Kaiyuan Lu, Gaolin Wang and Guoqiang Zhang—IEEE Transactions on Power Electronics, vol. 32, No. 7, Jul. 2017, pp. 5425-5437.

Unified Wide-Speed Sensorless Scheme Using Nonlinear Optimization for IPMSM Drives—Yingguang Sun, Matthias Preindl, Shahin Sirouspour and Ali Emadi—IEEE Transactions on Power Electronics, vol. 32, No. 8, Aug. 2017, pp. 6308-6322.

Optimization-Based Position Sensorless Finite Control Set Model Predictive Control for IPMSMs—Shamsuddeen Nalakath, Yingguang Sun, Matthias Preindl and Ali Emadi—IEEE Transactions on Power Electronics, vol. 33, No. 10, Oct. 2018, pp. 8672-8682.

Convex Optimization-Based Sensorless Control for IPMSM Drives with Reduced Complexity—Diego F. Valencia, Le Sun, Matthias Preindl and Ali Emadi—2018, IEEE, pp. 439-444.

Investigation of a Practical Convex-Optimization-Based Sensorless Scheme for IPMSM Drives—Le Sun, Shamsuddeen Nalakath, Alan Dorneles Callegaro and Ali Emadi—IEEE Transactions on Power Electronics, vol. 34, No. 12, Dec. 2019, pp. 12437-12452.

Thesis—Unified Position Sensorless Solution with Wide Speed Range Capabilities for IPM Synchronous Motor Drives—Yingguang Sun, B.Sc., M.Sc.—Dec. 2016.

* cited by examiner

Non-transitory Computer-readable Storage Medium
1800

Instructions to cause a processor to immobilize a rotor of an electric motor at an initial position relative to a stator of the electric motor

1805

Instructions to cause a processor to apply a first reference input to the electric motor

1810

Instructions to cause a processor to estimate a rotor position using the low-speed mode by injecting a high frequency (HF) signal into the electric motor, the estimating to provide a first estimated rotor position

1815

Instructions to cause a processor to determine a first position error by comparing the first estimated rotor position with the initial position

1820

Instructions to cause a processor to if the first position error is below an error threshold: associate the first position error with the first reference input; and determine a calibration function based on the first position error and the first reference input; and if the first position error is equal to or greater than the error threshold: exclude the first position error from the determining the calibration function

METHODS AND SYSTEMS FOR CONTROLLING ELECTRIC MOTORS

CROSS-REFERENCE TO RELATED APPLICATION

This application claims the benefit of, and priority from, U.S. Provisional Patent Application No. 62/837,476 filed on Apr. 23, 2019, which is incorporated herein by reference in its entirety.

FIELD

The present specification relates to methods and systems for controlling electric motors, and in particular to methods and systems for sensorless control of electric motors.

BACKGROUND

Electric motors may be used to provide actuation for vehicles and other systems or devices. An electric motor may comprise a stator and a rotor rotatable relative to the stator. Electric motors use forces generated using electric or magnetic fields to rotate the rotor. In some electric motors, permanent magnets may be used to provide at least some of the magnetic fields that generate the forces that turn the rotor of the motor.

SUMMARY

According to an implementation of the present specification there is provided a method of controlling an electric motor having a rotor and a stator, the method comprising: controlling the electric motor in a low-speed mode by injecting a high frequency (HF) signal into the electric motor, the HF signal having an initial voltage and an initial frequency; obtaining a speed of the rotor relative to the stator; obtaining a reference input being sent to the electric motor; comparing the speed and the reference input with a first speed threshold and a reference input threshold respectively; and reducing at least one of the initial voltage and the initial frequency if the speed is below the first speed threshold and the reference input is below the reference input threshold, to reduce an acoustic noise caused by the injecting the HF signal into the electric motor.

The first speed threshold may be about zero and the reference input threshold may be about zero.

The initial voltage may comprise a maximum voltage; and the reducing the at least one of the initial voltage and the initial frequency may comprise reducing the maximum voltage to a minimum voltage if the speed is below the first speed threshold and the reference input is below the reference input threshold.

The initial voltage may comprise a maximum voltage; and the method may further comprise: maintaining the maximum voltage if the speed is below the first speed threshold and the reference input is above the reference input threshold.

The initial voltage may be below a maximum voltage; and the method may further comprise: if the speed is below the first speed threshold and the reference input is above the reference input threshold: increasing the initial voltage to the maximum voltage; maintaining the initial voltage at the maximum voltage for a given time period; and after the given time period, controlling the electric motor in the low-speed mode by injecting the HF signal into the electric motor, the HF signal having the maximum voltage.

The reducing the at least one of the initial voltage and the initial frequency may comprise reducing the initial frequency if the speed is below the first speed threshold and the reference input is below the reference input threshold.

The reducing the initial frequency may comprise: determining a difference between the reference input and the reference input threshold; and reducing the initial frequency by a frequency reduction being a non-decreasing function of the difference.

The non-decreasing function may comprise a stepwise function; and the reducing the initial frequency may comprise reducing the initial frequency by the frequency reduction determined by the stepwise function of the difference.

The method may further comprise: if the speed is equal to or greater than about the first speed threshold, controlling the electric motor using a high-speed mode based on a back electromotive force (EMF) generated by the electric motor.

The method may further comprise: if the speed is equal to or greater than a second speed threshold greater than the first speed threshold, disabling the low-speed mode by discontinuing the injecting the HF signal into the electric motor.

The method may further comprise: if after the disabling the low-speed mode the speed drops below a third speed threshold lower than the first speed threshold, controlling the electric motor using the low-speed mode by injecting the HF signal into the electric motor.

The method may further comprise: determining the third speed threshold, the determining comprising: determining a first estimate of a position of the rotor relative to the stator using the low-speed mode by injecting the HF signal into the electric motor, the rotor rotating at the speed; determining a second estimate of the position of the rotor using the high-speed mode based on the back EMF, the rotor rotating at the speed; calculating a first error based on a difference between the first estimate and the second estimate; comparing the first error with an error threshold; if the first error is below the error threshold, setting the speed as the third speed threshold; and if the first error is equal to or greater than the error threshold, increasing the speed of the rotor relative to the stator to an increased speed.

If the first error is equal to or greater than the error threshold the determining the third speed threshold may further comprise: determining a third estimate of the position of the rotor relative to the stator using the low-speed mode by injecting the HF signal into the electric motor, the rotor rotating at the increased speed; determining a fourth estimate of the position of the rotor using the high-speed mode based on the back EMF, the rotor rotating at the increased speed; calculating a second error based on a corresponding difference between the third estimate and the fourth estimate; comparing the second error with the error threshold; if the second error is below the error threshold, setting the increased speed as the third speed threshold; and if the second error is equal to or greater than the error threshold, increasing the increased speed of the rotor relative to the stator to a further increased speed.

According to another implementation of the present specification there is provided a method of controlling an electric motor in a low-speed mode, the electric motor comprising a rotor and a stator, the method comprising: injecting a high frequency (HF) signal into the electric motor; measuring a current generated by the electric motor in response to the injecting the HF signal; and estimating a position of the rotor relative to the stator based on the current, the estimating comprising using a phase locked loop (PLL) having: a dynamic gain set to a minimum gain if a dynamic parameter is equal to or smaller than the minimum gain, the dynamic parameter being based on the current and a speed of the rotor relative to the stator; the dynamic gain set to the dynamic parameter if the dynamic parameter is greater than the minimum gain and less than a maximum gain; and the dynamic gain set to the maximum gain if the dynamic parameter is equal to or greater than the maximum gain.

The method may further comprise: obtaining a reference input current being sent to the electric motor; and wherein the using the PLL may comprise calculating the dynamic parameter based on: a current error ($\varepsilon_i$) calculated based on a difference between the current and the reference input current; and a speed error ($\varepsilon_s$) calculated based on a corresponding difference between an estimated speed of the rotor and a reference speed associated with the rotor.

The calculating the dynamic parameter may comprise calculating the dynamic parameter as being equal to $(1+\varepsilon_s K_s+\varepsilon_i K_i)K_{min}$, where $K_{min}$ is the minimum gain, $K_s$ is a speed gain, and $K_i$ is a current gain.

According to yet another implementation of the present specification there is provided a method of calibrating a low-speed mode of controlling an electric motor comprising a rotor and a stator, the method comprising: immobilizing the rotor at an initial position relative to the stator; applying a first reference input to the electric motor; estimating a rotor position using the low-speed mode by injecting a high frequency (HF) signal into the electric motor, the estimating to provide a first estimated rotor position; determining a first position error by comparing the first estimated rotor position with the initial position; if the first position error is below an error threshold: associating the first position error with the first reference input; and determining a calibration function based on the first position error and the first reference input; and if the first position error is equal to or greater than the error threshold: excluding the first position error from the determining the calibration function.

The associating the first position error with the first reference input may comprise storing the first position error in association with the first reference input.

The method may further comprise: applying a second reference input to the electric motor; estimating the rotor position using the low-speed mode to provide a second estimated rotor position; determining a second position error by comparing the second estimated rotor position with the initial position; if the second position error is below the error threshold, associating the second position error with the second reference input; and wherein the determining the calibration function may comprise: if the first position error and the second position error are below the error threshold, determining the calibration function based on the first position error, the second position error, the first reference input, and the second reference input.

The determining the calibration function may comprise determining the calibration function by performing a linear regression based on the first position error, the second position error, the first reference input, and the second reference input.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 18 shows a block diagram of yet another example computer-readable storage medium, in accordance with a non-limiting implementation of the present specification.

DETAILED DESCRIPTION

Figures 1A, 1B:
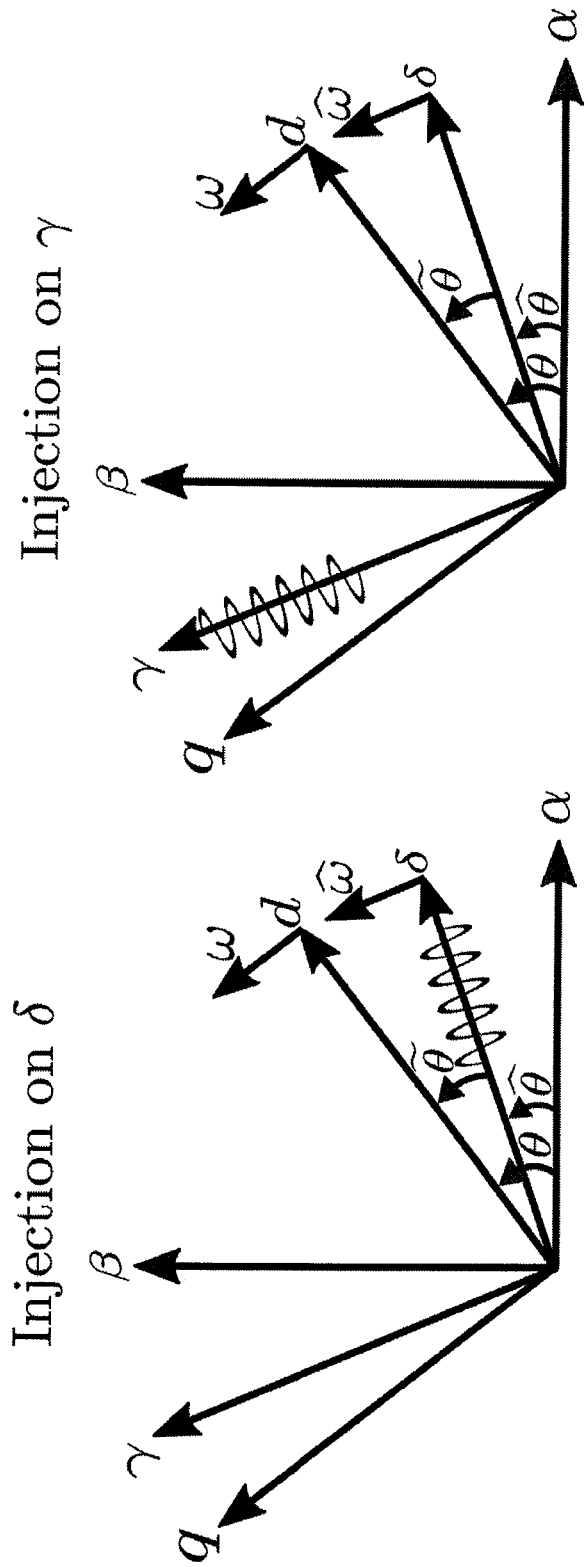
FIGS. 1A and 1B show examples of injection of a high-frequency (HF) signal on different axes of an example model of an electric motor, in accordance with a non-limiting implementation of the present specification.

In the following description, certain specific details are set forth in order to provide a thorough understanding of various disclosed implementations. However, one skilled in the relevant art will recognize that implementations may be practiced without one or more of these specific details, or with other methods, components, materials, and the like. In other instances, well-known structures associated with light sources have not been shown or described in detail to avoid unnecessarily obscuring descriptions of the implementations.

Unless the context requires otherwise, throughout the specification and claims which follow, the word "comprise" and variations thereof, such as, "comprises" and "comprising" are to be construed in an open, inclusive sense, that is as "including, but not limited to."

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the implementations.

Permanent magnet electric motors may have relatively high efficiency, high torque density, and simple control systems. To achieve high-performance operation and enhanced motor efficiency, accurate rotor position information may be used for vector control. In some examples, one or more position sensors may be used to determine rotor position. Such position sensors may reduce robustness and reliability, increase motor size (when using an encoder or a resolver), and increase cost. For example, in e-bike applications, Hall-effect sensors may be used due to their low cost, easy implementation and smaller size. Hall-effect sensors may also be described as Hall sensors, in short. This type of sensor may lack high position resolution, which may in turn affect motor performance. Replacing position sensors with sensorless methods or modes of motor control may reduce or eliminate these sensor-related issues.

Sensorless control methods or modes for permanent magnet (PM) motors may be classified into two main classes. The first class, based on the back electromotive force (EMF), may be used in medium to high-speed operation since the magnitude of the back EMF is proportional to the rotor speed of the electric motor. This first class may also be referred to as high-speed modes of motor control.

The second class may rely on the magnetic saliency of the motor. This second class of motor control methods, which relay on saliency tracking, may be used in zero and low-speed operation. The digital filters commonly used in this second class of methods may cause phase-delay if used at high speed. The second class of motor control methods may also be described as low-speed modes of motor control. The low-speed mode may use injection of a high frequency (HF) signal into the motor's windings, as is described in greater detail below in relation to FIGS. 1-5.

In some examples, in order to derive the analytical model of a PM motor, the rotor reference frame (d-q frame) may be utilized. In some examples, the analytical models described herein may be applied to surface-mounted permanent magnet (SPM) electric motors. The d-q frame contains information about the rotor position. An example stator voltage model of the permanent magnet machine is presented by equation (1):

$$\begin{bmatrix} v_d \\ v_q \end{bmatrix} = R_s \begin{bmatrix} i_d \\ i_q \end{bmatrix} + \begin{bmatrix} L_d & 0 \\ 0 & L_q \end{bmatrix} \frac{d}{dt} \begin{bmatrix} i_d \\ i_q \end{bmatrix} + \omega_e \begin{bmatrix} 0 & -L_q \\ L_d & 0 \end{bmatrix} \begin{bmatrix} i_d \\ i_q \end{bmatrix} + \begin{bmatrix} 0 \\ \omega_e \psi_f \end{bmatrix} \quad (1)$$

where $v_{d,q}$, $i_{d,q}$ are the stator rotating frame voltage and current, $R_s$ is the stator resistance, $L_{d,q}$ is the stator inductance, $\omega_e$ is the rotor electrical speed and $\psi_f$ is the permanent magnet flux linkage.

Equation (1) shows that the d-axis and q-axis are naturally coupled, and the coupling properties are directly related to the rotor speed. If the speed and voltage are decoupled, changes in the d-axis current should have no effect on the q-axis frame, and the decoupled system can be used to estimate the rotor position using the high-frequency signal injection method.

In some examples, at low speed and standstill conditions, a high-frequency (HF) carrier voltage signal may be injected on the virtual (estimated) rotating frame comprising a δ-axis and a y-axis. An example δ-axis is shown in FIG. 1A and an example y-axis is shown in FIG. 1B. In some examples, using the δ-axis for HF injection may allow for a reduction of torque ripple and additional losses associated with the HF injection. In some examples of sensorless motor control, the real position θ, and therefore the d-q frame, may be treated as unknown parameters. The fundamental characteristic of the position estimator is to reduce the position error $\tilde{\theta}$, converging the estimated position $\hat{\theta}$ to the real position θ. In some examples, the HF signal may comprise a sinusoidal voltage signal. When the sinusoidal voltage signal is injected into the windings of the motor, a corresponding current may be generated. An example signal injection is presented in equation (2)

$$\begin{bmatrix} v_\delta^h \\ v_\gamma^h \end{bmatrix} = V_{inj} \begin{bmatrix} -\sin(\omega_h t + \varphi) \\ 0 \end{bmatrix}, \quad (2)$$

where $V_{inj}$, $\omega_h$ and $\varphi$ are the HF injection voltage amplitude, the frequency of the high-frequency injection signal, and the initial phase angle, respectively. $v_\delta^h$ and $v_\gamma^h$ are the HF injection voltage signal.

In some such example position estimation methods, at low speed, the frequency of the injected signal may be much higher (e.g. about 10×) than the rotor electrical frequency. As such, the stator impedance may be almost entirely related to the high-frequency inductance. Under this assumption, the stator voltage equation (1) may be simplified as equation (3):

$$\begin{bmatrix} v_d^h \\ v_q^h \end{bmatrix} = \begin{bmatrix} L_d & 0 \\ 0 & L_q \end{bmatrix} \frac{d}{dt} \begin{bmatrix} i_d^h \\ i_q^h \end{bmatrix} \quad (3)$$

where $v_d^h$, $v_q^h$ and $i_d^h$, $i_q^h$, are the high-frequency (HF) injection voltage and the high-frequency induced current, respectively. Using the high-frequency injection method, the signal on the d-q frame is assumed to be completely decoupled. To obtain the information needed to calculate the estimated rotor position, the current is transferred to the α-β frame using equations (5) and (6), and using the transformation matrix of equation (4):

$$T(\theta) = \begin{bmatrix} \cos(\theta) & -\sin(\theta) \\ \sin(\theta) & \cos(\theta) \end{bmatrix} \quad (4)$$

$$T(\tilde{\theta}) = \begin{bmatrix} \cos(\tilde{\theta}) & -\sin(\tilde{\theta}) \\ \sin(\tilde{\theta}) & \cos(\tilde{\theta}) \end{bmatrix}$$

$$\begin{bmatrix} i_\alpha^h \\ i_\beta^h \end{bmatrix} = T^{-1}(\theta) \begin{bmatrix} L_d & 0 \\ 0 & L_q \end{bmatrix} \times T(\hat{\theta}) \int \begin{bmatrix} -V_{inj}\sin(\omega_h t) \\ 0 \end{bmatrix} dt \quad (5)$$

$$\begin{bmatrix} i_\alpha^h \\ i_\beta^h \end{bmatrix} = \frac{-V_{inj}\cos(\omega_h t)}{\omega_h L_d L_q} \times \begin{bmatrix} \cos\left(\theta - \arctan\left(\frac{L_d}{L_q}\tan(\hat{\theta})\right)\right) \\ \sin\left(\theta - \arctan\left(\frac{L_d}{L_q}\tan(\hat{\theta})\right)\right) \end{bmatrix} \quad (6)$$

Figure 2:
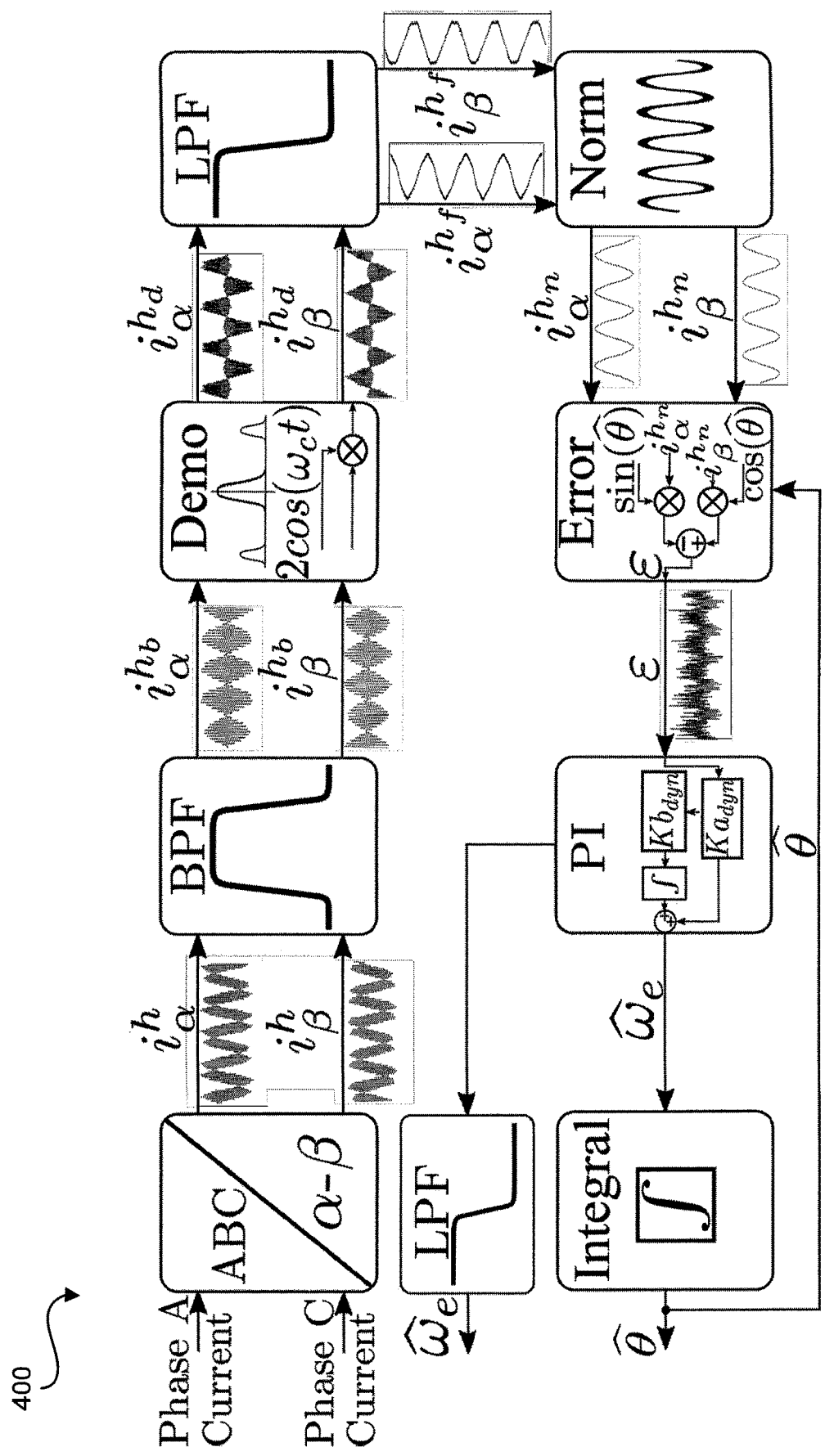
FIG. 2 shows a schematic flowchart of an example method for estimating the rotor position of an electric motor using a HF signal injection, in accordance with a non-limiting implementation of the present specification.

An example method for estimating the rotor position using a HF signal injection is depicted schematically in the flowchart shown in FIG. 2. As shown in FIG. 2, a HF signal may be injected into the motor as described above. In addition, as shown in FIG. 2, a band-pass filter (BPF) centered on the frequency of the injected HF signal may used to reduce or eliminate the switching frequency and the rotating field frequency from the measured phase current.

The BPF may create phase delay at high-speed. As such, this position estimation technique using HF signal injections may be used in low-speed to avoid the phase delays that may be caused by the BPF at relatively higher speeds. When the electric motor operates at a medium to high speed range, the rotor position may be estimated using a back EMF method. After the BPF, the signal may then be demodulated, for example by multiplying the two current components by 2 cos($\omega_h t$). Subsequent to the demodulation, a low-pass filter (LPF) may be used to reduce or eliminate the HF components. The result of the signal demodulation and filtering are shown in equation (7), where $i_\alpha^{hf}$ and $i_\beta^{hf}$ are the filtered induced currents:

$$\begin{bmatrix} i_\alpha^{hf} \\ i_\beta^{hf} \end{bmatrix} = LPF\left(BPF\left(\begin{bmatrix} i_\alpha^h \\ i_\beta^h \end{bmatrix}\right)2\cos(\omega_h t)\right) = \quad (7)$$

$$-\frac{1}{2}\frac{V_{inj}}{\omega_h L_d L_q}\begin{bmatrix} \cos\left(\theta - \arctan\left(\frac{L_d}{L_q}\tan(\hat{\theta})\right)\right) \\ \sin\left(\theta - \arctan\left(\frac{L_d}{L_q}\tan(\hat{\theta})\right)\right) \end{bmatrix}$$

When the sensorless control scheme converges, the position error $\tilde{\theta}$ approaches zero, and the estimated position $\hat{\theta}$ approaches the real position θ. Assuming a small position error, equation (7) may be simplified as equation (8):

$$\begin{bmatrix} i_\alpha^{hf} \\ i_\beta^{hf} \end{bmatrix} = -\frac{1}{2}\frac{V_{inj}}{\omega_h L_d L_q}\begin{bmatrix} \cos\left(\theta - \frac{L_d}{L_q}\hat{\theta}\right) \\ \sin\left(\theta - \frac{L_d}{L_q}\hat{\theta}\right) \end{bmatrix} \quad (8)$$

To reduce the influence of non-linearity, fluctuations may be reduced or eliminated using an example normalization method, presented by equations (9):

$$Norm(i_\alpha^{hf}) = \frac{i_\alpha^{hf}}{\sqrt{\left(i_\alpha^{hf}\right)^2 + \left(i_\beta^{hf}\right)^2}} \quad (9)$$

$$Norm(i_\beta^{hf}) = \frac{i_\beta^{hf}}{\sqrt{\left(i_\alpha^{hf}\right)^2 + \left(i_\beta^{hf}\right)^2}}$$

In some examples, a phase locked loop (PLL) may then be used to build the speed error and estimate the rotor position and speed. The error is calculated in equation (10) using for example the q-axis Park transformation:

$$\varepsilon = \quad (10)$$
$$\sin\left(\theta - \frac{L_d}{L_q}\hat{\theta}\right)\cos(\hat{\theta}) - \cos\left(\theta - \frac{L_d}{L_q}\hat{\theta}\right)(\hat{\theta}) = \sin\left(\frac{L_q - L_d}{L_q}\tilde{\theta}\right) \approx \frac{L_q - L_d}{L_q}\tilde{\theta}$$

The motor saliency ($\zeta = L_q/L_d$) is relied upon in the low-speed mode of sensorless motor control. In some examples, low saliency can reduce the signal to noise ratio (SNR), deteriorating the capability of the motor under sensorless control. Core saturation can cause saliency reduction, and limit the torque-producing range of the low-speed sensorless control system. As described above, an example low-speed mode for sensorless control of electric motors is presented in FIG. 2.

The PLL may be used in the sensorless motor control method to estimate the rotor position. The input of the PLL is the position error. In the case of the low-speed mode using HF injection, the position error is represented in the q-axis current. When the HF signal is injected on the d-axis, considering that the speed and voltage are decoupled, changes in the d-axis current should have no effect on the q-axis frame. When there are errors in the position estimation method, non-zero q-axis current will appear, and the PLL may be used to correct the error. The output of the PLL loop filter (LF) is the estimated speed. The integration of the estimated speed provides information which may be used to obtain the estimated position. When the input error is higher than zero, the estimated position lags the real position, and the LF increases the output estimated speed, forcing the estimated position to be closer to the real position.

The PLL may exhibit low pass filter characteristics, and depending on the proportional and integral gains (PI gains), the response of the error compensation may be faster (high gains) or slower (low gains). A slow response may reduce the position error during the steady-state condition, but due to the low cut-off frequency of the filter, it may not be able to efficiently track the rotor position during a large transient disturbance. The error, PI, and integral loop blocks in FIG. 2 show the PLL structure. In some examples, the transfer function of the PLL may be expressed as equation (10.1):

$$\frac{\hat{\theta}}{\theta} = \frac{K_{a_{dyn}}s + K_{b_{dyn}}}{s^2 + K_{a_{dyn}}s + K_{b_{dyn}}} \quad (10.1)$$

where the PI regulator is used as the loop filter, and the frequency response is dependent on the PI gains. In equation (10.1), the transfer function is represented in the frequency domain ("s-domain"), where s is the complex frequency of the signal (s=σ+jω), where σ is the real part and jω is the imaginary part. In some examples, the Laplace transform may used in this case to convert the system from the time domain to the frequency domain. $K_{a_{dyn}}$ and $K_{b_{dyn}}$ are described in greater detail in relation to equations (11) and (12).

Figure 3:
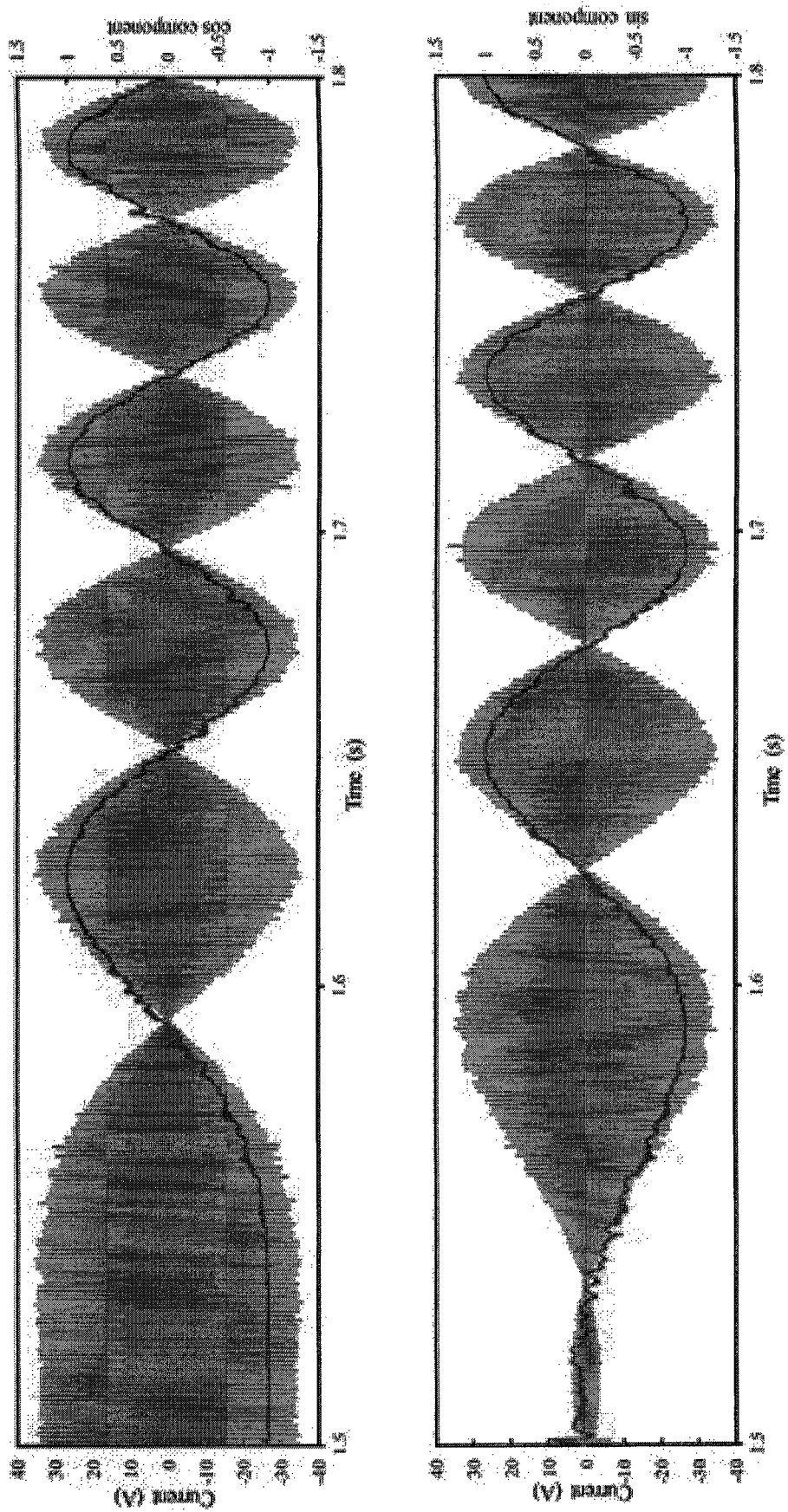
FIG. 3 shows an example current waveform after the demodulation process, and the current waveform after normalization (i.e. the thinner trace), produced by the method of FIG. 2.

FIG. 3 shows an example current waveform after the demodulation process, and the current waveform after normalization (i.e. the thinner trace), produced by the low-speed mode presented in FIG. 2. As can be seen in FIG. 3, the δ-γ currents are orthogonal to each other, and the rotor position may be extracted using a phase locked loop (PLL) module. In some examples, the PLL module may comprise a functional module as described in greater detail in relations to FIGS. 4 and 5, or a physical module that may perform the PLL functions described herein.

As discussed above, in some examples a phase locked loop (PLL) module may be used to supply information relating to the speed error c and therefore also to the rotor position. The PLL module may also interchangeably be referred to simply as the PLL. The PLL may filter the oscillation of the estimated position, thereby reducing the error between the real and estimated rotor positions. Using a slow PLL may affect the system dynamic response due to the low pass filter characteristics of the PLL.

In low-speed sensorless control, a high-frequency voltage signal is injected in the direct frame (d-axis), and the current on the quadrature frame (q-axis) is used to estimate the rotor position.

Figure 4A:
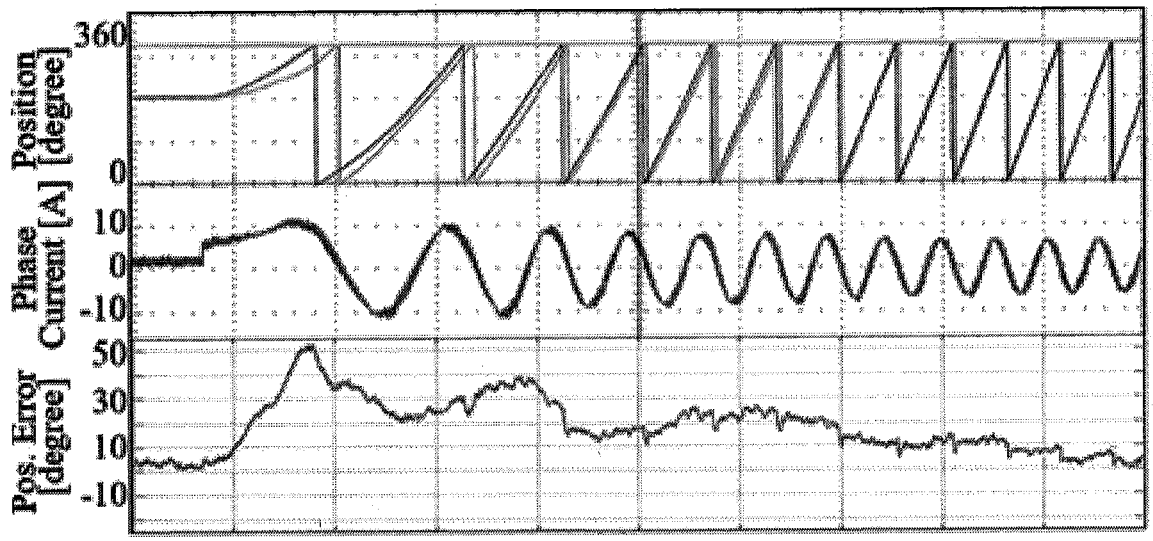
FIGS. 4A, 4B, and 4C show the performance of different example phase locked loops (PLLs), in accordance with a non-limiting implementation of the present specification.
Figure 4B:
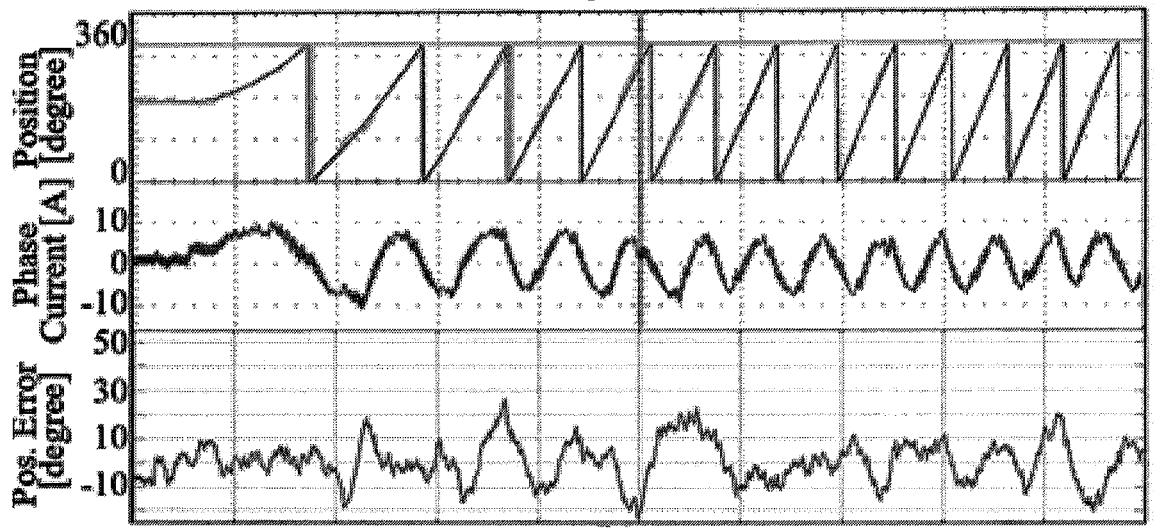

Assuming the estimated angle is correct, the q-axis current should be equal to zero; but, if there is an error between the real position and the estimated position, current on the q-axis frame (Iq) may appear. The PLL module may use the error information from the speed and q-axis current to compensate for the position error. The PLL gains may have a role in adjusting how fast the error will be corrected. Low gains may affect (e.g. slow down) the dynamic response of the position estimator, for example as shown in FIG. 4A. High gains may cause overshoot and oscillation, for example as shown in FIG. 4B. As can be seen in FIGS. 4A and 4B, low gains may reduce the error during steady-state operation, but they may not be able to effectively track the position during acceleration/deceleration. On the other hand, high PLL gains may improve the dynamic response, but at the cost of larger errors during steady state operation.

Figure 4C:
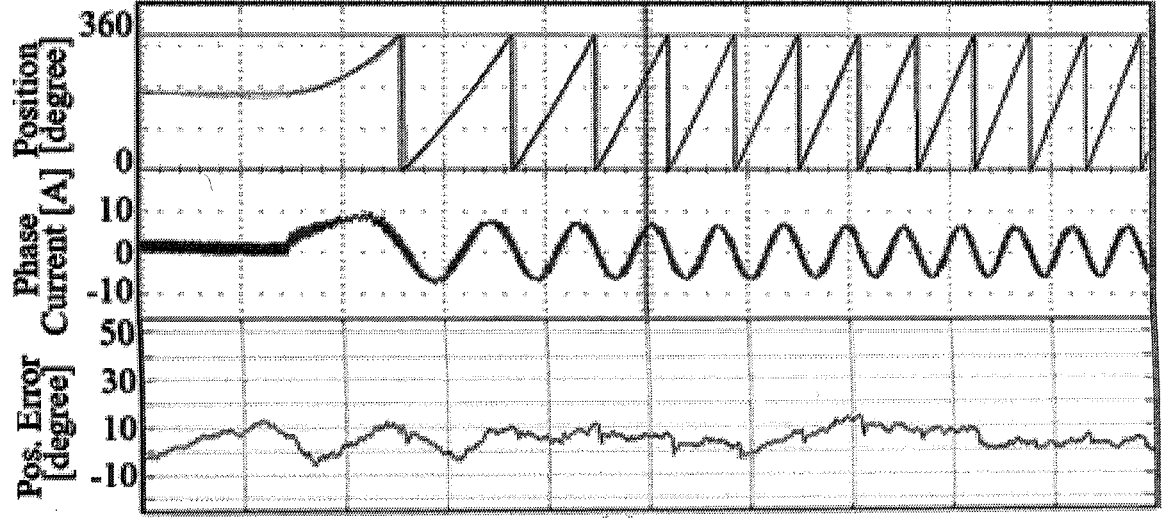

A PLL with gains that are dynamic based on the operating parameters of the electric motor may be used to enhance the dynamic response of the PLL during acceleration/deceleration, while also reducing overshoots and errors during steady-state operation. Such a PLL may be described as a dynamic PLL. FIG. 4C shows selected performance metrics of an example dynamic PLL, including position and position error over time. The top trace in FIG. 4C shows that the estimated position closely tracks the actual position, compared for example to FIG. 4A where the top trace shows a difference or error between the actual and estimated positions early on. In addition, the bottom trace in FIG. 4C shows position errors of smaller magnitude and variation over time compared to the bottom trace in FIG. 4B.

Figure 5:
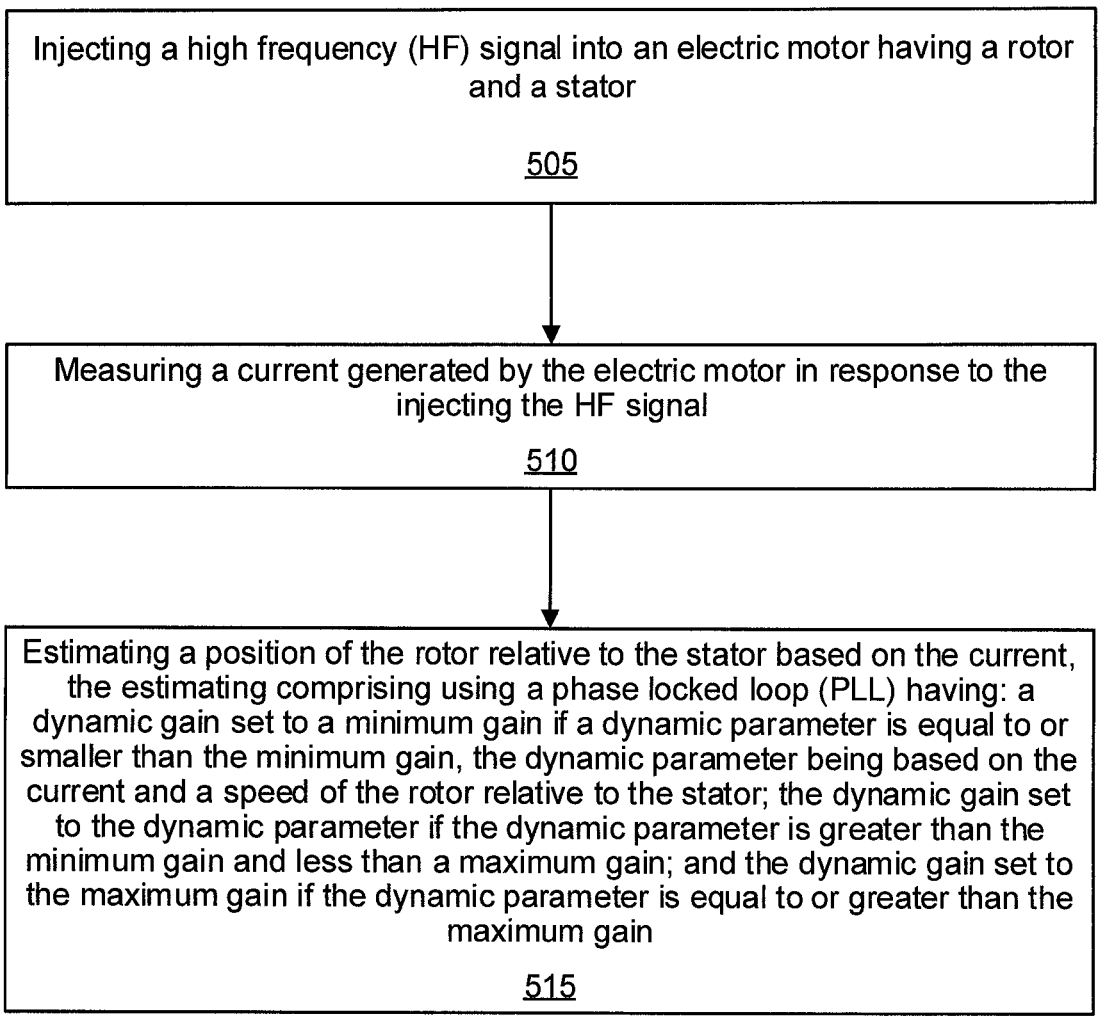
FIG. 5 shows a flowchart of an example method, in accordance with a non-limiting implementation of the present specification.

As discussed above, in some examples, to increase the performance of the dynamic response and reduce the error in the rotor position estimate during steady state operation, a dynamic phase locked loop (PLL) gain may be implemented. FIG. 5 shows a flowchart of an example method 500 for controlling an electric motor in the low-speed mode. In some examples, controlling an electric motor may comprise determining the position of the rotor of the motor relative the stator of the motor. Determining the position may then allow for controlling parameters of an actuating input used to actuate the motor. Examples of such parameters may include parameters of a current used to actuate the motor, which parameters may include the magnitude, sign, phase, or duty cycle of the current, and the like. Moreover, examples of such parameters may also include voltage or frequency of the actuating input.

Furthermore, in some examples, controlling an electric motor may comprise determining the position and the speed of the rotor relative to the stator. Determining the position and speed may then allow for controlling parameters of the actuating input used to actuate the motor. In addition, in some examples, controlling an electric motor may comprise determining the position or speed of the rotor, determining parameters of the actuating input used to actuate the motor based on the position or speed of the rotor, and tailoring and applying that actuating input to the motor to actuate the motor. It is contemplated that in some examples, the actuating input may also be tailored or adjusted based on input from an operator of the electric motor, such as a throttle input and the like.

Method 500 may utilize a dynamic PLL having a dynamic gain. At box 505, a HF signal may be injected into the motor. In some examples, this HF signal may be injected into stator windings of the electric motor. Moreover, in some examples, the HF signal may have a frequency that is higher than a range of frequencies that may be used for actuating the electric motor. In addition, in some examples, the voltage of the HF signal may be lower than the range of voltages that may be used for actuating the electric motor. At box 510 a current generated by the electric motor in response to injecting the HF signal may be measured. At box 515, a position of the rotor relative to the stator may be estimated based on the current. This estimation may comprise using a PLL. The injection of the HF signal, the generation of the current, and the estimation of the position based on the current may be similar to those described herein in relation to FIGS. 1A-B, 2, 3, and 4A-C and equations (1)-(10).

In some examples, the estimated position of the rotor may in turn be used to control the operation of the motor. Moreover, in some examples, in the low-speed mode of sensorless motor control, the measured current and the estimated position determined based on the current may provide the information about the state and operation of the motor used to control the motor. Moreover, in some examples, method 500 may further include outputting the estimated position. In some examples, outputting the estimated position may comprise storing the estimated position in a non-transitory computer- or machine-readable storage medium.

It is contemplated that in some examples, method 500 may be performed by a motor controller. A motor controller may also be referred to as a "controller" in short. An example of such a controller is described in greater detail in relation to FIG. 7. In some examples, outputting the estimated position may comprise sending the estimated position to a component of the controller, or a component or system outside of the controller. In addition, in some examples the PLL module may comprise a functional module or a hardware module in the motor controller. It is also contemplated that in some examples, the PLL module may be separate from or outside of the motor controller.

The PLL used in box 515 may comprise a dynamic PLL. This dynamic PLL may comprise a dynamic gain. The dynamic gain may be set to a minimum gain if a dynamic parameter is equal to or smaller than the minimum gain. The dynamic parameter may be based on the current generated by the motor in response to the HF signal and a speed of the rotor relative to the stator. Moreover, the dynamic gain may be set to the value of the dynamic parameter if the dynamic parameter is greater than the minimum gain and less than a maximum gain. Furthermore, the dynamic gain may be set to the maximum gain if the dynamic parameter is equal to or greater than the maximum gain. Examples of such dynamic gains are described in greater detail in relation to equations (11) and (12) and FIG. 6.

Moreover, in some examples, method 500 may further comprise obtaining a reference input current being sent to the electric motor. In some examples, this reference input current may comprise a current that is directed to the electric motor to actuate the motor. In some examples, actuating the motor may comprise causing the rotor to rotate relative to the stator at a given speed or with a given torque. In examples where the electric motor is used to actuate an electric vehicle, the reference input current may comprise, or may correspond to, a throttle input provided to the electric motor of the vehicle. In some examples, the throttle input may be initiated or controlled by an operator of the vehicle.

In some such examples where the reference input current is obtained, the dynamic parameter may be calculated based on a current error ($\varepsilon_i$) and a speed error ($\varepsilon_s$). The current error ($\varepsilon_i$) may be calculated based on a difference between the current (generated by the motor in response to the HF injection) and the reference input current. In some examples, the current error ($\varepsilon_i$) may be calculated as the absolute value of the difference between the current (generated by motor in response to the HF injection) and the reference input current.

The speed error ($\varepsilon_s$) may be calculated based on a difference between an estimated speed of the rotor and a reference speed associated with the rotor. In some examples, the speed error ($\varepsilon_s$) may be calculated as the absolute value of the difference between the estimated speed of the rotor and the reference speed associated with the rotor. An example of the calculation of the current error ($\varepsilon_i$) and the speed error ($\varepsilon_s$) is described in greater detail in relation to equations (11) and (12) and FIG. 6.

Moreover, in some examples, the speed of the rotor may be obtained in a manner similar to that described herein in relation to FIGS. 1A-B, 2, 3, and 4A-C and equations (1)-(10). The reference speed may comprise an externally set or demanded speed. In examples where the electric motor is used to actuate an electric vehicle, the reference speed may comprise, or may correspond to, the speed corresponding to the throttle input provided to the electric motor of the vehicle. In some examples, the throttle input may be initiated or controlled by an operator of the vehicle.

In addition, In some examples, the dynamic parameter may be calculated as being equal to $(1+\varepsilon_s K_s+\varepsilon_i K_i)K_{min}$, where $K_{min}$ is the minimum gain, $K_s$ is a speed gain, and $K_i$ is a current gain. In some examples, the use of this equation may allow the speed and current gains to be fixed, and the overall proportional and integral gains to be adjusted using the closed loop information of the speed and current error. In addition, this equation may be easily implemented on a Digital Signal Processor (DSP), and may not need to relay on any Look-up tables for the dynamic gains. Moreover, this equation may ensure that the gain is never zero, even when the speed and current are zero. Simultaneously, the speed and current gains may be kept linearly independent.

The minimum gain and the speed and current gains may be constants. In some examples, these constants may be determined from the desired bandwidths for each control loop. For example, this can be estimated based on the characteristic dynamic parameters of the system, including mass, current, frequency, and damping. Moreover, in some examples, the constants may be experimentally determined since the closed loop stability analysis of the SPM machine may be difficult to obtain (e.g. it may need the HF induced saliency produced by the HF signal injection). When considering an interior permanent magnet machine (IPM), the closed loop stability analysis may be simpler to validate, and the gain threshold may be obtained using the stability analysis. The gains for the SPM may be manually tuned to provide low gains during steady-state ($\varepsilon_s K_s+\varepsilon_i K_i=0$), where $K_s$ and $K_i=K_{min}$, and high gains during transients, where $\varepsilon_s>0$ and $\varepsilon_i>0$. An example of the calculation of the dynamic parameter $Dyn_{gain}$ is described in greater detail in relation to equations (11) and (12) and FIG. 6.

As described above, in some examples the proportional ($K_a$) and integral ($K_b$) gains of the dynamic PLL may be scaled depending on the speed error ($\varepsilon_s$) and current error ($\varepsilon_i$). Moreover, in some examples, the system stability may be evaluated, and maximum and minimum thresholds for the gains may be specified. In some examples, the dynamic proportional gain may be calculated using example equation (11):

$$Dyn_{gain(a)} = (1 + \varepsilon_s K_s + \varepsilon_i K_i)K_a \qquad (11)$$

$$K_{a_{dyn}}(\varepsilon) = \begin{cases} K_a & \text{if } Dyn_{gain} \le K_a \\ Dyn_{gain(a)} & \text{if } K_a < Dyn_{gain(a)} < K_{a_{max}} \\ K_{a_{max}} & \text{if } Dyn_{gain(a)} \ge K_{a_{max}} \end{cases}$$

where $\varepsilon_i=\text{abs}(I_{ref}-I_m)$ is the absolute value of the current error, $\varepsilon_s=\text{abs}(S_{ref}-S_m)$ is the absolute value of the speed error, $I_{ref}$ is the q-axis current reference, $I_m$ is the measured q-axis current, $K_i$ is the current gain, $S_{ref}$ is the speed reference, $S_m$ is the estimated speed, $K_s$ is the speed gain, $K_{a_{dyn}}(\varepsilon)$ is the dynamic proportional gain function, and $K_{a_{max}}$ is the maximum allowed gain. $K_a$ corresponds to the minimum proportional gain. In some examples, the gains may be tuned to improve the system dynamics, and they are directly related to the speed controller's proportional and integral gain (PI) parameters. The PI is a functional block of the PLL, and the gains may be determined by the $K_{a_{dyn}}$ (proportional) and $K_{b_{dyn}}$ (integral). In some examples, The PI loop may be a "proportional-integral" control scheme, similar to a PID controller, eschewing the derivative gain.

Moreover, in some examples, the weight of the speed error may be higher (e.g. about 10×) than the current error. In some examples, the speed error may more important to position tracking, and since the speed loop has a lower bandwidth than the current loop, a similar error on speed may correlate to a much larger change in the reference input to the PLL.

The same dynamic gain method may be applied to the integral gain of the dynamic PLL, using the integral gain ($K_b$), and generating the dynamic gain $K_{b_{dyn}}$, as shown in equation (12):

$$Dyn_{gain(b)} = (1 + \varepsilon_s K_s + \varepsilon_i K_i) K_b \tag{12}$$

$$K_{b_{dyn}}(\varepsilon) = \begin{cases} K_b & \text{if } Dyn_{gain(b)} \leq K_b \\ Dyn_{gain(b)} & \text{if } K_b < Dyn_{gain(b)} < K_{b_{max}} \\ K_{b_{max}} & \text{if } Dyn_{gain(b)} \geq K_{b_{max}} \end{cases}$$

where $K_b$ corresponds to the minimum proportional gain. The example dynamic PLL which uses equations (11) and (12) is also depicted in a flowchart 600 shown in FIG. 6. In some examples, using a dynamic PLL gain, the position error may be reduced in steady-state operation, and the system performance and stability may be enhanced in a transient response.

Figure 6:
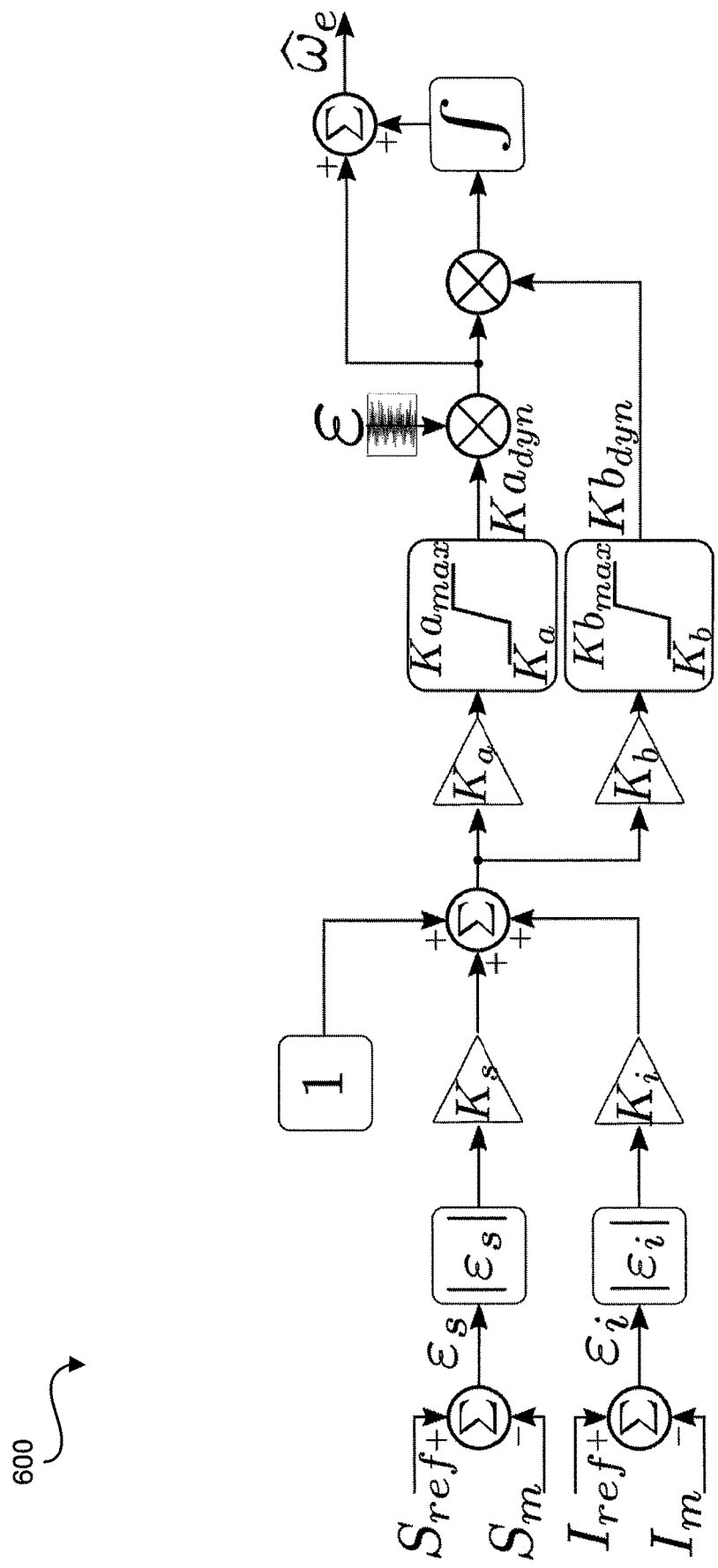
FIG. 6 shows a schematic flowchart of an example dynamic PLL, in accordance with a non-limiting implementation of the present specification.

Referring to FIG. 6, in some examples, the speed error ($\varepsilon_s$) and current error ($\varepsilon_r$) may be calculated using the difference from the reference and measured values of the speed and current, respectively. After the error calculation, the absolute values of the errors are determined. The speed error is multiplied by the speed gain ($K_s$) and the current error is multiplied by the current gain ($K_i$), and they are both added to one, which gives the dynamic gain calculation ($1+\varepsilon_s K_s + \varepsilon_i K_i$), considering in this equation that the error values are the absolute values.

The dynamic gains are them multiplied by the proportional ($K_a$) and integral ($K_b$) gains, respectively. A function limiter is used to limit the maximum and minimum values of the gain, where the minimum value of proportional dynamic gain is $K_a$, and the maximum value of the proportional gain is $K_{a_{max}}$. A similar limit is applied to the integral gain, where minimum and maximum dynamic gains are $K_b$ and $k_{b_{max}}$, respectively. The output of the function limiter block is the dynamic proportional and dynamic integral gains. The gains are applied to the PI loop, where the transfer function may be defined based on the error signal as equation (12.1):

$$PI(s) = \frac{K_{a_{dyn}} K_{b_{dyn}}}{s} + K_{a_{dyn}} \tag{12.1}$$

The error ($\varepsilon$) is multiplied by the dynamic proportional gain ($K_{a_{dyn}}$) and the dynamic integral gain ($K_{b_{dyn}}$), and it is integrated ($1/s$). The integration is added to the error multiplied by the dynamic proportional gain, and the output of the block is the estimated speed.

In some examples, the gains of the dynamic PLL may be manually tuned to improve the system dynamics, and they may be directly related to the speed PI gains. In some examples, the speed PI (proportional integral) gains may be part of the system speed loop control. Moreover, in some examples, two main loops may be used in motor control methods, namely: the speed loop, which attempts to regulate the speed using the information of the speed reference and the actual speed of the machine (i.e. rotor of the motor), and the current loop, which regulates the current of the machine (i.e. the motor).

In some examples, the gains may be manually tuned by checking the response of the system in different conditions. Furthermore, in some examples, the manual tuning may be done considering the system stability for different gains. For the steady state, a determination may be made as to which values of $K_a$ and $K_b$ provide an acceptable response of position estimation, and how much the gains should be increased to provide a stable operation under very hard transient responses. The gains my be manually tuned, in a manner that maintains or preserves the stability of the system. Moreover, in some examples, the gains may be selected offline, where the selection method may be manual, algorithmic, or based on a variety of optimization methods.

The weight of the speed error may be higher than the current error. In some examples, if the bandwidth of the speed loop is low, the machine (i.e. motor) may respond slowly to change in speeds, and the gains of the PLL may be reduced. Conversely, if the machine changes speed rapidly, the gains of the PLL may need to be increased to respond more quickly to the system dynamics. The current error is included in the model because the acceleration response may be reduced under load conditions. Similar dynamic gain approaches may be applied to both the proportional and integral gains of the PLL.

An example calculation of the dynamic proportional gain is shown below:
Assuming that the $K_a=20$, $K_{a_{max}}=50$, $K_s=0.05$, and $K_i=0.005$:
If $\varepsilon_s=0$ RPM and $\varepsilon_i=0$ A:

$Dyn_{gain(a)}=(1+0+0)*20=20$, since $20<K_a$, $K_{a_{dyn}}(\varepsilon)$
$=K_a=20$ If $\varepsilon_s=10$ RPM and $\varepsilon_i=10$ A:

$Dyn_{gain(a)}=(1+10*0.05+10*0.005)*20=31$, since
$K_a<31<K_{a_{max}}$, $K_{a_{dyn}}(\varepsilon)=Dyn_{gain(a)}=31$ If $\varepsilon_s=35$ RPM and $\varepsilon_i=10$ A:

$Dyn_{Kp}=(1+35*0.05+10*0.005)*20=56$, since
$56>K_{a_{max}}$, $K_{a_{dyn}}(\varepsilon)=K_{a_{max}}=50$ The above example calculation shows that the gain of the dynamic PLL, for example the proportional gain, may be dynamic as a function of the speed error $\varepsilon_s$. As the speed error grows, so does the gain, thereby allowing the dynamic PLL to more quickly or accurately converge to and determine the operating parameters of the electric motor. Examples of such operating parameters may include the rotor position, the speed of the rotor, and the like.

Figure 7:
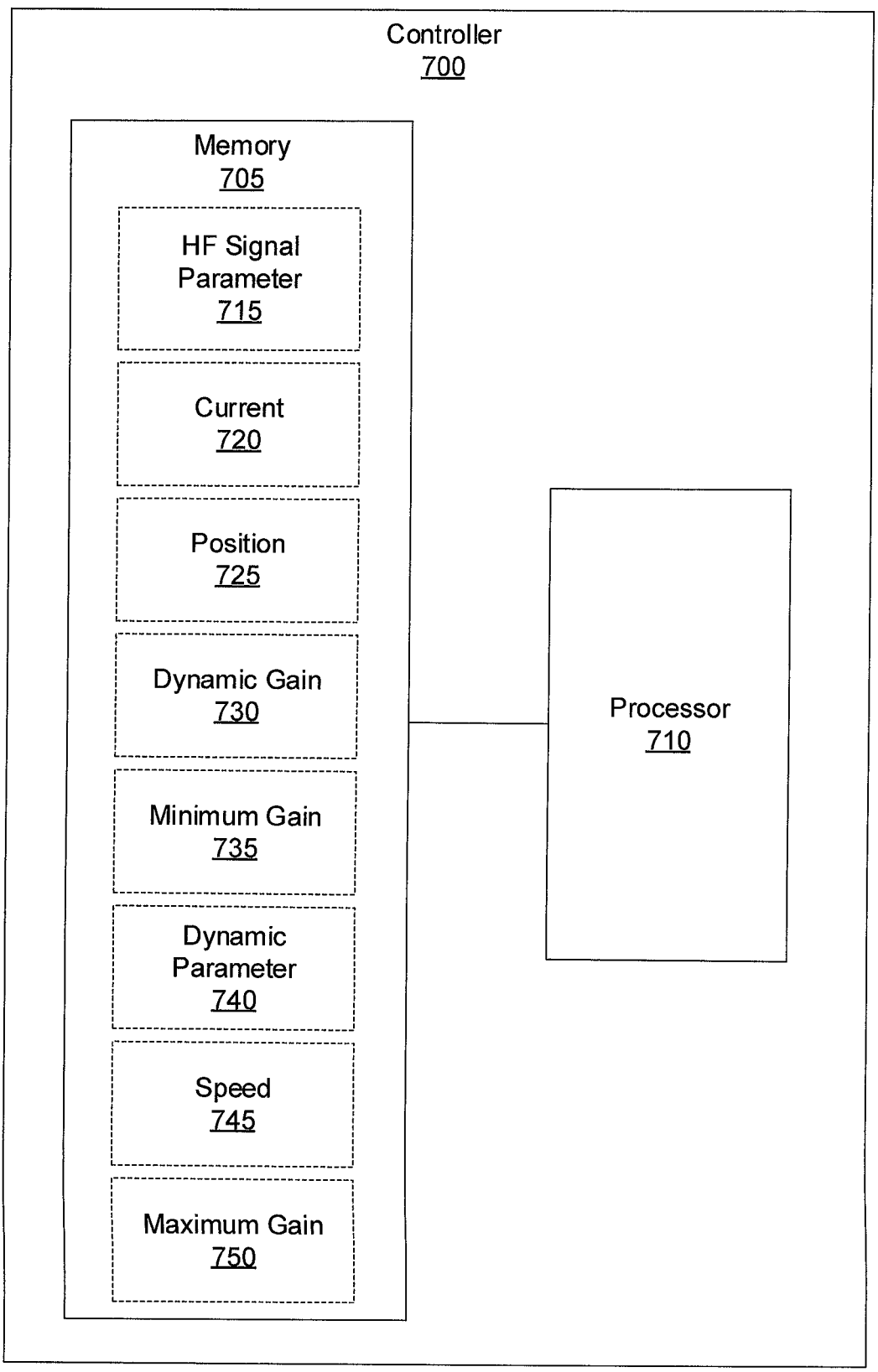
FIG. 7 shows a block diagram of an example controller, in accordance with a non-limiting implementation of the present specification.

Turning now to FIG. 7, a schematic representation is shown of example controller 700, which may comprise a memory 705 in communication with a processor 710. In some examples, controller 700 may function as a motor controller for controlling an elector motor. Moreover, in some examples, controller 700 may have the features or perform the functions associated with method 500 and the other related methods described herein.

Memory 705 may comprise a non-transitory machine-readable storage medium that may be any electronic, magnetic, optical, or other physical storage device that stores executable instructions. The machine-readable storage medium may comprise, for example, random access memory (RAM), read-only memory (ROM), electrically-erasable programmable read-only memory (EEPROM), flash memory, a storage drive, an optical disc, and the like. The machine-readable storage medium may be encoded with executable instructions.

Processor 710, in turn, may include a central processing unit (CPU), a graphics processing unit (GPU), a microcontroller, a microprocessor, a processing core, a field-programmable gate array (FPGA), or similar device capable of executing instructions. Processor 710 may cooperate with the memory 705 to execute instructions. In some examples, controller 700 or one or more of its components may be implemented using cloud computing, virtual or virtualized computing modules, distributed computing, one or more servers, and the like.

Processor 710 may cause a HF signal to be injected into an electric motor. This HF signal may have a HF signal parameter 715. Examples of such a HF signal parameter may include the voltage of the HF signal, the frequency of the HF signal, and the like. Processor 710 may also receive a measured value of a current 720, which current may be generated by the electric motor in response to the HF signal. In some examples, processor 710 may cause this current to be measured, or may measured this current itself.

In addition, processor 710 may estimate a position 725 of the rotor of the electric motor relative to the stator of the electric motor based on current 720. In some examples, processor 710 may carry out this estimation in a manner similar to that described in relation to method 500. In some examples, processor 710 may use or implement a PLL in estimating position 725.

This PLL may have a dynamic gain 730. This dynamic gain may be set to a minimum gain 735 if a dynamic parameter 740 is equal to or smaller than minimum gain 735. Dynamic parameter 740 may be based on current 720 and speed 745 of the rotor of the electric motor relative to the stator or of the electric motor. Moreover, dynamic gain 730 may be set to the value of dynamic parameter 740 if dynamic parameter 740 is greater than minimum gain 735 and less than a maximum gain 750. Furthermore, dynamic gain 730 may be set to maximum gain 750 if dynamic parameter 740 is equal to or greater than maximum gain 750. In this manner, dynamic gain 730 may be dynamic as a function of dynamic parameter 740, which dynamic parameter 740 is in turn a function of current 720 and speed 745 associated with the electric motor. The calculation of dynamic gain 730 may be similar to the corresponding calculation described in relation to method 500.

Moreover, in some examples, processor 710 may further obtain a reference input current being sent to the electric motor. In some examples, processor 710 may sense or measure the reference input current. Moreover, in some examples, processor 710 may retrieve from storage or otherwise receive a value or measure of the reference input current. Moreover, in some examples, processor 710 may calculate dynamic parameter 740 based on a current error and a speed error.

Processor 710 may calculate the current error based on the difference between current 720 and the reference input current. Moreover, processor 710 may calculate the speed error based on a difference between an estimated speed of the rotor and a reference speed associated with the rotor. In addition, in some examples, processor 710 may calculate dynamic parameter 740 using the following equation: dynamic parameter=$(1+\varepsilon_s K_s+\varepsilon_i K_i)K_{min}$, where $K_{min}$ is the minimum gain, $K_s$ is a speed gain, and $K_i$ is a current gain. The calculation of the dynamic parameter may be similar to the corresponding calculations described in relation to method 500 and its related methods.

It is also contemplated that in some examples, controller 700 may comprise a PLL module. Moreover, in some examples, this PLL module may comprise one or more components within controller 700. For example, the PLL module may comprise electronic components, circuits, or microprocessors in controller 700. Furthermore, in some examples, the PLL module may be a functional module of controller 700. For example, the PLL module may comprise a set of instructions stored in memory 705 and executed by processor 710. In addition, it is contemplated that in some examples the PLL module may comprise a combination of physical components and computer- or machine-readable instructions.

Figure 8:
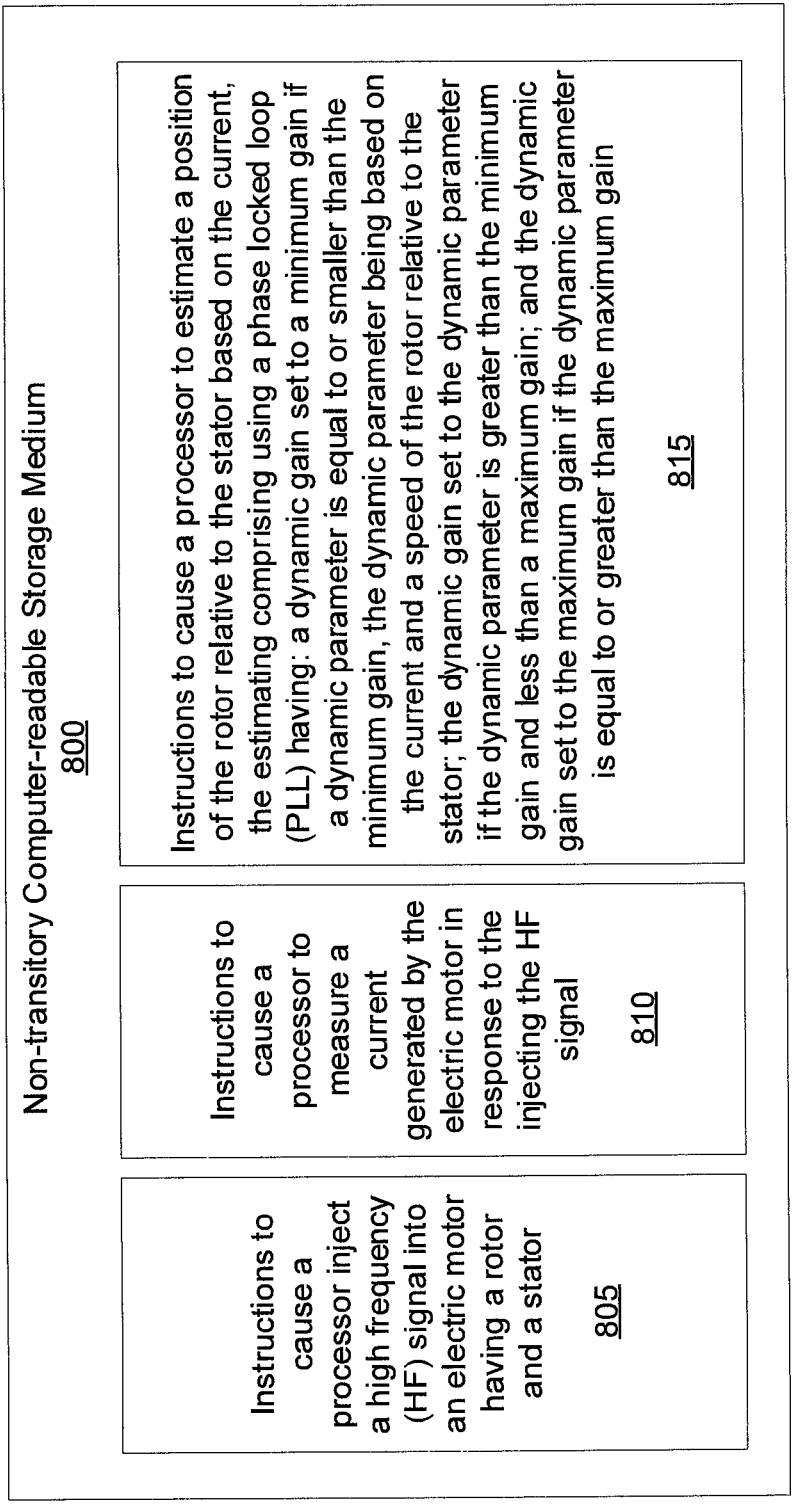
FIG. 8 shows a block diagram of an example computer-readable storage medium, in accordance with a non-limiting implementation of the present specification.

Turning now to FIG. 8, a non-transitory computer-readable storage medium (CRSM) 800 is shown, which CRSM 800 comprises instructions executable by a processor. The CRSM may comprise any electronic, magnetic, optical, or other physical storage device that stores executable instructions. The instructions may comprise instructions 805 to cause a processor to inject a HF signal into an electric motor having a rotor and a stator.

Moreover, CRSM 800 may comprise instructions 810 to cause a processor to measure, or obtain a measurement of, a current generated by the electric motor in response to injecting the HF signal. Moreover, CRSM 800 may comprise instructions 815 to cause a processor to estimate a position of the rotor relative to the stator based on the current. This estimation may comprise using a PLL. The PLL may have a dynamic gain set to a minimum gain if the dynamic parameter is equal to or smaller than the minimum gain. This dynamic parameter may be based on the current and a speed of the rotor relative to the stator. The dynamic gain may be set to the dynamic parameter if the dynamic parameter is greater than the minimum gain and less than a maximum gain. Moreover, the dynamic gain may be set to the maximum gain if the dynamic parameter is equal to or greater than the maximum gain.

In some examples, CRSM 800 may further comprise instructions to cause a processor to obtain a reference input current being sent to the electric motor. In such examples, CRSM 800 may comprise instructions to cause a processor to calculate the dynamic parameter based on a current error and a speed error. The instructions may cause the processor to calculate the current error based on a difference between the current and the reference input current. Furthermore, the instructions may cause the processor to calculate the speed error based on a difference between an estimated speed of the rotor and a reference speed associated with the rotor. In addition, in some examples, CRSM 800 may comprise instructions to cause a processor to calculate the dynamic parameter using the following equation: dynamic parameter=$(1+\varepsilon_s K_s+\varepsilon_i K_i)K_{min}$, where $K_{min}$ is the minimum gain, $K_s$ is a speed gain, and $K_i$ is a current gain. The instructions stored in CRSM 800 may cause a processor or system to have the features or perform the functions similar to those described herein in relation to method 500 and its associated methods.

As discussed above, in some examples the low-speed mode of sensorless motor control may comprise injecting a HF signal into the motor, and measuring the current generated by the motor as a result of the HF signal injection. This current, in turn, may be used to estimate or determine the position or speed of the rotor relative to the stator. Moreover, in some examples, the higher the voltage or frequency of the HF signal is, the higher may be the accuracy of the position or speed estimation. In some such examples, the injection of the HF signal having a relatively high voltage or frequency may cause the electric motor to emit acoustic noise.

In some circumstances, this acoustic noise may become audible to an operator of the system incorporating the electric motor, or to bystanders. This acoustic noise may become especially noticeable if the motor is at zero speed (i.e. in standby mode) or operating at relatively low speeds.

For example, under high load conditions, components of the motor may produce operating noises that may reduce the perceived acoustic noise produce by the HF injection (although the amplitude of the produced acoustic noise may remain the same). At low or zero speeds, these operating noises may be small or zero, which cause the acoustic noise generated by the HF injection to become more noticeable relative to the operating noises.

Figure 9:
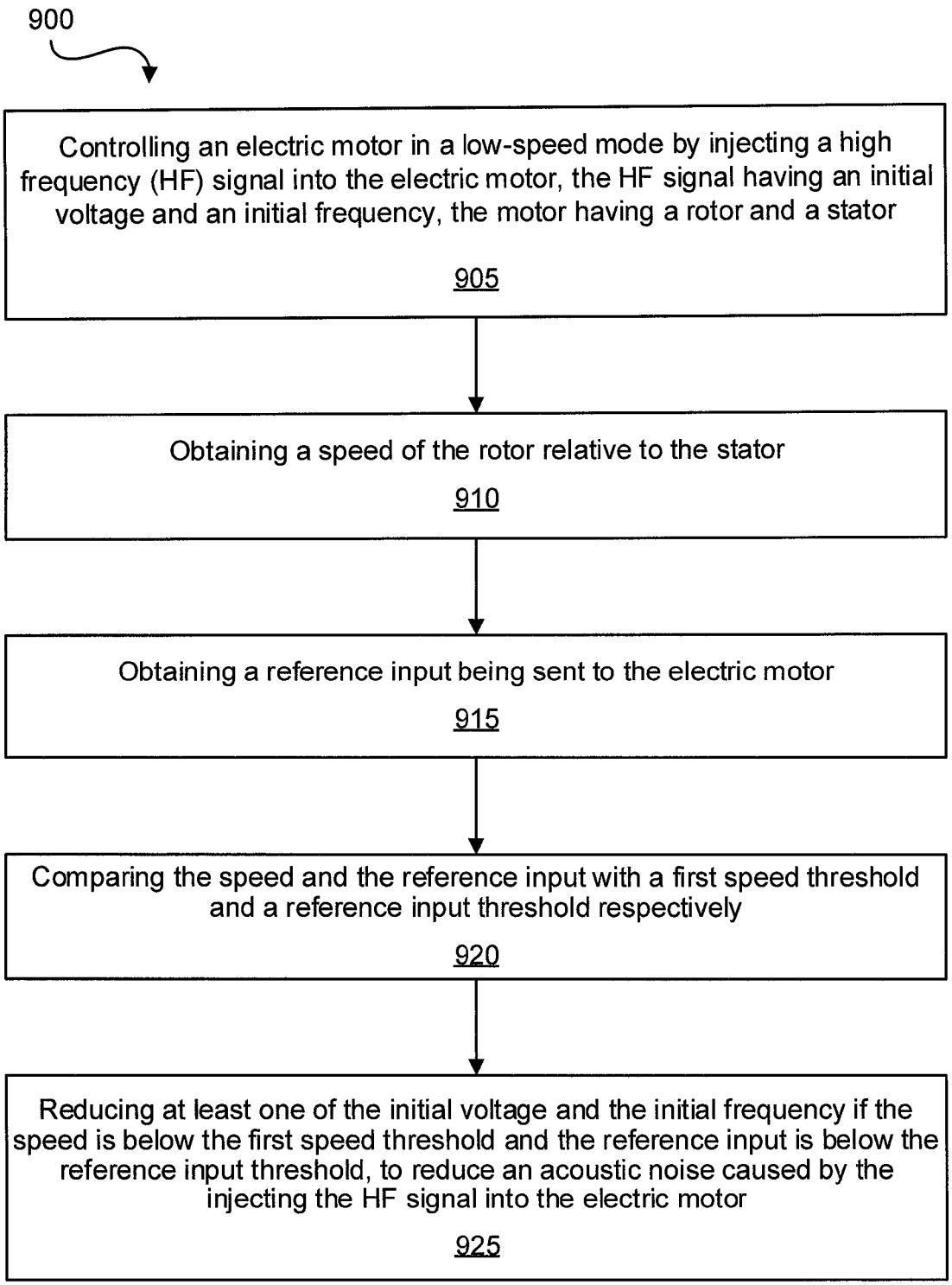
FIG. 9 shows a flowchart of another example method, in accordance with a non-limiting implementation of the present specification.

Injecting an HF signal having a relatively higher voltage or frequency may provide relatively larger improvements to speed/position estimation when the electric motor is under relatively higher load. When the load is relatively small or zero, HF signals having relatively lower voltage or frequency may also allow for position/speed estimation of adequate accuracy. In order to reduce the acoustic noise generated or the electric power consumed by the electric motor, in the low-speed mode the voltage or frequency of the HF signal may be reduced when one or more of the speed of or the load applied to the motor are below a given threshold. FIG. 9 shows a flowchart of an example method 900 which may be used to reduce the acoustic noise generated by an electric motor controlled in the low-speed mode.

At box 905, the electric motor may be controlled in the low-speed mode by injecting a HF signal into the electric motor. The HF signal may have an initial voltage and an initial frequency. At box 910, a speed of the rotor relative to the stator may be obtained. In some examples, injecting the HF signal into the electric motor may cause the electric motor to generate a corresponding current, which current may then be used to estimate the speed of the rotor. Moreover, in some examples, the speed of the rotor may be estimated in a manner similar to that described in relation to FIGS. 1-8. Furthermore, in some examples, obtaining the speed may include calculating the speed in a manner similar to that described in relation to FIGS. 1-8.

In addition, in some examples, obtaining the speed may include receiving the speed from another component or system which measures, senses, or calculates the speed. Moreover, in some examples, obtaining the speed may comprise retrieving or otherwise receiving the speed from a system, component, or storage which stores the speed.

At box 915 a reference input being sent to the electric motor may be obtained. In some examples, the reference input may be an indication of the output or operation demanded of the electric motor. For example, in cases where the electric motor is used in a vehicle, the reference input may comprise the throttle input provided to the vehicle by an operator of the vehicle. Moreover, in some examples, the throttle input may comprise the amount of current directed from a power source towards the motor to actuate the motor. In addition, in some examples, the reference input may be measured or may otherwise be received from a system or component that measures or stores an indication of the level or value of the reference input.

At box 920, the speed of the rotor and the reference input may be compared with a first speed threshold and a reference input threshold respectively. At box 925, at least one of the initial voltage and the initial frequency may be reduced if the speed is below the first speed threshold and the reference input is below the reference input threshold. Such a reduction in the initial voltage or initial frequency may allow for a reduction in the acoustic noise caused or generated by the injection of the HF signal into the electric motor.

In some examples, the first speed threshold and the reference input threshold may be chosen based on operating conditions of the electric motor where acoustic noise generated by the motor as a result of the HF signal injection may be especially noticeable (for example, when the motor is operating at low-speed or is in standby at zero speed), or when the motor is not being required to operate under high load or to produce relatively high torques. In some examples, the first speed threshold may be about zero, and the reference input threshold may also be about zero.

Moreover, in some examples, the initial voltage may comprise a maximum voltage. In some examples, this maximum voltage may comprise the maximum voltage of the HF signal that may be safely or practically used in the low-speed mode of sensorless motor control. In such examples, reducing at least one of the initial voltage and initial frequency may comprise reducing the maximum voltage if the speed is below the first speed threshold and the reference input is below the reference input threshold. Furthermore, in some examples, under such conditions the maximum voltage may be reduced to a minimum voltage. In some examples, this minimum voltage may comprise the minimum voltage of the HF signal that would allow the motor to continue to be controlled in the low-speed mode. In other words, the minimum voltage may comprise a minimum voltage of the HF signal that would allow position/speed of the rotor to be determined using the current generated by the motor as a result of the HF signal injection. Reducing the voltage of the HF signal from the maximum voltage to the minimum voltage may reduce the amount of acoustic noise generated by the motor as a result of the HF signal injection as well as reducing the amount of power used for HF signal injection.

In addition, in some examples, the initial voltage may comprise a maximum voltage. In some such examples method 900 may further comprise maintaining the maximum voltage if the speed is below the first speed threshold and the reference input is above the reference input threshold. In examples where the reference input is above the reference input threshold, the torque that is being demanded from the electric motor by the reference input may be high enough such that maintaining the voltage of the HF signal at the maximum voltage may become significant to maintaining the accuracy of position/speed estimation using the HF signal injection.

Moreover, in some examples, the initial voltage may be below the maximum voltage for the HF signal. In some such examples, method 500 may further comprise additional steps if the speed is below the first speed threshold and the reference input is above the reference input threshold. A determination that the reference input is above the reference input threshold may prompt an increase in the voltage of the HF signal to allow for the determination of position/speed of the rotor with increased accuracy. In some examples, these additional steps may comprise increasing initial voltage to the maximum voltage, and maintaining the initial voltage at the maximum voltage for a given time period. After the given time period, the electric motor may be controlled in the low-speed mode by injecting the HF signal into the electric motor, which HF signal may have the maximum voltage.

As described above in relation to FIGS. 1-8, in some examples the low-speed mode of sensorless motor control uses a PLL and other functional components that may need time to produce estimates of position/speed of the rotor that accurately converge to the actual position or speed of the rotor. To allow for this convergence, once the voltage of the HF signal is increased to the maximum voltage, the voltage may be maintained at the maximum voltage for the given time to allow for this convergence to take place. Once the convergence has had enough time to take place, the low-speed mode may produce more accurate position/speed estimates, which in turn may be used to control the electric motor.

It is also contemplated that in some examples, instead of or in addition to reducing the voltage of the HF signal, the frequency of the HF signal may be adjusted to adjust the acoustic noise generated by the electric motor as a result of the HF signal injection. In some such examples, reducing at least one of the initial voltage and initial frequency may comprise reducing the initial frequency if the speed is below the first speed threshold and the reference input is below the reference input threshold. In such examples, the motor may be in idle or stand by at or near zero speed, or a relatively low speed or torque may be demanded from the motor by the input reference. As such, the frequency of the HF signal may be reduced to reduce the acoustic noise or to reduce the amount of power used to generate the HF signals used for the low-speed mode of motor control.

Furthermore, in some examples, reducing the initial frequency may comprise determining a difference between the reference input and the reference input threshold, and reducing the initial frequency by a frequency reduction being a non-decreasing function of the difference. Moreover, in some examples, the non-decreasing function may comprise a stepwise function, and reducing the initial frequency may comprise reducing the initial frequency by the frequency reduction determined by the stepwise function of the difference. An example of such a stepwise function is shown in FIG. 12A.

Figure 12A:
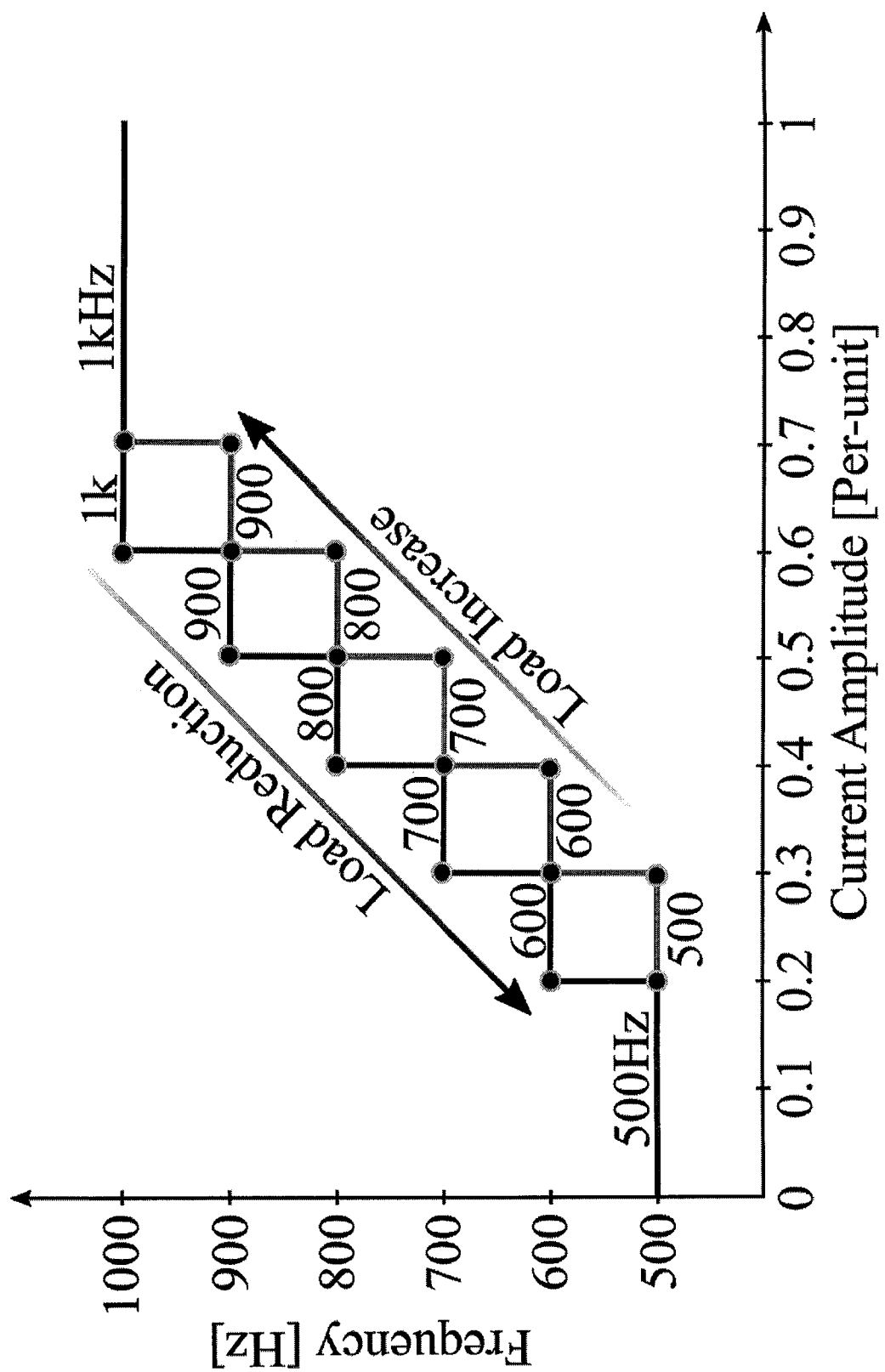
FIG. 12A shows an example stepwise function for changing frequency of a HF signal, in accordance with a non-limiting implementation of the present specification.

As shown in the example of FIG. 12A, a 0.1 unit change in the reference input corresponds to 100 Hz stepwise change in the frequency of the HF signal. In other words, a 0.1 unit increase in the reference current is accompanied by, or corresponds to, a 100 Hz stepwise increase in the frequency of the HF signal up to a maximum frequency of 1 kHz. Similarly, a 0.1 unit decrease in the reference current is accompanied by, or corresponds to, a 100 Hz stepwise decrease in the frequency of the HF signal up to a minimum frequency of 500 Hz. While FIG. 12A shows 100 Hz stepwise changes corresponding to each 0.1 unit change in the reference input, it is contemplated that in some examples the frequency changes may be according to a different scheme or function, or may range between a different frequency maximum or a different frequency minimum.

The steps or bands of the stepwise function reduce constant or continuous changes in the frequency (compared for example to a continuous non-decreasing function), which constant or continuous frequency changes may reduce or undermine the stability of the low-speed mode and the corresponding motor control and operation. As shown in FIG. 12A, the frequency of the HF signal may be decreased in successive steps as the reference input decreases. Similarly, the frequency of the HF signal may be increased in successive steps as the reference input increases.

As the speed of the rotor increases, the digital filters used in the HF signal-based low speed mode may cause phase delays and deviations in the estimated rotor position from the real position of the rotor. Moreover, as the speed of the rotor increases, the motor may generate more back EMF, and the high-speed mode of sensorless motor control using the back EMF may become more practicable. As such, the sensorless motor control may be transitioned between HF signal-based low-speed mode and the back EMF-based high-speed mode based on the speed of the rotor.

To increase the likelihood of smooth transitions between the two motor control modes, and to maintain a good dynamic response and system stability, a transition method may be implemented for transitioning between the two modes. Unified wide-speed range techniques may be used, but they may be too complex to implement and may be computationally intensive. The transition methods described herein may reduce the complexity or computational intensity challenges of transitioning between high-speed back EMF and low-speed HF signal injection motor control modes.

To enhance stability, transition methods may be implemented to control or govern transitions between low and high speed sensorless modes. Such transition methods may contribute to relatively low error rates and sufficient synchronization to reduce the likelihood of control failures. Moreover, in some examples, thresholds may be implemented to maintain the position and speed estimation in one sensorless control mode at a time, thereby reducing the number or frequency of changes between control modes.

Referring back to method 900, in some examples, method 900 may further comprise controlling the electric motor using a high-speed mode based on a back EMF generated by the electric motor if the speed is equal to or greater than about the first speed threshold. In such examples, this first speed threshold may also be described as the low-speed mode to high-speed mode transition speed threshold. In addition, in some examples, this first speed threshold may comprise the minimum speed at which the high-speed mode using back EMF becomes practicable plus a constant, a delta, or a band. In other words, the first speed threshold may be larger than the minimum speed at which the high-speed mode using back EMF is practicable.

Setting the first speed threshold to be larger than the minimum speed for the high-speed mode may allow transitions from the low-speed to the high-speed mode to take place when the speed is well within the range for the back EMF method to be practicable and accurate. Moreover, it is also contemplated that in some examples the first speed threshold may be set at the minimum speed at which the high-speed mode using back EMF becomes practicable.

In some examples, if the speed is equal to or greater than a second speed threshold, the low-speed mode may be disabled by discontinuing the injection of the HF signal into the electric motor. In some examples, the second speed threshold may be larger than the first speed threshold. When the speed reaches or exceeds the second speed threshold, the speed of the motor may be well within the speed range for the back EMF high-speed mode and relatively far from the minimum speed at which the back EMF method is practicable. At this second speed threshold, the HF signal may be discontinued to save power. In some examples, discontinuing the HF signal may also reduce the acoustic noise generated by the electric motor as a result of the HF signal injection.

In addition, in some examples, if after disabling the low-speed mode the speed of the rotor drops below a third speed threshold, the low-speed mode which uses the HF signal injection may be used for controlling the electric motor. In some examples, the third speed threshold may be lower than the first speed threshold. Furthermore, in some examples, the third speed threshold may be the minimum rotor speed at which the high-speed mode relying on back EMF becomes practicable.

In such examples, the first speed threshold at which the sensorless motor control switches from low-speed to high-speed may be a higher speed threshold than the third speed threshold at which the sensorless motor control switches from high-speed to low-speed. The first and third speed thresholds may be offset by the delta or band described above. This band may be referred to as a hysteresis band.

Offsetting the first and third speed thresholds in this manner may reduce the frequency of transitions between the high-speed and the low-speed modes thereby allowing the sensorless motor control to operate in a given mode for longer periods.

In some examples, the first speed threshold may be about 2% larger than the third speed threshold, and the second speed threshold may be about 5% larger than the third speed threshold. It is also contemplated that in some examples, different relative values of the first second and third speed thresholds may also be used.

Figure 10:
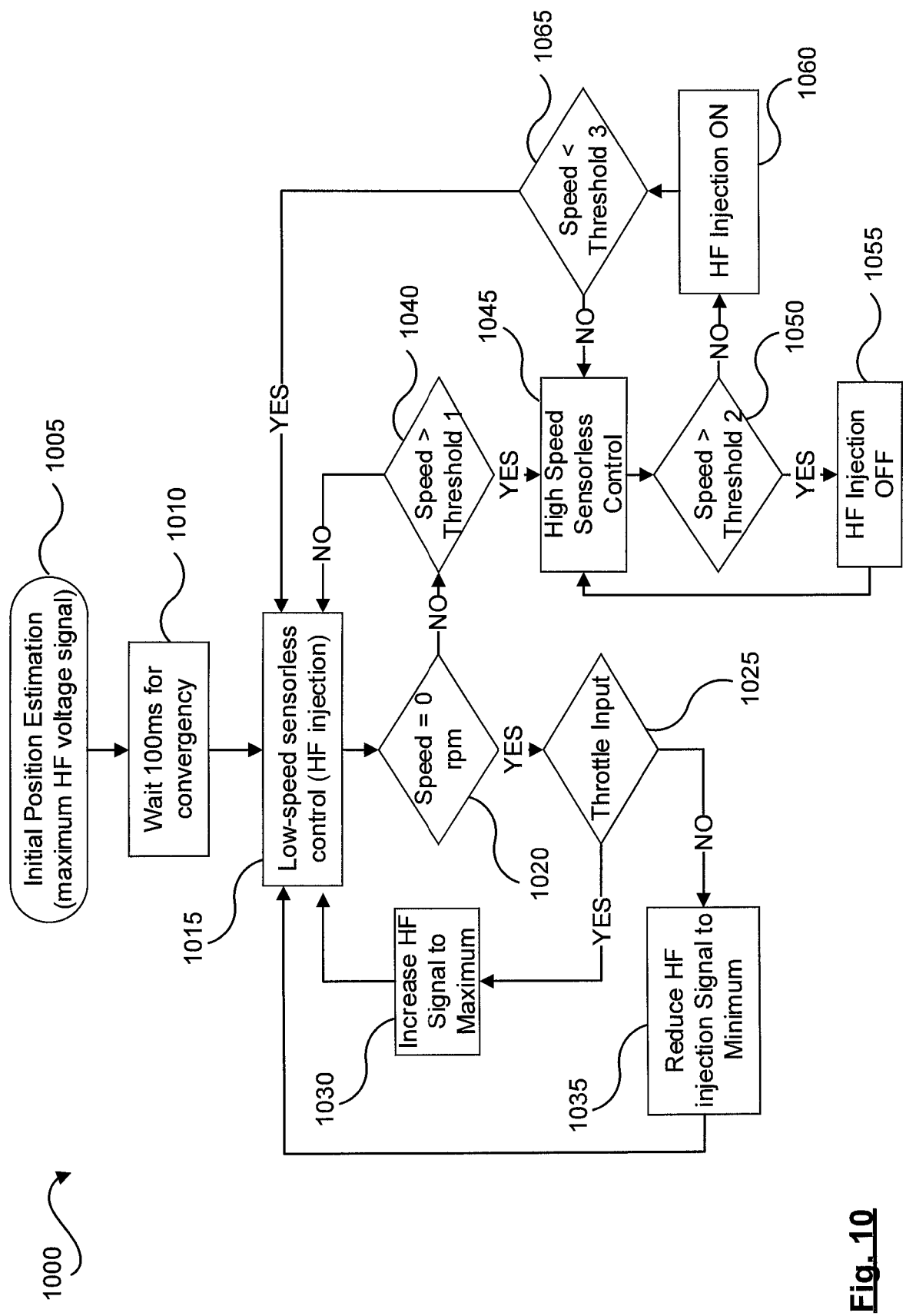
FIG. 10 shows a flowchart of yet another example method, in accordance with a non-limiting implementation of the present specification.

Turning now to FIG. 10, a flowchart is shown of an example method 1000. Method 1000 may be an example or a variation of method 900. Moreover, in some examples, method 900 may have the features or functions described in relation to method 1000. At box 1005 the low-speed mode for sensorless motor control may be used. The low-speed mode may use injection of a HF signal to estimate the position of the rotor. In some examples, this estimation may be conducted in a manner similar to that described herein in relation to FIGS. 1-8. At box 1005, the voltage of the HF signal may be set to the maximum voltage.

At box 1010, a given period of time may be allowed to pass to allow the estimated position using the low-speed mode to converge. In some examples, this period of time may be about 100 ms, and the like. It is contemplated that in some examples, a period of time may be allowed to pass to allow for convergence, and that the period of time may be different than 100 ms. At box 1015, the low-speed mode using injection of the HF signal may be ready to use to estimate the position/speed of the rotor and to control the electric motor. At box 1020 a determination may be made of whether the speed of the rotor is close to or at zero. If the speed is determined to be close to zero, then the method moves to box 1025 wherein a determination is made as to the throttle input. It is also contemplated that in examples where the electric motor is not used within a vehicle, instead of a throttle input a reference input to the motor may be obtained or determined, which reference input may be different than a throttle input.

If there is throttle input, then the motor is producing some torque or the motor is under load. To maintain the performance of the low-speed mode and the accuracy of the position/speed determination using this mode, the voltage or frequency of the HF signal may be increased to the maximum at box 1030. In situations where the voltage or frequency of the HF signal is already at its maximum at box 1025, the voltage or frequency of the HF signal may be maintained at the maximum at box 1030.

If there is no throttle input, at box 1035 the voltage or frequency of the HF signal may be reduced. In some examples, the voltage or frequency of the HF signal may be reduced to a minimum. Moreover, in some examples, this minimum may be a minimum voltage or frequency at which the low-speed mode may provide estimates of position/speed of acceptable accuracy.

Returning to box 1020, if the speed of the rotor is greater than zero, method 1000 may move to box 1040. At box 1040 a determination may be made as to whether the speed of the rotor is greater than the first speed threshold. It is also contemplated that in some examples, at box 1040 a determination may be made as to whether the speed of the rotor is greater than or equal to the first speed threshold.

If the determination at box 1040 is affirmative, the method moves to box 1045 wherein the high-speed mode using back EMF is turned on to control the electric motor. At box 1050 a determination is made as to whether the speed is greater than a second speed threshold. If the speed is determined to be greater than the second speed threshold, then the HF signal injection may be turned off at box 1055 to save power and the method may return back to box 1045. It is also contemplated that in some examples the method may move from box 1050 to box 1055 if the speed is equal to the second speed threshold.

If, on the other hand, at box 1050 it is determined that the speed is not greater than the second speed threshold, the HF signal injection into the motor may be continued as indicated in box 1060. If the speed drops below a third speed threshold as assessed in box 1065, the high-speed mode using back EMF may no longer be practicable, and the low-speed mode may be reactivated and the method may move back to box 1015. If, on the other hand, at box 1065 the speed remains at or above the third speed threshold, the method may continue to box 1045 and the high-speed mode may continue to be used as the mode for motor control.

Figure 11:
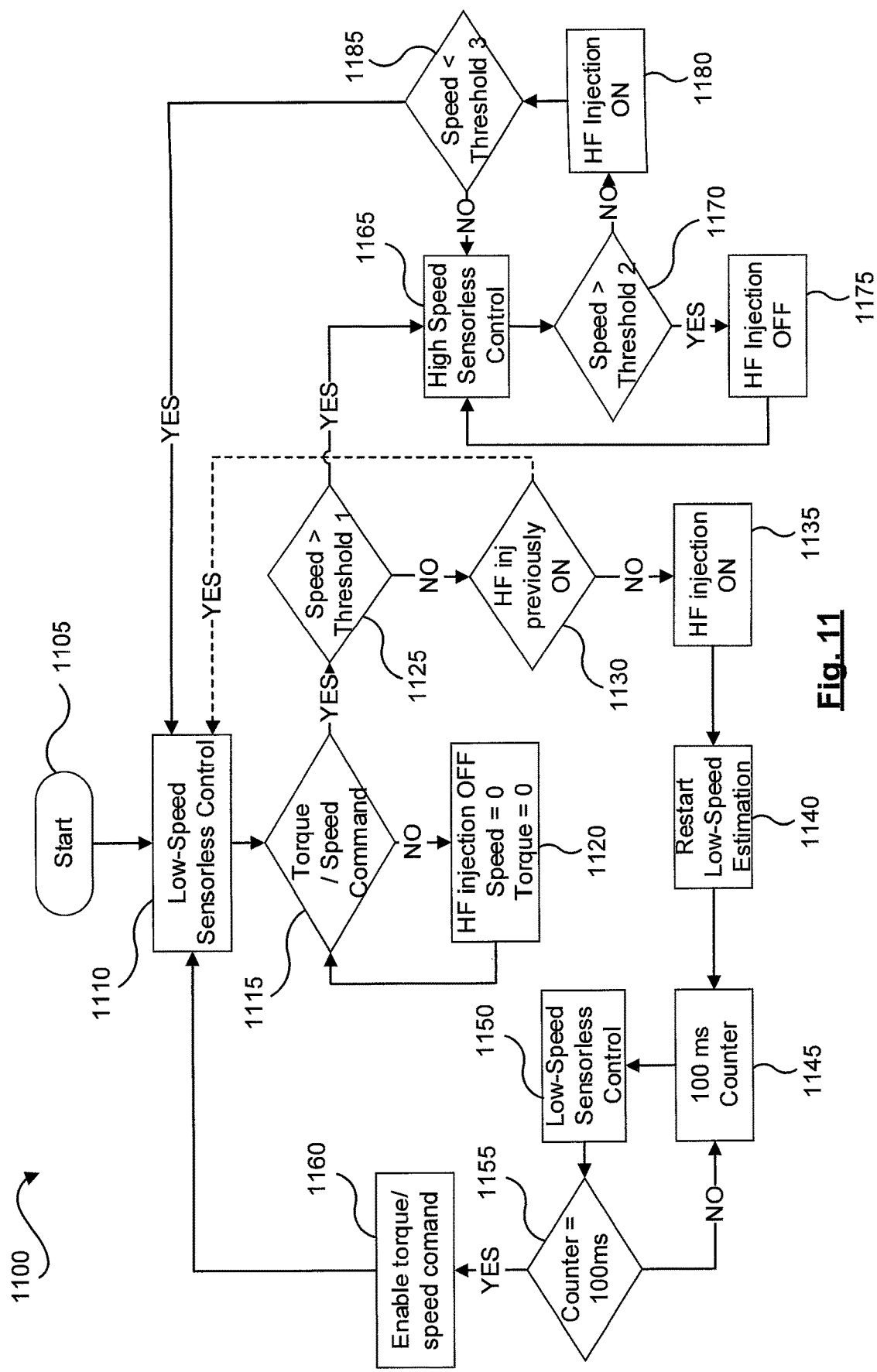
FIG. 11 shows a flowchart of yet another example method, in accordance with a non-limiting implementation of the present specification.

Turning now to FIG. 11, a flowchart is shown of an example method 1100 which may be used to control an electric motor. In some examples, method 1100 may be an example of or a variation of method 900. It is contemplated that in some examples, method 900 may have the features or functions described herein in relation to method 1100. At box 1105 method 1100 may start. At box 1110, method 1100 may start in the low-speed mode for sensorless control of an electric motor.

At box 1115 a determination may be made as to whether there is a reference input to demand torque or speed from the electric motor. If the determination is negative, the method moves to box 1120 at which the injection of the HF signal is turned off. In some examples, the HF signal may be maintained in the off state if the HF signal injection is already off. Moreover, in some examples, at box 1120 the HF injection may be turned off or maintained in the off state if the speed is about zero and the torque produced by the motor is also about zero.

If the conditions in box 1120 are met, the method may return back to box 1115. The loop between boxes 1115 and 1120 may allow for monitoring the reference input which may affect torque, speed, or position of the rotor relative to the stator. If at box 1115 it is determined that there is a reference input that is nonzero, then the method may move to box 1125 at which box a determination is made as to whether the speed of the rotor is greater than a first speed threshold. It is also contemplated that in some examples the determination at 1125 may also include a determination of whether the speed is equal to the first speed threshold.

If the determination at box 1125 is negative, the method may move to box 1130 at which box a determination may be made as to whether the high-frequency signal injection is on. If it is determined at box 1130 that the HF signal injection is already on, method 1100 may move back to box 1110 at which the low-speed mode may be ready or used to control the electric motor. If, on the other hand, at box 1130 is determined that the HF signal injection is not already on, method 1100 may move to box 1135 at which box the HF signal injection may be turned on.

At box 1140, estimation of the position/speed of the rotor using the HF signal injection may be started or restarted. At box 1145, the HF signal injection and the position/speed estimation may be conducted for a given period of time to allow for the position/speed estimation to converge. In some examples, this period of time may be about 100 ms, and the like.

If sufficient time has passed to allow the position/speed estimation to converge, method 1100 may move to the low-speed mode for sensorless control at box 1150. At box 1155 a further period of time may be allowed for the low-speed mode and its estimated position/speed to converge and stabilize. In some examples, the period of time in box 1155 may be about 100 ms, and the like. If the time period or counter criterion of box 1155 is satisfied then the method may move onto box 1160 at which a reference input may be received while the electric motor is being controlled using the low-speed mode. In some examples, this reference input may comprise a speed or torque demand or command sent to the electric motor.

It is also contemplated that in some examples, boxes 1145 and 1155 may work together to implement a single time period of about 100 ms. In other words, from the time the HF signal injection starts at box 1140 to the time the low-speed mode and its position/speed estimates are sufficiently converged to allow for full control of the motor and for receiving reference inputs at box 1160, a single 100 ms time period may be provided to allow for convergence of the position/speed estimates provided by the low-speed mode. In some examples, the time period in boxes 1145 or 1155 may be different than 100 ms, depending on the electrical and mechanical parameters of the motor under control, and upon the accuracy, linearity, and noise characteristics of the current sensors in use by the controller.

Returning to box 1125, if the speed is greater than equal to the first speed threshold, method 1100 may move to box 1165 where the sensorless motor control may switch from the low-speed mode to the high-speed mode. In other words, at box 1165 the high-speed mode for sensorless control of the motor may be activated or turned on. As discussed above, in some examples this high-speed mode may rely on the back EMF generated by the electric motor to estimate the position/speed of the rotor and to allow for controlling the electric motor.

At box 1170 a determination may be made as to whether the speed is greater than or equal to a second speed threshold. The second speed threshold may be greater than the first speed threshold. If it is determined that the speed is greater than the second speed threshold, method 1100 may move to box 1175 where the HF signal injection is turned off and the method continues back to box 1165.

If, on the other hand, at box 1170 a determination is made that the speed is not equal to or greater than the second speed threshold, the method moves on to box 1180 where the HF signal injection is turned on or maintained in the on state as the case may be. At box 1185, a determination is made as to whether the speed is below a third speed threshold. In some examples, the third speed threshold may be lower than the first speed threshold. Moreover, in some examples, the third speed threshold may be the minimum speed at which the high-speed mode using back EMF is practicable. If it is determined that the speed is below the third speed threshold, the speed may be too low for the high-speed mode to be practicable and method 1100 moves on to box 1110 where the low-speed mode is used for motor control. If, on the other hand, at box 1185 it is determined that the speed is equal to or greater than the third speed threshold, method 1100 may move back to box 1165 where the high-speed mode continues to be used as the mode for sensorless motor control.

Methods 1000 and 1100 both provide for modification of the HF signal according to the operational parameters of the electric motor in order to reduce acoustic noise and power consumption. In addition, methods 1000 and 1100 both provide for a transition scheme for transitioning between the low-speed note and the high-speed mode of sensorless motor control. In method 1000, the HF signal starts at a maximum voltage and then the voltage is reduced if the rotor speed and the reference input are zero or close to zero. Such a reduction may allow for the reduction in acoustic noise and a reduction in the power used for generating the HF signal.

In method 1100 the low-speed mode may start with the HF signal at a minimum level or turned off. If a reference input is detected then the HF signal may be turned on or increased to a maximum. Compared to method 1000, method 1100 may allow for further reductions in acoustic noise or power consumption by starting with the HF signal at a reduced level or turned off. In method 1100, once the HF signal is turned back on, a period of time is allowed to elapse to allow for the position/speed estimation of the low-speed mode to converge before the low-speed mode may be used in operation of the electric motor. As such, in comparison to method 1000, method 1100 may have a time delay to achieve convergence before the low-speed mode provided by method 1100 is ready to use. In other words, in comparison to method 1000, method 1100 may reduce or eliminate the HF injection noise and losses, but at a cost of higher complexity and a small delay when the vehicle (or other device or system using electric motor) is starting from a standstill following receipt of an input reference or command.

In some examples, the speed thresholds described in relation to FIGS. 9, 10, and 11 may be automatically estimated or obtained. As such, in some examples, methods 900, 1000, 1100, and their associated methods described herein may further comprise determining the third speed threshold. As discussed above, in some examples, the third speed threshold may comprise the minimum speed of the rotor at which the high-speed mode using the back EMF becomes practicable. Moreover, in some examples, the high-speed mode becoming practicable may comprise the rotor speed being high enough such that the high-speed mode using back EMF is able to estimate the position/speed of the rotor with sufficient accuracy and allow for sufficiently reliable control of the electric motor.

In some examples, determining the third speed threshold may comprise determining a first estimate of the position of the rotor relative to the stator using the low-speed mode by injecting the HF signal into the electric motor. This injection may take place while the rotor is rotating at a given speed. A second estimate of the position of the rotor may also be determined using the high-speed mode based on the back EMF, while the rotor is rotating at the given speed. Then, a first error may be calculated based on a difference between the first estimate and the second estimate. This first error may also be described as a first position error. This first error may be compared with an error threshold. If the first error is below the error threshold, then the given speed may be set or designated as the third speed threshold. If, on the other hand, the first error is equal to or greater than the error threshold, the speed of the rotation of the rotor relative to the stator may be increased to an increased speed.

In some examples, the position error ($\theta_{error}$, in degrees) may be defined by equation (13):

$$\theta_{error} = \text{abs}(\text{mod}(\hat{\theta}_{high} - \hat{\theta}_{low}, 360)) \tag{13}$$

where $\hat{\theta}_{high}$ is the estimated rotor position using the high-speed mode, and $\hat{\theta}_{low}$ is the estimated rotor position using the low-speed mode. Moreover, in some examples, the error threshold may be determined experimentally.

Moreover, in some examples, if the first error is equal to or greater than the error threshold then the speed of the rotor may be increased to the increased speed. Then the steps of determining the position estimates using the high-speed and low-speed modes, calculating the error, and comparing the error to the error threshold may be repeated until the error is below the error threshold. In other words, a third estimate of the position of the rotor may be determined using the low-speed mode by injecting the HF signal into the electric motor, while the rotor is rotating at the increased speed.

Moreover, a fourth estimate of the position of the rotor may be determined using the high-speed mode based on the back EMF while the rotor is rotating at the increased speed. Then a second error may be calculated based on a difference between the third estimate and the fourth estimate, and the second error may be compared with the error threshold. If the second error is below the threshold, the increased speed may be set as the third speed threshold. If, on the other hand, the second error is equal to or greater than the error threshold, the speed of the rotor may be further increased and the steps of determining position estimates and calculating and comparing their error with an error threshold may be repeated until a speed is reach at which the error between the position estimates of the rotor using the low-speed and the high-speed modes is less than the error threshold. In this manner, the third speed threshold may be determined, which third speed threshold may be used in other methods such as methods 900, 1000, 1100, and the related methods described herein.

Figure 12B:
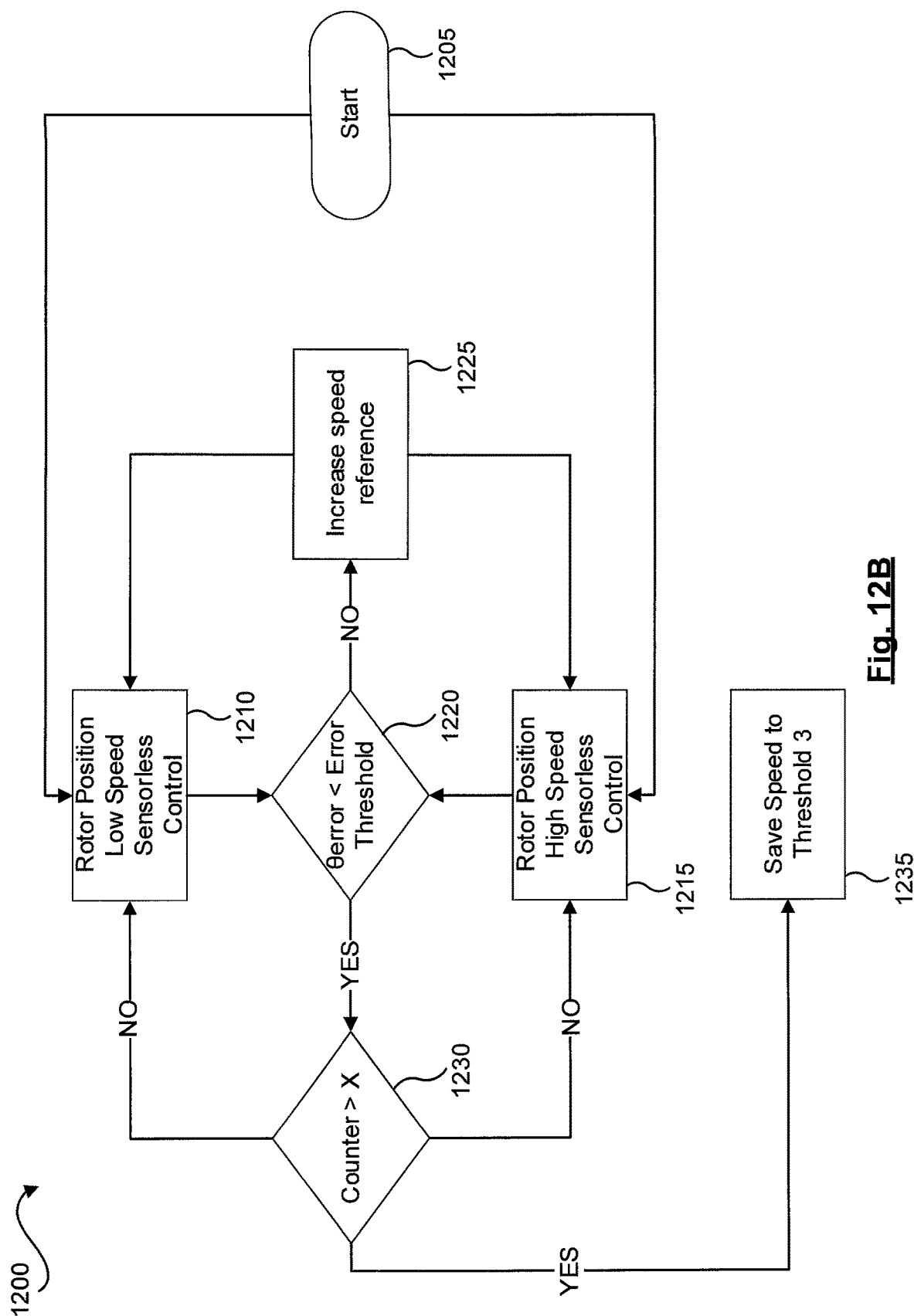
FIG. 12B shows a flowchart of yet another example method, in accordance with a non-limiting implementation of the present specification.

Turning now to FIG. 12B, a flowchart is shown of an example method 1200 which may be used to determine the third speed threshold. As discussed above, the third speed threshold may represent the minimum speed at which the high-speed mode using back EMF may become practicable. At box 1205, method 1200 may be started. At box 1210, the position of the rotor may be estimated using the low-speed mode of sensorless motor control. At box 1215, the position of the rotor may be estimated using the high-speed mode of sensorless motor control.

At box 1220, the error between the positions of the rotor estimated using the low-speed and the high-speed modes may be calculated and compared with an error threshold. If the error between the estimated positions is less than the error threshold, method 1200 may move to box 1230. Box 1230 may represent a counter or a delay. Box 1230 may be used to ensure that the condition of the error being below the error threshold is maintained for a given period of time or a given number of data points. In other words, the counter or delay in box 1230 may be used to increase the likelihood that the condition of the error being below the error threshold is a relatively stable or persistent condition before method 1200 moves on to designate the speed as the third speed threshold.

In some examples, the counter in box 1230 may count a given number of data points. These data points may be part of a time series of data points collected over time. Moreover, in some examples, the counter in box 1230 may count time. For example, the period of time for the delay enforced by box 1230 may be measured in milliseconds or in seconds. If the condition of the error being below the error threshold is relatively reliable or persistent as determined by box 1230, method 1200 may then moved to box 1235 where the speed at which the conditions of boxes 1220 and 1230 were satisfied is set as the third speed threshold.

Returning to box 1220, if the error is not smaller than the error threshold, method 1200 may then move to box 1225 where the speed of the rotor is increased. Upon increasing the speed at box 1225, the position of the rotor may again be estimated using the low-speed and the high-speed modes at boxes 1210 and 1215 respectively. Returning now to box 1230, if the condition of the error being below the error threshold is not sufficiently reliable or persistent, then method 1200 may move back to boxes 1210 and 1215 to estimate the rotor position using the low-speed and the high-speed modes respectively.

It is also contemplated that in some examples, if looping between box 1230 and boxes 1210 and 1215 does not result in the error becoming smaller than the error threshold as determined in box 1220 after a given period of time or after a given number of data points measured over time, method 1200 may move back to box 1225 where the speed of the rotor is increased and then the method moves back to boxes 1210 and 1215 to estimate the rotor positions at the higher speed.

Figure 13:
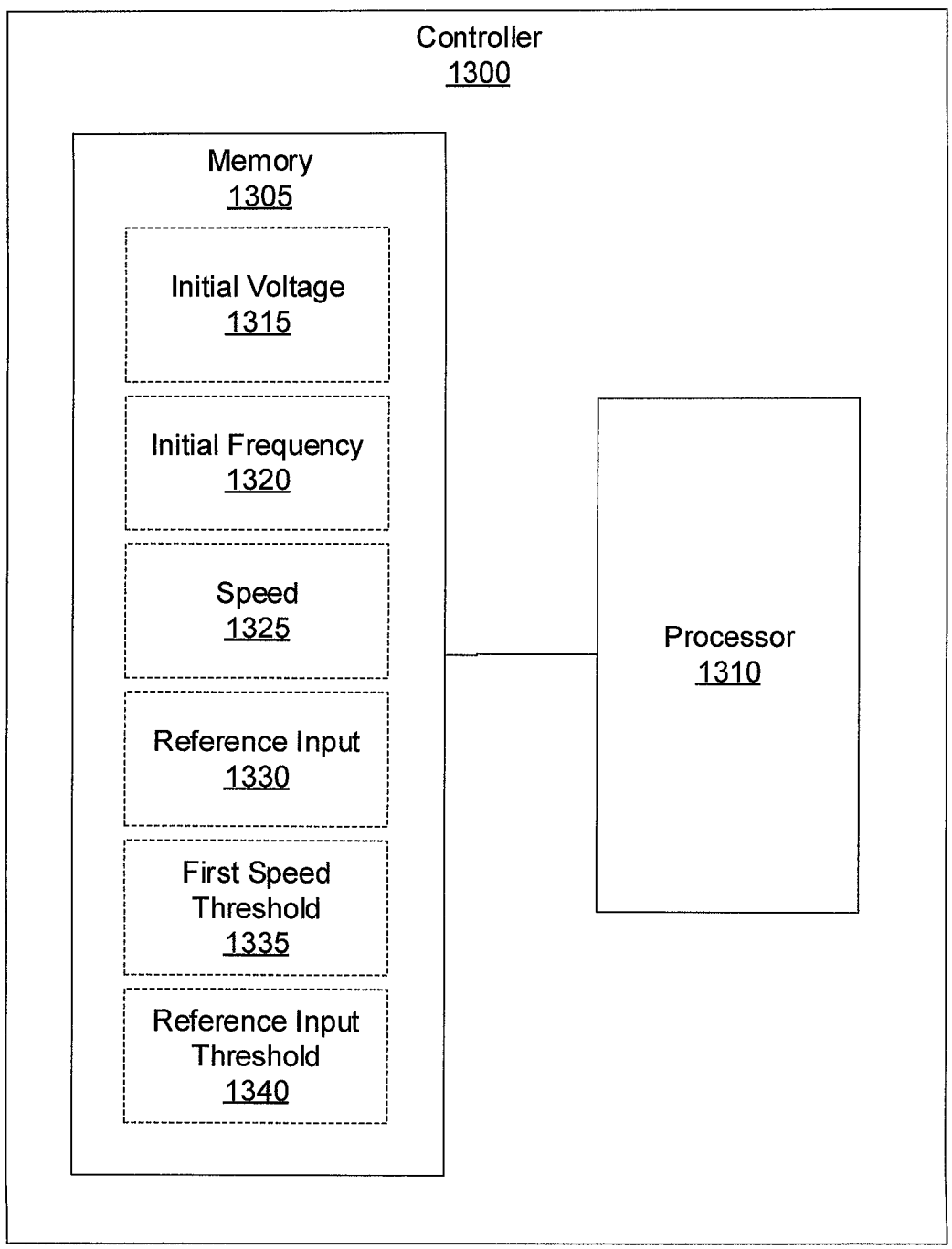
FIG. 13 shows a block diagram of another example controller, in accordance with a non-limiting implementation of the present specification.

Turning now to FIG. 13, a schematic representation is shown of example controller 1300, which may comprise a memory 1305 in communication with a processor 1310. In some examples, controller 1300 may function as a motor controller for controlling an elector motor. Moreover, in some examples, controller 1300 may have the features or perform the functions associated with method 900 and the related methods described herein. Examples of such related methods may include method 1000, method 1100, method 1200, and the like. It is also contemplated that controller 1300 may have the features or perform the functions of controller 700 and the other controllers described herein.

Memory 1305 may comprise a non-transitory machine-readable storage medium that may be any electronic, magnetic, optical, or other physical storage device that stores executable instructions. The machine-readable storage medium may comprise, for example, random access memory (RAM), read-only memory (ROM), electrically-erasable programmable read-only memory (EEPROM), flash memory, a storage drive, an optical disc, and the like. The machine-readable storage medium may be encoded with executable instructions.

Processor 1310, in turn, may include a central processing unit (CPU), a graphics processing unit (GPU), a microcontroller, a microprocessor, a processing core, a field-programmable gate array (FPGA), or similar device capable of executing instructions. Processor 1310 may cooperate with the memory 1305 to execute instructions. In some examples, controller 1300 or one or more of its components may be implemented using cloud computing, virtual or virtualized computing modules, distributed computing, one or more servers, and the like.

Controller 1300 may be used to control an electric motor having a rotor and a stator. Processor 1310 may control the electric motor in a low-speed mode by injecting a HF signal into the electric motor. In some examples, processor 1310 may cause one or more other components to inject the HF signal into the electric motor. Moreover, in some examples, these other components may be components of controller 1300, or may be components outside of or separate from control 1300. The HF signal may have an initial voltage 1315 and an initial frequency 1320.

Processor 1310 may obtain a speed 1325 of the rotor of the electric motor relative to the stator. In some examples, controller 1300 may measure or otherwise detect the speed of the rotor. Moreover, in some examples, controller 1300 may receive speed 1325 from another component or system that measures speed 1325. Furthermore, in some examples, controller 1300 may retrieve speed 1325 from a computer- or a machine-readable storage medium that stores the value of speed 1325.

Processor 1310 may also obtain a reference input 1330 sent to the electric motor. In examples where the electric motor is used as part of an electric vehicle, this reference input may comprise a throttle input. In some examples, controller 1300 may measure reference input 1330. Moreover, in some examples, controller 1300 may receive reference input 1330 from another component which measures or generates reference input 1330. Furthermore, in some examples, controller 1300 may retrieve reference input 1330 from a computer- or a machine-readable storage medium that stores the value of reference input 1330.

Processor 1310 may compare speed 1325 and the reference input 1330 with a first speed threshold 1335 and a reference input threshold 1340 respectively. Processor 1310 may then reduce at least one of initial voltage 1315 and initial frequency 1320 if speed 1325 is below first speed threshold 1335 and reference input 1330 is below reference input threshold 1335. Such a reduction may reduce the acoustic noise caused or generated by injecting the HF signal into the electric motor.

As described above, in some examples, controller 1300 may have the features or perform the functions described in relation to methods 900, 1000, 1100, 1200, and the related methods described herein. In addition, in some examples, controller 1300 may have the features or perform the functions described in relation to method 500 and the related methods described herein.

Figure 14:
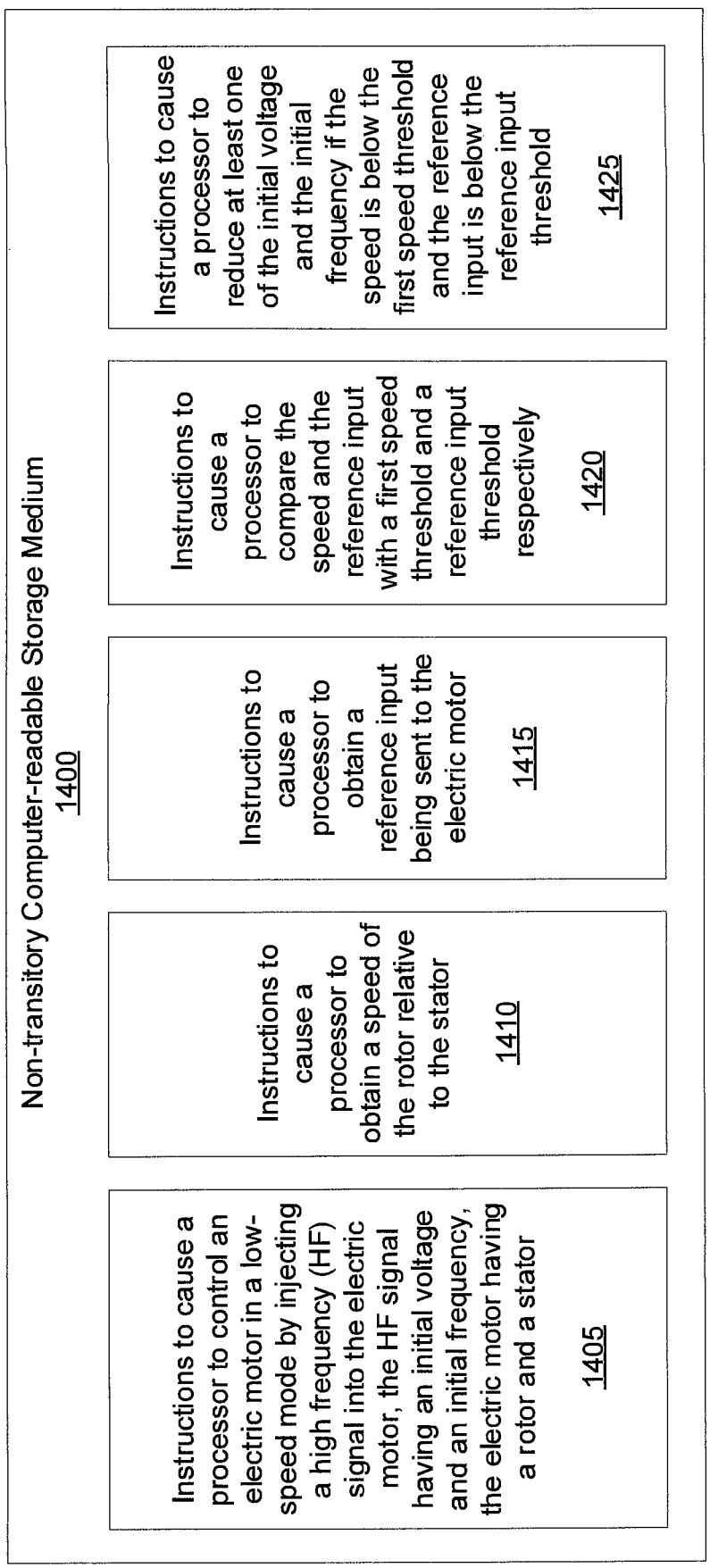
FIG. 14 shows a block diagram of another example computer-readable storage medium, in accordance with a non-limiting implementation of the present specification.

Turning now to FIG. 14, a non-transitory computer-readable storage medium (CRSM) 1400 is shown, which CRSM 1400 comprises instructions executable by a processor. The CRSM may comprise any electronic, magnetic, optical, or other physical storage device that stores executable instructions. The instructions may comprise instructions 1405 to cause a processor to control an electric motor in a low-speed mode by injecting a HF signal into the electric motor. The HF signal may have an initial voltage and an initial frequency.

CRSM 1400 may also comprise instructions 1410 to cause a processor to obtain a speed of the rotor relative to the stator, and instructions 1415 to cause a processor to obtain a reference input being sent to the electric motor. In addition, CRSM 1400 may comprise instructions 1420 to cause a processor to compare the speed and the reference input with a first speed threshold and a reference input threshold respectively. Moreover, CRSM 1400 may comprise instructions 1425 to cause a processor to reduce at least one of the initial voltage and the initial frequency if the speed is below the first speed threshold and the reference input is below the reference input threshold. Such a reduction may reduce an acoustic noise caused by injecting the HF signal into the electric motor.

As described above, in some examples, CRSM 1400 may comprise instructions to cause a processor to have the features or perform the functions described in relation to methods 900, 1000, 1100, 1200, and the related methods described herein. In addition, in some examples, CRSM 1400 may comprise instructions to cause a processor to have the features or perform the functions described in relation to method 500 and the related methods described herein.

In some example low-speed modes of sensorless control, the mutual inductance in the rotatory d-q reference frame may be neglected, for example as presented in equations (1) and (3). However, angular offset between real and estimated position may be induced by the magnetic field distortion. A phase-shift error may be caused by the effect of cross-coupling between the direct and quadrature frame. The magnetic field becomes asymmetrical on the d-axis when q-axis current is applied, causing an angular shift when using the low-speed mode to estimate the position of the rotor.

In some examples, such phase-shift errors may occur when the motor is operating under load. In some examples, a motor may be said to operate in a loaded condition when the rotor transfers some amount of mechanical energy to an external device, and in an unloaded condition when the rotor does not transfer mechanical power to an external device. To compensate for the position estimation error caused by the cross-coupling effect when the motor operates in a loaded condition, a compensation factor related to the quadrature (q-axis) current may be applied.

Figure 15:
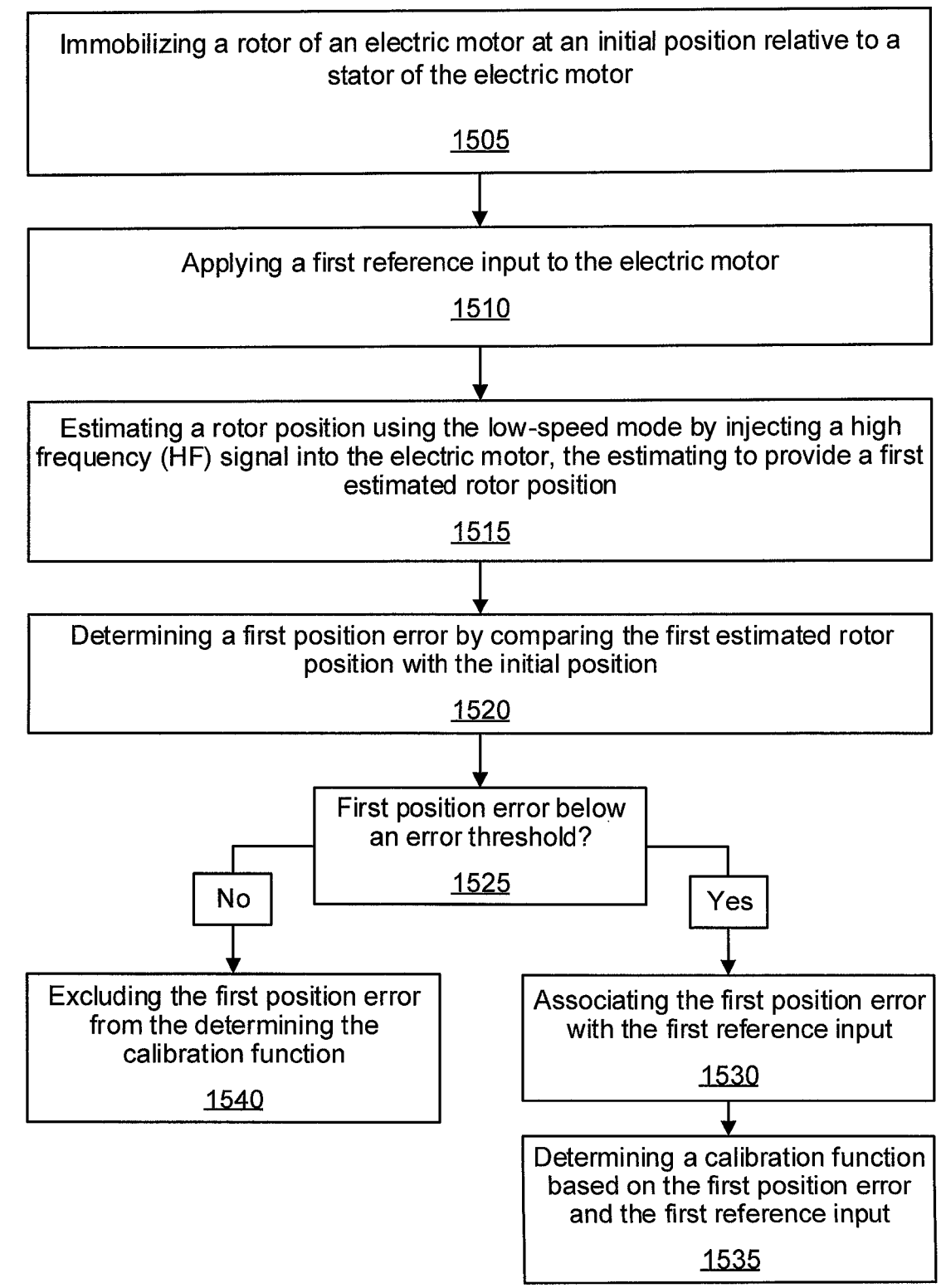
FIG. 15 shows a flowchart of yet another example method, in accordance with a non-limiting implementation of the present specification.

Such compensation factors may be experimentally determined for a given electric motor, and then used to calibrate the low-speed mode to reduce or eliminate the errors in rotor position estimation due to the phase-shift. Such experimental determination of the compensation factors and calibration may be labor-intensive or time-consuming. In some examples, the experimental determination of the compensation factors may be at least partially automated or systematized to reduce the time or labor used to determine the compensation factors. FIG. 15 shows a flowchart of an example method 1500, which may be used for calibrating the low-speed mode of controlling an electric motor.

At box 1505, the rotor of the electric motor may be immobilized at an initial position relative to the stator. In some examples, the rotor may be immobilized by mechanically immobilizing or locking the rotor at the initial position. At box 1510, a first reference input may be applied to the electric motor. In some examples, applying the reference input may comprise sending a current to the electric motor. Moreover, in some examples where the electric motor is used to actuate a vehicle, the reference input may comprise a throttle input provided to the electric motor.

At box 1515, a rotor position may be estimated using the low-speed mode by injecting a HF signal into the electric motor. This estimation may provide a first estimated rotor position. In some examples, estimating the rotor position by injecting a HF signal into the electric motor may be performed in a manner similar to those described herein in relation to FIGS. 1-8.

At box 1520, a first position error may be determined by comparing the first estimated rotor position with the initial position. In some examples, the first position error may be calculated using an example equation (14):

$$\varepsilon = \mathrm{mod}(\hat{\theta}_{est} - \hat{\theta}_{initial}, 360) \quad (14)$$

where $\varepsilon$ is the first position error, $\hat{\theta}_{est}$ is the first estimated rotor position and $\hat{\theta}_{initial}$ is the initial rotor position.

At box 1525, a determination may be made as to whether the first position error is below an error threshold. In some examples, the error threshold may be 30° electrical, and the like. It is contemplated that in some examples, the error threshold may be different than 30° electrical. If the determination is affirmative, method 1500 may move to box 1530 at which box the first position error is associated with the first reference input. In some examples, associating the first position error with the first reference input may comprise storing the first position error in association with the first reference input. It is also contemplated that in some examples, the first position error may be associated with the first reference input in a different manner.

At box 1535, a calibration function may be determined based on the first position error and the first reference input. This calibration function may provide a compensation as a function of the first reference input that may partially or fully compensate for the phase shift error in the first estimated rotor position when the electric motor is put under load by the application of the first reference input.

If, on the other hand, the determination at box 1525 is negative, method 1500 may move to box 1540 at which the first position error is excluded from being used in determining the calibration function. The check performed at box 1525 may allow for detection of position errors that may be erroneous or out of range. For example, if immobilization of the rotor is not fully successful and the rotor moves in response to the application of the first reference input, the first position error may be out of range and not reflective of phase shift errors. Such out of range position errors may then be excluded from determining the calibration function at box 1540.

Moreover, in some examples, method 1500 may be stopped if at box 1525 the first position error is determined to be equal to or greater than the error threshold. Such stoppage may serve a safety function to mitigate potential safety issues that may result as a consequence of the rotor not being fully or successfully immobilized.

In addition, in some examples, there may be a minimum error threshold below which the position error may not be used for determining the calibration function. In some examples, this minimum error threshold may comprise 1° electrical, and the like. It is also contemplated that in some examples, the minimum error threshold may be different than 1° electrical. Such a minimum error threshold may allow for the position error data points that are used to determine the calibration function to be sufficiently different from one another. In other words, if the position error data points for the different values of the reference input are not sufficiently different from one another, they may have diminished usefulness in deriving or otherwise determining the calibration function. Enforcing a minimum error threshold may serve to ensure that the position error data points that are used to determine the calibration function are sufficiently different from one another.

In some examples, more than one pair of data points comprising the first reference input associated with the first position error may be used to determine the calibration function. In such examples, in order to determine the additional position error data points, the reference input may be changed and the corresponding position error may be determined. For example, method 1500 may further comprise applying a second reference input to the electric motor, and determining the rotor position using the low-speed mode to provide a second estimated rotor position.

A second position error may be determined by comparing the second estimated rotor position with the initial position. If the second position error is below the error threshold, the second position error may be associated with the second reference input. In such examples, the calibration function may be determined based on the first position error, the second position error, the first reference input, and the second reference input, provided that the first position error and the second position error are below the error threshold. In this manner, the second pair of data points comprising the second reference input and the second position error may be used together with the first reference input and the first position error to determine the calibration function.

Similar steps of changing the reference input and determining the corresponding position error may be repeated in order to obtain additional pairs of data points of reference input and associated position errors. In some examples, in each iteration the reference input may be increased by a predetermined fraction of the maximum reference input. For example, in each iteration of the steps of changing the reference input and determining the corresponding position error, the reference input may be increased or decreased by about 2% of the maximum reference current. In examples where the electric motor is used to actuate a vehicle, the reference input may be increased or decreased by about 2% of the current associated with the maximum throttle input. It is also contemplated that in some examples the reference input may be increased or decreased by an amount other than 2% of the maximum reference input.

Furthermore, in some examples, the position error may be a substantially linear function of the reference input. In such examples, it may not be necessary to obtain position errors for reference inputs throughout the full range of the reference input values. In examples where the variation of the position error as a function of the reference input is expected to be linear, the reference input may be varied within a subrange of the full range of the reference input values, and the calibration function obtained based on the corresponding position errors may be extrapolated to the full range of the reference input values.

For example, determining the calibration function may comprise determining the calibration function by performing a linear regression based on a selection of reference inputs and their corresponding position errors within a subrange of the full range of reference input values. In some examples, this subrange may comprise about 20% of the full range of the reference input values. Moreover, in some examples, the subrange may be selected to be near the lower end of the full range of the reference input values to minimize the amount of power used, and the corresponding loads to which the motor is subjected, in determining the calibration function. It is also contemplated that in some examples, the subrange used may be other than 20% of the full range of the reference input values.

Figure 16:
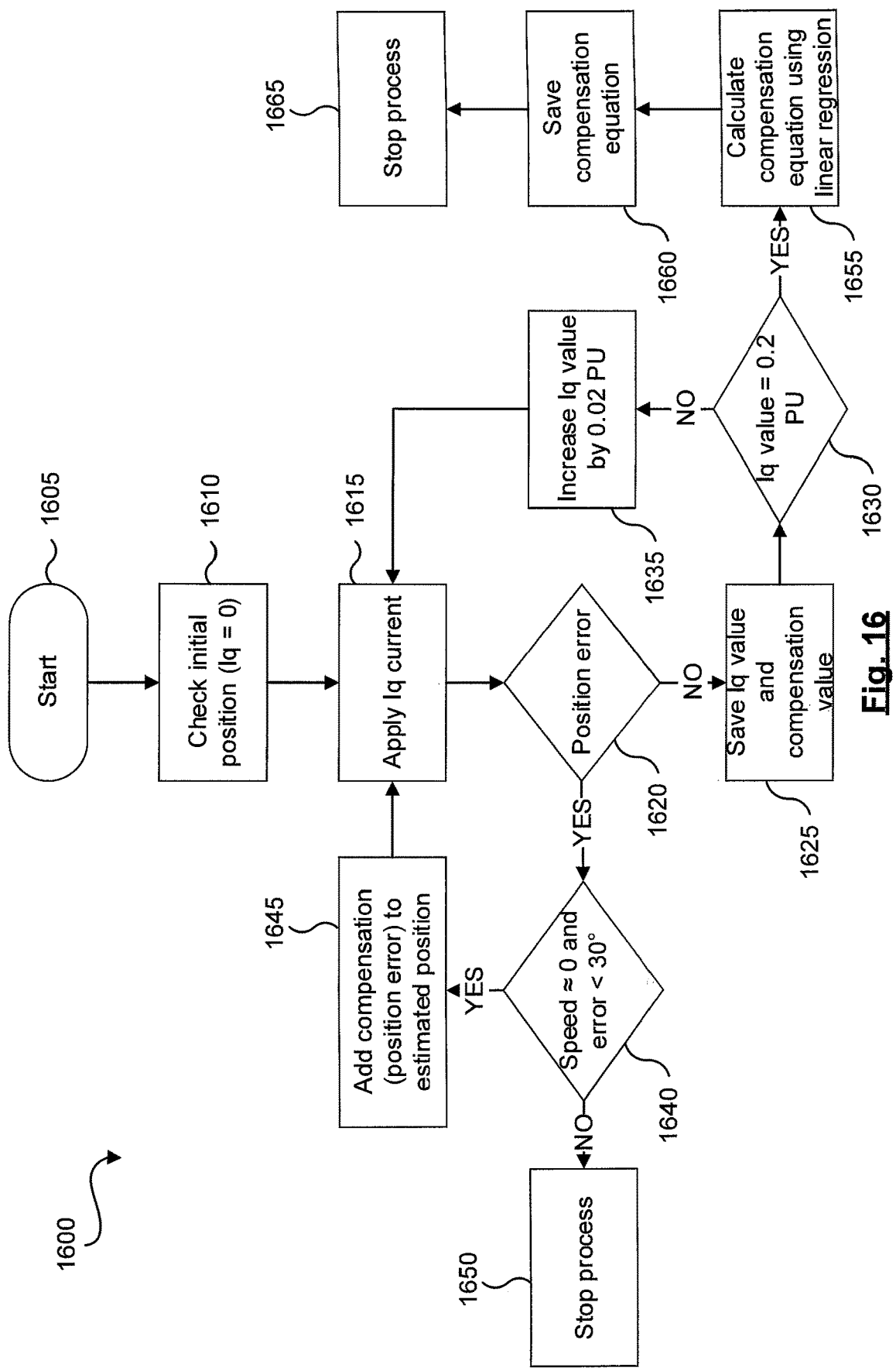
FIG. 16 shows a flowchart of yet another example method, in accordance with a non-limiting implementation of the present specification.

The calibration function generated using method 1500 may then be used to provide the compensation values as a function of the input reference to at least partially correct for the position estimation errors at different reference input values. Turning now to FIG. 16, a flowchart is shown of an example method 1600 which may be used for calibrating a low-speed mode of controlling an electric motor. In some examples, method 1600 may be an example for a variation of method 1500. Moreover, it is contemplated that in some examples, method 1500 may have the features or functions described in relation to method 1600.

At box 1605 method 1600 may be started. In some examples, the start may comprise physically or mechanically immobilizing the rotor of the electric motor at an initial position. At box 1610, the initial position of the motor may be determined using the low-speed mode to estimate this initial position. Moreover, the initial position may be determined when the reference input is zero. In other words, the initial position may be determined when no actuating current is directed to the electric motor and when the electric motor is not operating under load.

At box 1615 a reference input may be applied to the motor. In some examples, the reference input may take the form of an operating current which, but for the physical immobilization of the rotor, would cause the rotor to move relative to the stator. At box 1620 the position of the rotor may be estimated using the low-speed mode by injecting a HF signal into the motor. If there is a difference (or error) between the position determined at box 1620 and the position determined at box 1610, method 1600 moves to box 1640. In some examples, the position error may be determined using equation (14), and the like. It is also contemplated that in some examples, the position error may be determined using an equation other than equation (14).

At box 1640 the magnitude of the position error and the speed of the rotor may both be checked. The speed of the rotor being other than zero, or the error being larger than or equal to a threshold, may indicate a problem with or a failure of the calibration set up. Examples of such failures or problems may comprise failures in the mechanical immobilization of the rotor and the resulting movement of the rotor corresponding to the application of the reference input. Moreover, in some examples, the threshold at box 1640 may be about 30° electrical, and the like. It is also contemplated that in some examples, the threshold at box 1640 may be different than 30° electrical.

If it is determined at box 1640 that there may be a problem with or failure of the calibration set up, method 1600 may move to box 1650 at which point the calibration process is stopped. If, on the other hand, no problems or failures are detected at box 1640, method 1600 may move to box 1645 where a compensation value is added to the estimated position to correct the error in the position estimated at box 1620. Then, method 1600 continues back to box 1615, and then to box 1620.

If, upon return to box 1620, the estimated position as corrected by the compensation added in box 1645 does not deviate from the initial position, then method 1600 may move to box 1625 where the reference input value and the compensation value may be associated with one another and saved.

At box 1630 a determination may be made as to whether the value of the reference input is outside of the subrange of the full range of reference input values used for determining the calibration function. If the determination at box 1630 is negative, then method 1600 moves to box 1635 where the reference input value is increased and method 1600 moves back to box 1615. In some examples, the increase in box 1635 may be by a predetermined amount of the maximum value for the reference input. Moreover, in some examples, the predetermined amount may be about 2% of the maximum value of the reference input. It is also contemplated that in some examples, the predetermined amount may be other than 2% of the maximum value of the reference input.

Once method 1600 moves from box 1635 back to box 1615, method 1600 may cycle through boxes 1615, 1620, 1625, 1630, 1635, 1640, and 1645 to generate and save pairs of reference inputs and associated compensation values while the condition at box 1630 remains unmet. If, on the other hand, the condition at box 1630 is met and the reference value moves outside of the subrange of reference input values used for the calibration process, method 1600 may move to box 1655. At box 1655, a calibration function may be calculated or regenerated using the pairs of reference values and their associated compensation values that are generated and saved by the iterations or cycles of method 1600 through boxes 1615, 1620, 1625, 1630, 1635, 1640, and 1645. The calibration function may also be referred to as a compensation equation.

In some examples, the calibration function may be determined using a linear regression of the reference values and their associated compensation values. At box 1660 this calibration function may be saved, and at box 1665 method 1600 may end. In this manner, method 1600 may allow for an automated or a systematized approach to determining a calibration function or compensation equation to compensate for the position estimation errors of the low-speed mode when the electric motor is under load.

Figure 17:
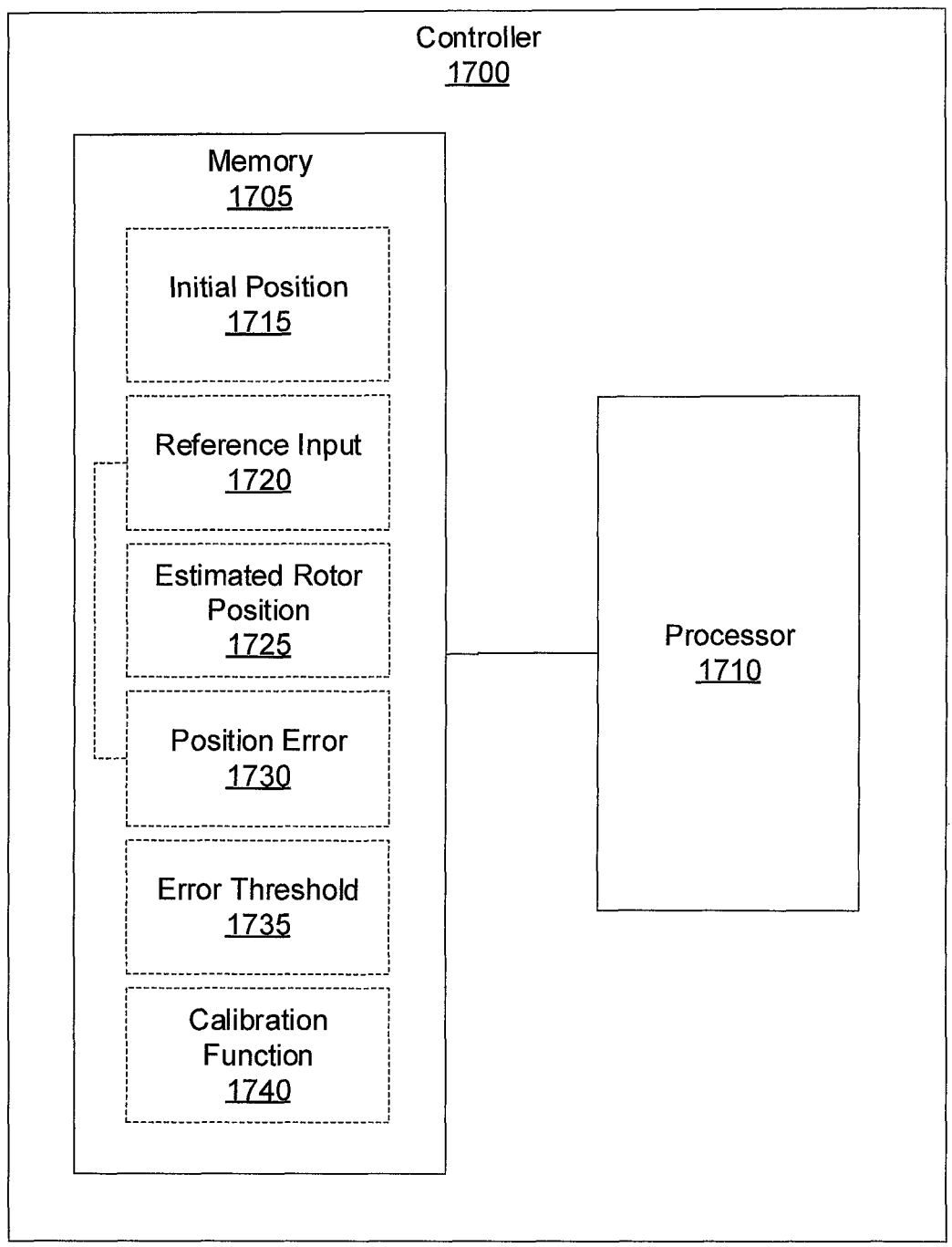
FIG. 17 shows a block diagram of yet another example controller, in accordance with a non-limiting implementation of the present specification.

Turning now to FIG. 17, a schematic representation is shown of example controller 1700, which may comprise a memory 1705 in communication with a processor 1710. In some examples, controller 1700 may function as a motor controller for controlling an elector motor. Moreover, in some examples, controller 1700 may have the features or perform the functions associated with method 1500 and the other related methods described herein. Examples of such related methods may include method 1600, and the like. It is also contemplated that controller 1700 may have the features or perform the functions of controller 700, controller 1300, and the other controllers described herein.

Memory 1705 may comprise a non-transitory machine-readable storage medium that may be any electronic, magnetic, optical, or other physical storage device that stores executable instructions. The machine-readable storage medium may comprise, for example, random access memory (RAM), read-only memory (ROM), electrically-erasable programmable read-only memory (EEPROM), flash memory, a storage drive, an optical disc, and the like. The machine-readable storage medium may be encoded with executable instructions.

Processor 1710, in turn, may include a central processing unit (CPU), a graphics processing unit (GPU), a microcontroller, a microprocessor, a processing core, a field-programmable gate array (FPGA), or similar device capable of executing instructions. Processor 1710 may cooperate with the memory 1705 to execute instructions. In some examples, controller 1700 or one or more of its components may be implemented using cloud computing, virtual or virtualized computing modules, distributed computing, one or more servers, and the like.

Controller 1700 may be used to control an electric motor having a rotor and a stator. In some examples, controller 1700 may be used to calibrate a low-speed mode of controlling the electric motor. In some examples, processor 1710 may cause the rotor to become immobilized at an initial position 1715 relative to the stator. For example, processor 710 may activate a mechanical brake or other immobilizing device to immobilize the rotor of the electric motor. It is also contemplated that in some examples, a device or system other than controller 1700 may immobilize the rotor, and processor 1710 may obtain or receive initial position 1715 at which position the rotor is immobilized.

Processor 1710 may also apply a first reference input 1720 to the electric motor. It is also contemplated that in some examples, processor 1710 may cause or control another device or component to apply reference input 1720 to the electric motor. In addition, processor 1710 may estimate a rotor position using the low-speed mode by injecting a HF signal into the electric motor. It is contemplated that in some examples, processor 1710 may control another component or device to inject the HF signal into the electric motor. Moreover, it is contemplated that in some examples, processor 1710 may estimate the rotor position in a manner similar to those described herein in relation to FIGS. 1-8. Processor 1710 may estimate the rotor position, or otherwise obtain a first estimated rotor position 1725.

Processor 1710 may also determine a first position error 1730 by comparing first estimated rotor position 1725 with initial position 1715. In some examples, processor 1710 may estimate position error 1730 using equation (14), and the like. It is also contemplated that in some examples, processor 1710 may estimate position error 1730 using an equation other than equation (14).

In some examples, processor 1710 may determine whether position error 1730 is below an error threshold

1735. If the determination is affirmative, processor 1710 may associate position error 1730 with reference input 1720. FIG. 17 shows reference input 1720 connected to position error 1730 to signify this association. In some examples, processor 1710 may associate position error 1730 with reference input 1720 by storing position error 1730 in association with reference input 1720, for example as shown in FIG. 17.

Processor 1710 may also determine a calibration function 1740 based on position error 1730 and reference input 1720. If position error 1730 is equal to or greater than error threshold 1735, processor 1710 may exclude position error 1730 from the determination of calibration function 1740. It is contemplated that controller 1700 or processor 1710 may have the features or perform the functions described in relation to methods 1500, 1600, and the related methods described herein.

In some examples, processor 1710 may iteratively change the reference input and determine further position errors corresponding to each of the reference inputs. So long as the position errors remain below error threshold 1735, they may be retained and saved in association with their corresponding reference inputs. In this manner, processor 1710 may generate a set of position errors and their corresponding reference inputs. The set of position errors and their corresponding reference inputs may then be used to determine the calibration function. In some examples, processor 1710 may perform a linear regression based on the position errors and reference inputs to determine the calibration function. It is also contemplated that in some examples, processor 1710 may determine the calibration function other than by using a linear regression.

Turning now to FIG. 18, a non-transitory computer-readable storage medium (CRSM) 1800 is shown, which CRSM 1800 comprises instructions executable by a processor. The CRSM may comprise any electronic, magnetic, optical, or other physical storage device that stores executable instructions. The instructions may comprise instructions 1805 to cause a processor to immobilize a rotor of the electric motor at an initial position relative to a stator of the electric motor. In some examples, the processor may cause or control another component or device to physically or mechanically immobilize the rotor.

It is also contemplated that in some examples, the rotor may be physically or mechanically immobilized without involvement of the processor. In such examples, CRSM 1800 need not comprise instructions 1805.

CRSM 1800 may also comprise instructions 1810 to cause a processor to apply a first reference input to the electric motor. In addition, CRSM 1800 may comprise instructions 1815 to cause a processor to estimate a rotor position using the low-speed mode by injecting a HF signal into the electric motor. This estimation may provide a first estimated rotor position. In some examples, the instructions may cause the processor to estimate the rotor position in a manner similar to those described herein in relation to FIGS. 1-8.

In addition, CRSM 1800 may comprise instructions 1820 to cause a processor to determine a first position error by comparing the first estimated rotor position with the initial position. In some examples, instructions 1820 may cause the processor to determine the first position error using equation (14). It is also contemplated that in some examples, instructions 1820 may cause the processor to determine the first position error using an equation other than equation (14).

Moreover, CRSM 1800 may comprise instructions 1825 to cause a processor to associate the first position error with the first reference input and determine a calibration function based on the first position error and the first reference input, provided the first position error is below an error threshold. Instructions 1825 may also cause a processor to exclude the first position error from the determination of the calibration function if the first position error is equal to or greater than the error threshold.

It is contemplated that CRSM 1800 and the instructions stored therein may cause a controller or a processor to have the features or perform the functions described in association with methods 1500, 1600, and the related methods described herein. It is also contemplated that in some examples, CRSM 1800 and the instructions stored therein may also cause a controller or processor to have the features or perform the functions described in association with methods 500, 900, 1000, 1100, 1200, and the other methods described herein.

As described above, the low-speed mode of sensorless motor control using the injection of a HF signal may rely on the saliency of the permanent magnets of the motor to reliably or accurately estimate the rotor position/speed used to control the operation of the motor. In some examples, a large reference input may be applied to the motor at zero or low speeds. For example, if the motor is to produce a relatively high torque at zero or low speeds, a correspondingly large current may be directed to the motor to cause the motor to produce the high torque. Such a high current (i.e. large reference input) may decrease saliency and consequently decrease the accuracy or reliability of the low-speed mode. In addition, as the motor is at zero or low speed, the high-speed mode may also not be available to use. In such circumstances, a hybrid mode of motor control may be used.

In some examples, such a hybrid mode may combine the low-speed sensorless mode with a mode that uses rotor position/speed sensors such as Hall sensors, and the like. Such a hybrid mode may be described as a sensorless-sensored mode of motor control.

Hall sensors may be used as position sensors in motors, and may offer relatively low cost and easy implementation. Such sensors, however, may provide a coarse angular resolution limited to about 60 electrical degree steps, reducing efficiency and smoothness when compared to other sensors. Encoders and resolvers may have better performance, but they may have the disadvantages of higher size and cost. Another feature of Hall-based methods may be that in some examples at least two Hall transitions (120 degrees) may need to be observed to provide information of rotor direction. This feature, in turn, may make it more challenging to provide full torque capability from zero speed when using this type of sensor.

As discussed above, standstill and low speed sensorless control may be dependent on motor saliency, making them challenging to implement when there is no saliency (Lq/Ld) or very low saliency. For example, some motors having the surface-mounted permanent magnet (SPM) design may have low saliency in their rotors. To address the challenges presented by both Hall sensors and sensorless control techniques, hybrid sensorless-sensored methods of motor control may be used.

In some examples, to reduce the standstill directionality problems of the Hall sensor-based control methods, sensorless control may be used to estimate the initial position and set the next expected Hall transition, depending on the direction of the motor. After this step, the motor may start running using the sensorless method at a low to medium torque reduced compared to the maximum torque or to the torque demanded by the reference input. During the sensorless operation, the rotor of the electric motor may be able to move to achieve the expected Hall transition. As an example, using a motor configuration with 36 stator poles and 40 rotor poles, 60° electrical will be equivalent to 3° mechanical, as indicated by equation (15):

$$\theta_{Electrical} = \frac{Poles}{2} \theta_{Mechanical} \tag{15}$$

Figure 19:
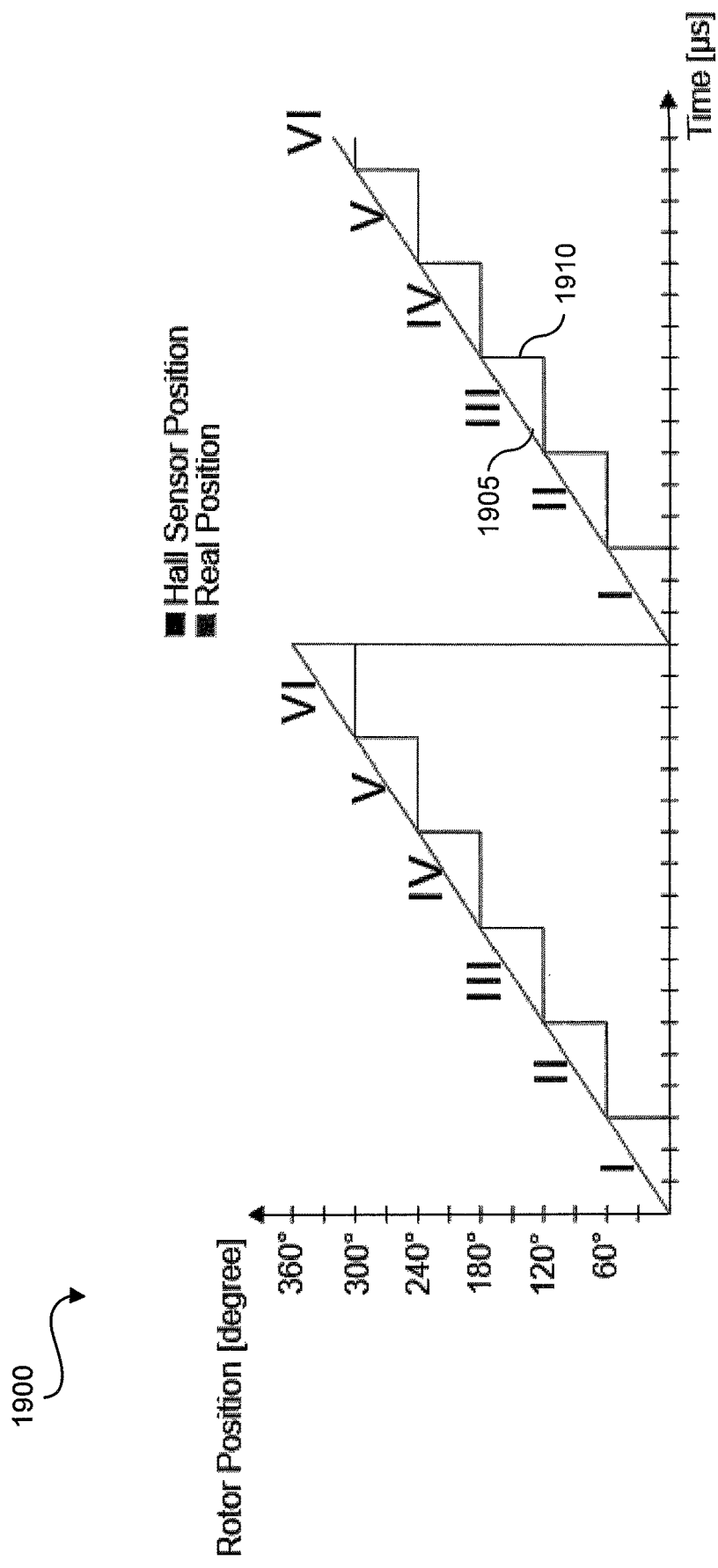
FIG. 19 shows a graph of example positions of a rotor of an electric motor, in accordance with a non-limiting implementation of the present specification.

In addition, in some examples the errors in rotor position determination using Hall sensors may be reduced. Example Hall sensor transitions are shown in FIG. 19, which shows a graph 1900 including a real position trace 1905 and a Hall sensor position trace 1910. The Hall sensor position may refer to the position of the rotor as sensed or determined by the Hall sensors. The Hall sensor transitions shown in FIG. 19 may give new position information every 60°, but at the end of the sector, the measured rotor position error may increase to up to 60°, thereby reducing the produced torque of the motor. To reduce or minimize this issue, a phase shifted Hall sensor method may be implemented, an example of which is represented by graph 2000 shown in FIG. 20. Graph 2000 includes a real position trace 2005 and a Hall sensor position trace 2010. In the example shown in FIG. 20, the position from the Hall sensor is shifted or advanced by 30°, thereby reducing the maximum position error.

Figure 20:
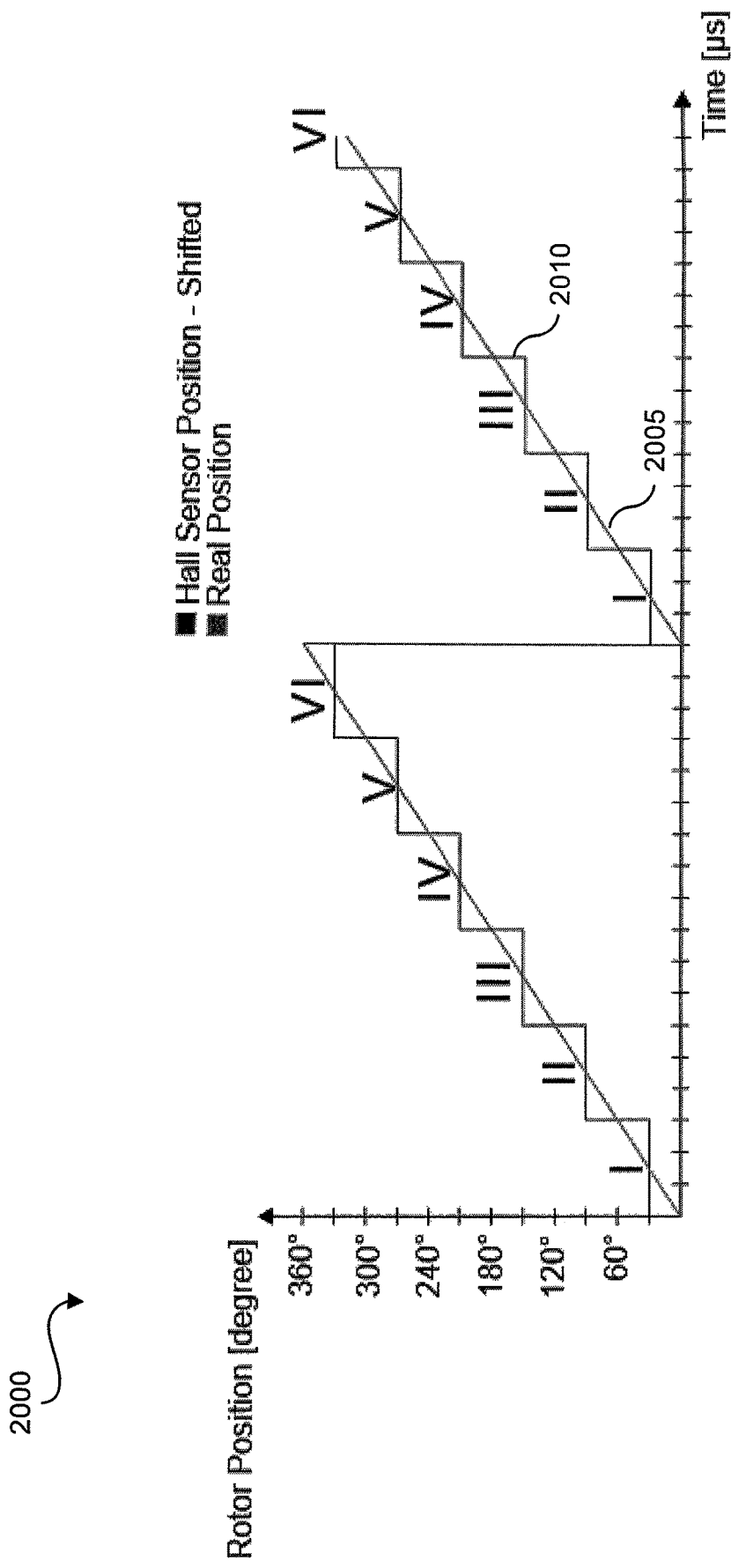
FIG. 20 shows a graph of other example positions of a rotor of an electric motor, in accordance with a non-limiting implementation of the present specification.
Figure 21:
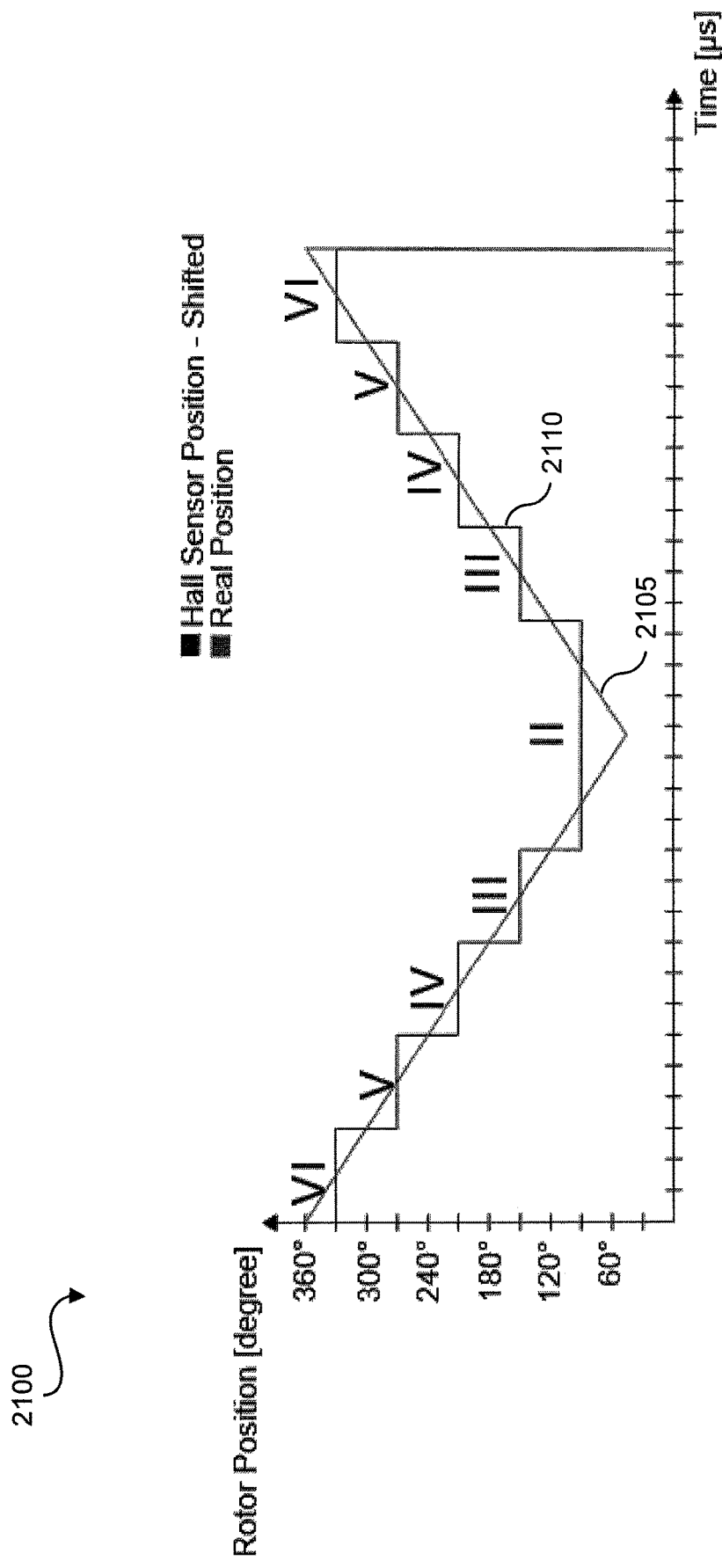
FIG. 21 shows a graph of yet other example positions of a rotor of an electric motor, in accordance with a non-limiting implementation of the present specification.

Another problem during the sensored motor control using Hall sensors is the zero-speed crossing region, where the rotor direction is inverted. In this condition, at least two Hall transitions may need to be observed/sensed to correctly identify the rotor direction. This state is presented in FIG. 21, which shows a graph 2100 including a real position trace 2105 and a Hall sensor position trace 2110. In FIGS. 19-21, the stepped trace represents the position as sensed by the Hall sensor, and the sloped trace shows the real position of the motor's rotor.

To improve motor operation, a hybrid mode of motor control may be used. During the major part of the motor operation, the torque production using sensorless control may be sufficient, and the position estimation may be used to control the motor. During high torque demand and low or zero speed, Hall sensor(s) may be used.

In some examples, the hybrid mode of sensorless and sensored motor control may comprise controlling a motor using a combination of both sensorless and sensored control. In some examples, the sensorless control may comprise HF-based sensorless control, and the sensored control may utilize Hall sensors. As described herein, sensorless control methods may be used at standstill or low speeds. For example, the methods described herein which are based on HF injection may be used to determine the rotor position and to assist in sensorless control of the motor at low or zero speeds. The HF injection method relies on rotor saliency, which may become small or not-reliably-detectable when the operating current or torque of the motor exceeds a given threshold.

As such, if a high torque is demanded form the motor at zero or low speeds and that torque exceeds the threshold, the saliency may be too small to use sensorless control based on HF injection. Under these operating parameters, Hall sensors may be used to operate the motor at torques above the threshold for HF-based sensorless control. However, using Hall sensors exclusively may necessitate at least two Hall transitions (120 electrical degrees) to be observed in order to determine both the position and the direction of rotation of the rotor. The relatively low resolution (e.g. up to 120 electrical degrees) of Hall sensors may cause motor control artifacts at zero or low speeds. Examples of such artifacts include jerk, which may become noticeable or disruptive in the operation of the motor.

In an example hybrid sensorless-sensored method, if the motor is at zero or low speed and the operator demands torque that exceeds the threshold for HF-based sensorless control (e.g. the low-speed mode), the operating torque may be temporarily reduced to or below the threshold for HF injection. This may in turn allow HF-based sensorless control to determine the position and direction of rotation of the rotor, thereby also indicating the next expected Hall transition. Once the next expected Hall transition is observed, the control method may be switched from HF-based sensorless to using Hall sensors and the operating torque may be increased to the demanded level above the threshold for HF injection. By providing rotor position and direction of rotation at zero or low speeds, the hybrid mode reduces or eliminates the control artifacts associated with Hall sensors at zero or low speeds. In addition, by switching to Hall sensors once the first Hall transition is observed, the hybrid method may reduce the amount of operating time when the torque is reduced below the torque demanded by the operator.

Furthermore, in some examples, when the demanded torque subsequently falls below the threshold for HF injection, the control method may switch back to HF-based sensorless control. Moreover, in some examples the hybrid method need not wait until the first Hall transition is observed to switch from sensorless to Hall sensors; instead, the switch from sensorless to Hall sensors may be made as soon as the sensorless method determines the rotor position and direction of rotation. As discussed above, in some examples, the hybrid modes may improve torque generation but may not eliminate the use of the motor position sensor.

Figure 22:
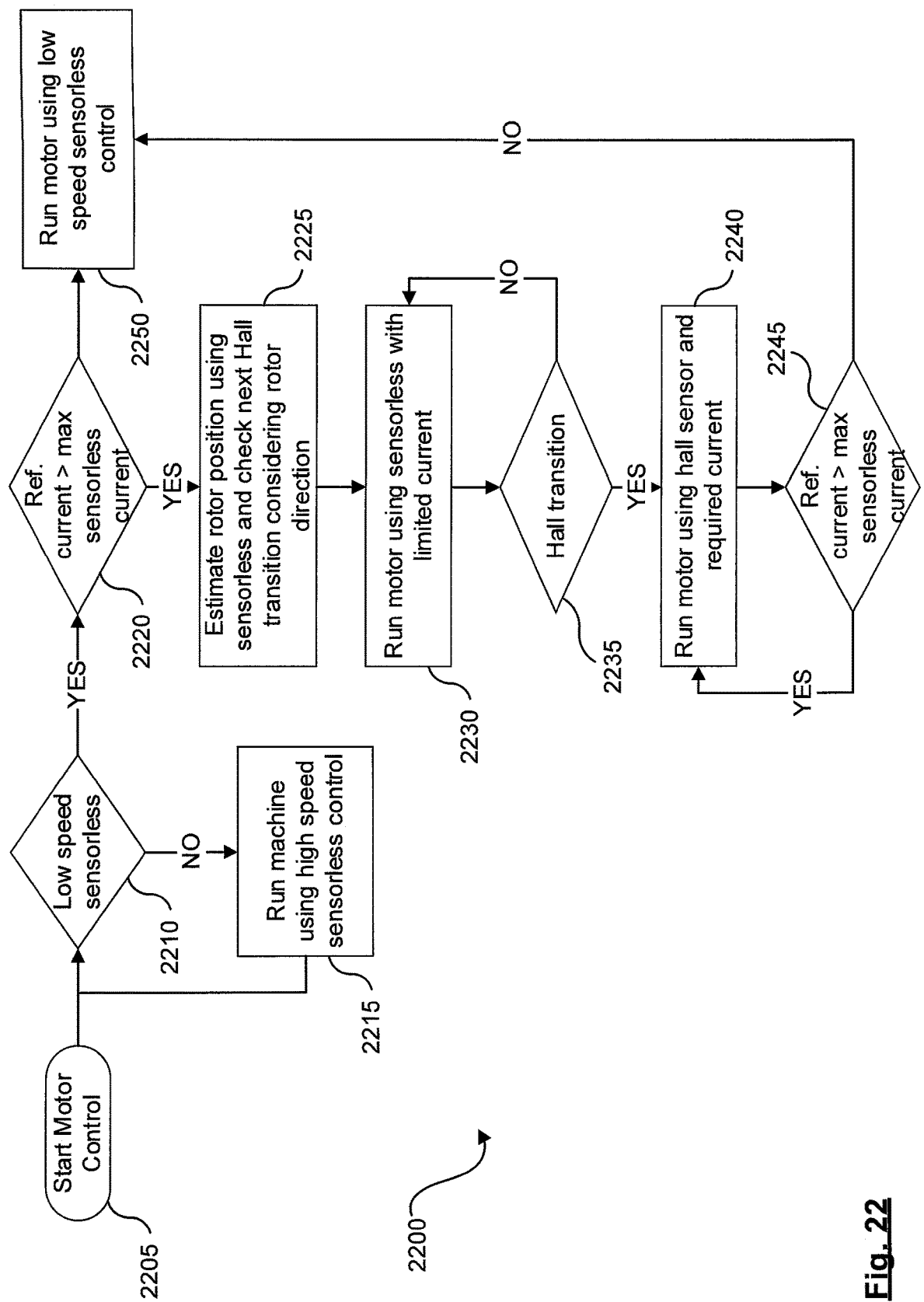
FIG. 22 shows a flowchart of yet another example method, in accordance with a non-limiting implementation of the present specification.

FIG. 22 shows an example method 2200 of a hybrid mode of sensorless-sensored motor control. At box 2205, motor control may be started. At box 2210, the low-speed mode may be used to control the motor. In some examples, the low-speed mode may use injection of a HF signal into the motor to determine the position/speed of the rotor used to control the motor. Moreover, in some examples, the low-speed mode may be similar to those described herein in relation to FIGS. 1-8.

If at box 2210 a determination is made that the speed is sufficiently high to use the high-speed mode, method 2200 may move to box 2215 where the motor is controlled using the high-speed mode. In some examples, the high-speed mode may be a sensorless mode using the back EMF generated by the motor. If at box 2210 a determination is made that the speed of the rotor is relatively low or zero, method 2200 may move to box 2220.

At box 2220 a determination may be made as to whether the reference input is greater than a threshold at or above which the low-speed mode relying on HF signal injection may lose some or all of its accuracy or reliability. In some examples, the reference input may comprise a reference current, and the threshold may comprise a reference current threshold.

If at box 2220 a determination is made that the reference input is greater than the threshold for using a HF signal-based low-speed mode, method 2200 may move to box 2225. At box 2225 the position of the rotor may be estimated using the low-speed mode by injecting a HF signal into the motor. This position, in turn, may be used to look for the next Hall transition considering the rotor direction.

At box 2230, the motor may be controlled or operated using a reduced reference input. In some examples, the reference input may be reduced to a level below the threshold described in relation to box 2220. At box 2235, a determination may be made as to whether a Hall transition has occurred. If the determination is negative, method 2200 moves back to box 2230. If, on the other hand, the determination at box 2235 is affirmative, method 2200 may move to box 2240. At box 2240, the reference input may be increased to the level of the original reference input sent to the electric motor to actuate the electric motor. As this original reference input may be greater than the threshold for the use of the HF signal-based control modes, the Hall sensors may be used to determine the position of the rotor and to control the electric motor when the reference input is above the threshold for using sensorless, HF signal-based control modes.

At box 2245 a determination may be made as to whether the reference input remains above the threshold for using sensorless, a HF signal-based mode of motor control. If the determination at box 2245 is affirmative, method 2200 moves back to box 2240 whereby the motor continues to be controlled using the Hall sensors. If, on the other hand, the determination at box 2245 is negative, method 2200 may move to box 2250. At box 2250, the motor may be controlled or operated using the low-speed mode wherein injection of a HF signal is used to control the motor in a sensorless manner.

In some examples, when an electric motor is used in an electric powertrain of a vehicle, jerk may cause discomfort and may give a vehicle operator a sense of loss of control. This, in turn, may make the vehicle acceleration and deceleration less predictable. Jerk may be defined by equation (16), where $\vec{a}(t)$ is acceleration, $\vec{v}(t)$ is speed and $\vec{s}(t)$ is the space vector. If the vehicle has a high rate of change of acceleration, the smoothness may be affected. This condition may be reduced or avoided during the development of the motor control modes.

$$\vec{J}(t) = \frac{d\vec{a}(t)}{dt} = \frac{d^2\vec{v}(t)}{dt^2} = \frac{d^3\vec{s}(t)}{dt^3} \tag{16}$$

Figure 23A:
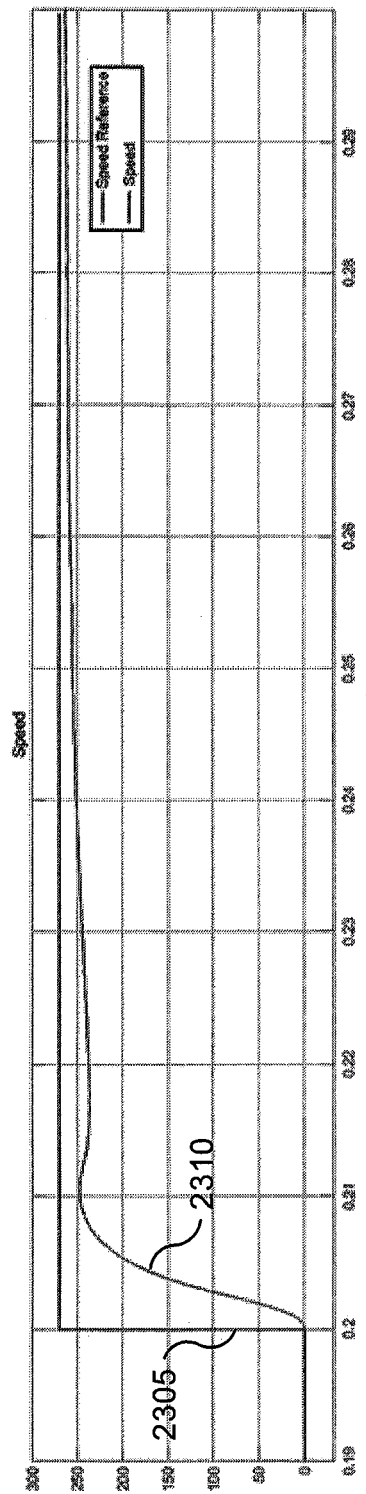
FIGS. 23A, 23B, and 23C show example graphs of speed, torque, and current of an example electric motor, in accordance with a non-limiting implementation of the present specification.
Figure 23B:
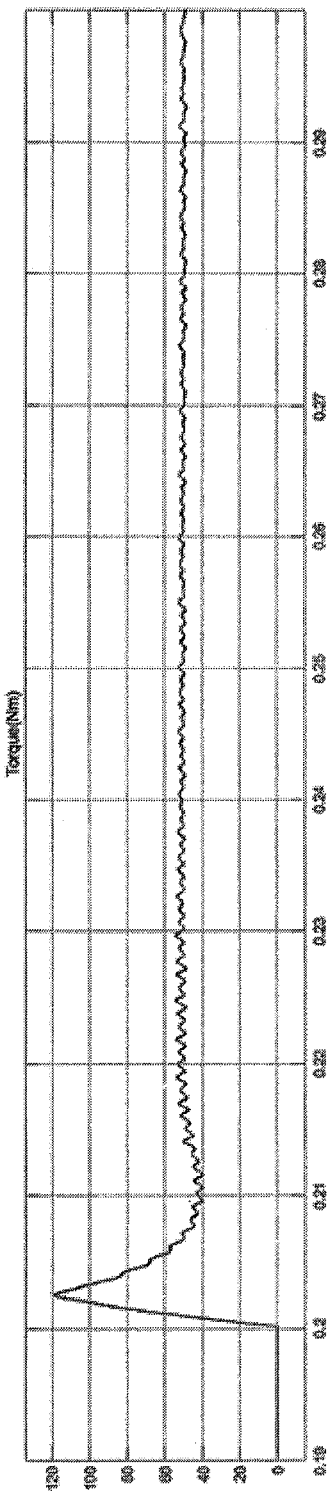
Figure 23C:
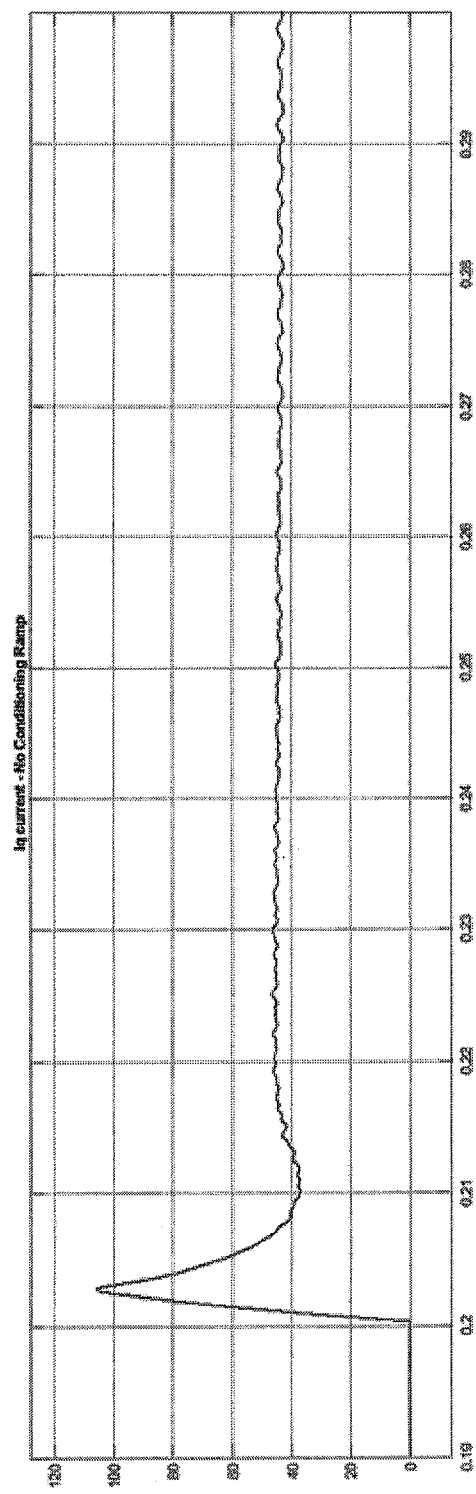
Figure 24A:
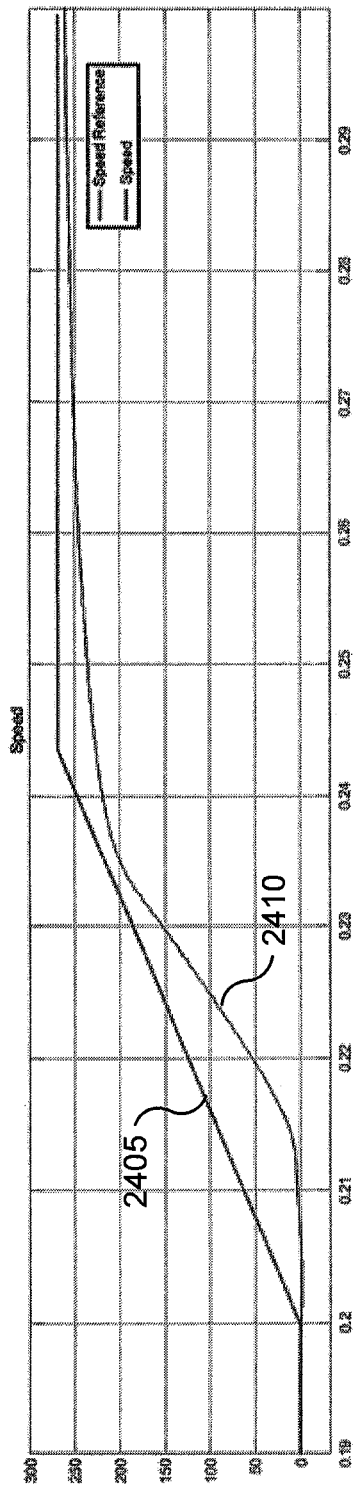
FIGS. 24A, 24B, and 24C show other example graphs of speed, torque, and current of an example electric motor, in accordance with a non-limiting implementation of the present specification.
Figure 24B:
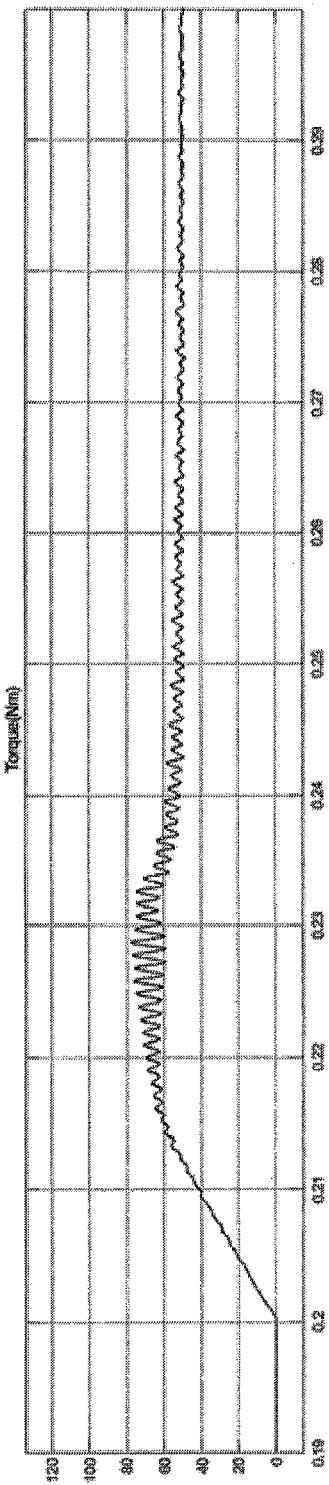
Figure 24C:
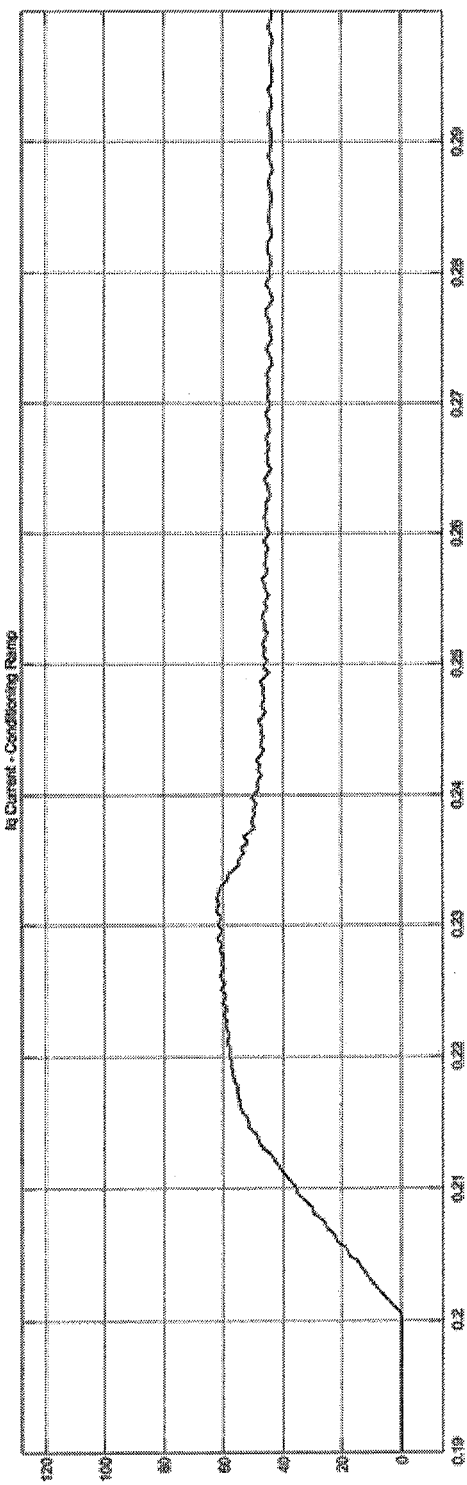

In some examples, conditioning ramps may be used to improve system response and stability, to reduce the step response that may occur during high acceleration, and to create a smooth speed/torque reference for the speed/current loop. FIGS. 23A-C and 24A-C show example speed, torque and current responses for systems without and with conditioning ramps respectively. FIG. 23A shows a speed reference trace 2305 and an actual speed trace 2310. Similarly, FIG. 24A shows a speed reference trace 2405 and an actual speed trace 2410. As can be seen in FIGS. 23A-C and 24A-C, the reference speed is achieved in almost the same time, but there is an appreciable difference in current and speed variation when using the conditioning ramp.

In some examples, to reduce the rate of change of current, and thereby reduce the jerk, a limit for the maximum speed/torque variation per second may be set. If the speed/torque command is higher than the set slope (i.e. the set limit), the control system may restrict or reduce the input reference initially, and may then increase the reference over time following the conditioning ramp. It is contemplated that in some examples, the methods, controllers, and CRSMs described herein may have the features or perform the functions to implement the conditioning ramps and the jerk reduction techniques described herein.

In some examples, HF injection may also be used to estimate a temperature of the windings of the motor. For the motor temperature estimation, the resistance of a conductor may be given by equation (17):

$$R = R_{ref}[1 + \alpha(t - t_{ref})] \tag{17}$$

where $R_{ref}$ is the resistance at reference temperature in ° C., $\alpha$ is the temperature coefficient, and R is the resistance at temperature t. For copper, the value of a is 0.00393° C.$^{-1}$. Solving equation (17) with respect of change in temperature yields equation (18):

$$\Delta t = \left(\frac{1}{\alpha}\right) \times \frac{(R - R_{ref})}{R_{ref}} \tag{18}$$

A HF injection may be used to calculate in real-time the motor resistance and inductance. Using equation (18), the change in the stator resistance may be used to estimate the coil temperature. In some examples of sensorless motor control, the high frequency injection is present at low speed but as the speed increases, after the transition from low speed to high speed, the high frequency injection may be stopped; see for example FIGS. 9-11. In order to allow for temperature estimation at high speeds, the HF injection may be turned on for short time periods (e.g. a few milliseconds) to measure the change in resistance. In some examples, this estimation may be done after a fixed interval (e.g. 3 s), as the change in temperature may not be rapid. In some examples, the HF injection may be turned on intermittently or periodically to allow for this estimate of temperature to be generated. The result obtained for the change in temperature using this approach may be sensitive to the significant figures in the stator winding resistivity and a (temperature coefficient).

It is contemplated that in some examples, the methods, controllers, and CRSMs described herein may have the features or perform the functions to implement the HF signal-based temperature sensing techniques described herein.

In addition, it is contemplated that the methods described herein may be performed using the controllers described herein. In addition, it is contemplated that the methods described herein may be performed using controllers different than the controllers described herein. Moreover, the controllers described herein may perform the methods described herein and may perform or execute the instructions stored in the CRSMs described herein. It is also contemplated that the controllers described herein may perform functions or execute instructions other than those described in relation to the methods and CRSMs described herein.

Furthermore, the CRSMs described herein may store instructions corresponding to the methods described herein, and may store instructions which may be performed or executed by the controllers described herein. Furthermore, it is contemplated that the CRSMs described herein may store instructions different than those corresponding to the methods described herein, and may store instructions which may be performed by controllers other than the controllers described herein.

The methods, controllers, and CRSMs described herein may include the features or perform the functions described herein in association with any one or more of the other methods, controllers, and CRSMs described herein.

Throughout this specification and the appended claims, infinitive verb forms are often used. Examples include, without limitation: "to reduce," "to provide," and the like. Unless the specific context requires otherwise, such infinitive verb forms are used in an open, inclusive sense, that is as "to, at least, reduce," to, at least, provide," and so on.

The above description of illustrated example implementations, including what is described in the Abstract, is not intended to be exhaustive or to limit the implementations to the precise forms disclosed. Although specific implementations of and examples are described herein for illustrative purposes, various equivalent modifications can be made without departing from the spirit and scope of the disclosure, as will be recognized by those skilled in the relevant art. Moreover, the various example implementations described herein may be combined to provide further implementations.

In general, in the following claims, the terms used should not be construed to limit the claims to the specific implementations disclosed in the specification and the claims, but should be construed to include all possible implementations along with the full scope of equivalents to which such claims are entitled. Accordingly, the claims are not limited by the disclosure.

The invention claimed is:

1. A method of controlling an electric motor having a rotor and a stator, the method comprising:
controlling the electric motor in a low-speed mode by injecting a high frequency (HF) signal into the electric motor, the HF signal having an initial voltage and an initial frequency;
obtaining a speed of the rotor relative to the stator;
obtaining a reference input being sent to the electric motor;
comparing the speed and the reference input with a first speed threshold and a reference input threshold respectively; and
reducing at least one of the initial voltage and the initial frequency if the speed is below the first speed threshold and the reference input is below the reference input threshold, to reduce an acoustic noise caused by the injecting the HF signal into the electric motor.

2. The method of claim 1, wherein the first speed threshold is about zero and the reference input threshold is about zero.

3. The method of claim 1, wherein:
the initial voltage comprises a maximum voltage; and
the reducing the at least one of the initial voltage and the initial frequency comprises reducing the maximum voltage to a minimum voltage if the speed is below the first speed threshold and the reference input is below the reference input threshold.

4. The method of claim 1, wherein:
the initial voltage comprises a maximum voltage; and
the method further comprises:
maintaining the maximum voltage if the speed is below the first speed threshold and the reference input is above the reference input threshold.

5. The method of claim 1, wherein:
the initial voltage is below a maximum voltage; and
the method further comprises:
if the speed is below the first speed threshold and the reference input is above the reference input threshold:
increasing the initial voltage to the maximum voltage;
maintaining the initial voltage at the maximum voltage for a given time period; and
after the given time period, controlling the electric motor in the low-speed mode by injecting the HF signal into the electric motor, the HF signal having the maximum voltage.

6. The method of claim 1, wherein:
the reducing the at least one of the initial voltage and the initial frequency comprises reducing the initial frequency if the speed is below the first speed threshold and the reference input is below the reference input threshold.

7. The method of claim 6, wherein the reducing the initial frequency comprises:
determining a difference between the reference input and the reference input threshold; and
reducing the initial frequency by a frequency reduction being a non-decreasing function of the difference.

8. The method of claim 7, wherein:
the non-decreasing function comprises a stepwise function; and
the reducing the initial frequency comprises reducing the initial frequency by the frequency reduction determined by the stepwise function of the difference.

9. The method of claim 1, further comprising:
if the speed is equal to or greater than about the first speed threshold, controlling the electric motor using a high-speed mode based on a back electromotive force (EMF) generated by the electric motor.

10. The method of claim 9, further comprising:
if the speed is equal to or greater than a second speed threshold greater than the first speed threshold, disabling the low-speed mode by discontinuing the injecting the HF signal into the electric motor.

11. The method of claim 10, further comprising:
if after the disabling the low-speed mode the speed drops below a third speed threshold lower than the first speed threshold, controlling the electric motor using the low-speed mode by injecting the HF signal into the electric motor.

12. The method of claim 11, further comprising:
determining the third speed threshold, the determining comprising:
determining a first estimate of a position of the rotor relative to the stator using the low-speed mode by injecting the HF signal into the electric motor, the rotor rotating at the speed;
determining a second estimate of the position of the rotor using the high-speed mode based on the back EMF, the rotor rotating at the speed;
calculating a first error based on a difference between the first estimate and the second estimate;
comparing the first error with an error threshold;
if the first error is below the error threshold, setting the speed as the third speed threshold; and
if the first error is equal to or greater than the error threshold, increasing the speed of the rotor relative to the stator to an increased speed.

13. The method of claim 12, wherein if the first error is equal to or greater than the error threshold the determining the third speed threshold further comprises:
determining a third estimate of the position of the rotor relative to the stator using the low-speed mode by injecting the HF signal into the electric motor, the rotor rotating at the increased speed;

determining a fourth estimate of the position of the rotor using the high-speed mode based on the back EMF, the rotor rotating at the increased speed;

calculating a second error based on a corresponding difference between the third estimate and the fourth estimate;

comparing the second error with the error threshold;

if the second error is below the error threshold, setting the increased speed as the third speed threshold; and if the second error is equal to or greater than the error threshold, increasing the increased speed of the rotor relative to the stator to a further increased speed.

14. A method of controlling an electric motor in a low-speed mode, the electric motor comprising a rotor and a stator, the method comprising:

injecting a high frequency (HF) signal into the electric motor;

measuring a current generated by the electric motor in response to the injecting the HF signal; and estimating a position of the rotor relative to the stator based on the current, the estimating comprising using a phase locked loop (PLL) having:

a dynamic gain set to a minimum gain if a dynamic parameter is equal to or smaller than the minimum gain, the dynamic parameter being based on the current and a speed of the rotor relative to the stator;

the dynamic gain set to the dynamic parameter if the dynamic parameter is greater than the minimum gain and less than a maximum gain; and the dynamic gain set to the maximum gain if the dynamic parameter is equal to or greater than the maximum gain.

15. The method of claim 14, further comprising:

obtaining a reference input current being sent to the electric motor;

wherein the using the PLL comprises calculating the dynamic parameter based on:

a current error ($\varepsilon_i$) calculated based on a difference between the current and the reference input current; and a speed error ($\varepsilon_s$) calculated based on a corresponding difference between an estimated speed of the rotor and a reference speed associated with the rotor.

16. The method of claim 15, wherein the calculating the dynamic parameter comprises calculating the dynamic parameter as being equal to $(1+\varepsilon_s K_s+\varepsilon_i K_i)K_{min}$, where $K_{min}$ is the minimum gain, $K_s$ is a speed gain, and $K_i$ is a current gain.

17. A method of calibrating a low-speed mode of controlling an electric motor comprising a rotor and a stator, the method comprising:

immobilizing the rotor at an initial position relative to the stator;

applying a first reference input to the electric motor;

estimating a rotor position using the low-speed mode by injecting a high frequency (HF) signal into the electric motor, the estimating to provide a first estimated rotor position;

determining a first position error by comparing the first estimated rotor position with the initial position;

if the first position error is below an error threshold:

associating the first position error with the first reference input; and determining a calibration function based on the first position error and the first reference input; and if the first position error is equal to or greater than the error threshold:

excluding the first position error from the determining the calibration function.

18. The method of claim 17, wherein the associating the first position error with the first reference input comprises storing the first position error in association with the first reference input.

19. The method of claim 17, further comprising:

applying a second reference input to the electric motor;

estimating the rotor position using the low-speed mode to provide a second estimated rotor position;

determining a second position error by comparing the second estimated rotor position with the initial position;

if the second position error is below the error threshold, associating the second position error with the second reference input; and wherein the determining the calibration function comprises:

if the first position error and the second position error are below the error threshold, determining the calibration function based on the first position error, the second position error, the first reference input, and the second reference input.

20. The method of claim 19, wherein the determining the calibration function comprises determining the calibration function by performing a linear regression based on the first position error, the second position error, the first reference input, and the second reference input.

* * * * *